(12) United States Patent
Nozawa

(10) Patent No.: US 9,683,543 B2
(45) Date of Patent: Jun. 20, 2017

(54) WAVE ACTIVATED POWER GENERATION SYSTEM WITH THE RACK AND PINION MECHANISM

(71) Applicant: Tsukasa Nozawa, Tokyo (JP)

(72) Inventor: Tsukasa Nozawa, Tokyo (JP)

( * ) Notice: Subject to any disclaimer, the term of this patent is extended or adjusted under 35 U.S.C. 154(b) by 6 days.

(21) Appl. No.: 14/474,572

(22) Filed: Sep. 2, 2014

(65) Prior Publication Data
US 2015/0176562 A1    Jun. 25, 2015

(51) Int. Cl.
*F03B 13/10* (2006.01)
*F03B 13/12* (2006.01)
*F03B 13/18* (2006.01)

(52) U.S. Cl.
CPC ........ F03B 13/1845 (2013.01); F03B 13/186 (2013.01); *F05B 2230/00* (2013.01); *F05B 2240/40* (2013.01); *F05B 2280/6012* (2013.01); *F05B 2280/6013* (2013.01); *Y02E 10/38* (2013.01)

(58) Field of Classification Search
CPC ......... Y02E 10/38; Y02E 10/28; F03B 13/20; F03B 13/10
USPC ......... 60/495, 496, 497, 498, 499, 500, 501, 60/502, 503, 504, 505, 506, 507; 290/42, 290/53
See application file for complete search history.

(56) References Cited

U.S. PATENT DOCUMENTS

| | | |
|---|---|---|
| 110,436 A | 12/1870 | Close |
| 385,327 A | 6/1888 | Starkenberg |
| 446,057 A | 2/1891 | Copeland |
| 639,733 A | 12/1899 | Johnson |
| 884,080 A | 4/1908 | Fallis |
| 987,685 A | 3/1911 | Atkinson |
| 998,756 A | 7/1911 | Dean |
| 1,004,332 A | 9/1911 | Allen |
| 1,098,208 A | 5/1914 | Abbott |
| 1,104,510 A | 7/1914 | Ishii |
| 1,213,104 A | 1/1917 | Hulden |
| 1,790,058 A | 1/1931 | Morse |
| 1,864,499 A * | 6/1932 | Grigsby ................ F03B 13/186 290/42 |
| 3,567,953 A | 3/1971 | Lord |
| 3,668,412 A | 6/1972 | Vrana et al. |
| 3,746,875 A | 7/1973 | Donatelli |
| 3,959,663 A | 5/1976 | Rusby |
| 4,034,565 A | 7/1977 | McVeigh |
| 4,108,578 A | 8/1978 | Corey |
| 4,184,336 A | 1/1980 | Lamberti |
| 4,228,360 A * | 10/1980 | Navarro ............. F03B 13/1885 290/43 |
| 4,249,085 A | 2/1981 | Kertzman |
| 4,305,003 A | 12/1981 | Basurto et al. |
| 4,355,511 A | 10/1982 | Jones |
| 4,392,060 A | 7/1983 | Ivy |

(Continued)

*Primary Examiner* — Tulsidas C Patel
*Assistant Examiner* — Thomas Quigley
(74) *Attorney, Agent, or Firm* — Juan Carlos A. Marquez; Marquez IP Law Office, PLLC

(57) ABSTRACT

The present invention is directed to a wave activated power generation system that converts the vertical movement of one or more power generation buoys resulting from interaction with waves into energy producing gyrations via a rack and pinion mechanism. The square-shaped power generation buoys are manufactured from fiber-reinforced plastic material.

19 Claims, 47 Drawing Sheets

(56) References Cited

U.S. PATENT DOCUMENTS

| | | | |
|---|---|---|---|
| 4,418,286 A | 11/1983 | Scott | |
| 4,434,375 A | 2/1984 | Taylor | |
| 4,539,484 A | 9/1985 | Suggs | |
| 4,599,858 A | 7/1986 | La Stella | |
| 4,627,240 A | 12/1986 | Holmes | |
| 5,167,786 A * | 12/1992 | Eberle | B01D 61/10 204/228.2 |
| 5,929,531 A | 7/1999 | Lagno | |
| 7,045,912 B2 | 5/2006 | Leijon et al. | |
| 7,305,823 B2 | 12/2007 | Stewart et al. | |
| 7,348,764 B2 | 3/2008 | Stewart et al. | |
| 7,352,073 B2 | 4/2008 | Ames | |
| 7,444,810 B2 | 11/2008 | Olson | |
| 7,525,214 B2 | 4/2009 | Atilano Medina et al. | |
| 7,687,931 B2 | 3/2010 | Gasendo | |
| 7,785,163 B2 | 8/2010 | Spencer et al. | |
| 7,791,213 B2 | 9/2010 | Patterson | |
| 7,841,177 B1 | 11/2010 | Detwiler | |
| 7,969,033 B2 | 6/2011 | Ryan | |
| 8,013,462 B2 | 9/2011 | Protter et al. | |
| 8,476,782 B2 | 7/2013 | Chi et al. | |
| 8,487,459 B2 | 7/2013 | Eder et al. | |
| 8,587,139 B2 | 11/2013 | Gerber | |
| 8,723,355 B2 | 5/2014 | Eder et al. | |
| 8,745,981 B1 | 6/2014 | Hanna | |
| 2004/0145079 A1 | 7/2004 | Lin et al. | |
| 2007/0130929 A1 | 6/2007 | Khan et al. | |
| 2008/0016863 A1 | 1/2008 | Tai et al. | |
| 2009/0072540 A1 | 3/2009 | McCague et al. | |
| 2009/0146429 A1 | 6/2009 | Protter et al. | |
| 2010/0041289 A1 * | 2/2010 | Spencer | B63B 22/00 441/1 |
| 2010/0045044 A1 | 2/2010 | Patterson | |
| 2010/0148504 A1 | 6/2010 | Gerber | |
| 2010/0219633 A1 * | 9/2010 | Sichau | F03B 13/1855 290/42 |
| 2010/0264659 A1 | 10/2010 | Chi et al. | |
| 2011/0012368 A1 | 1/2011 | Hahmann et al. | |
| 2011/0084488 A1 | 4/2011 | Eder et al. | |
| 2011/0173968 A1 | 7/2011 | Ahdoot | |
| 2011/0254270 A1 | 10/2011 | Ayntrazi | |
| 2012/0074702 A1 * | 3/2012 | Ahdoot | F03B 13/182 290/53 |
| 2012/0193920 A1 * | 8/2012 | Jeon | F03B 13/266 290/53 |
| 2012/0200156 A1 | 8/2012 | Weller | |
| 2012/0211987 A1 * | 8/2012 | Roe | F03B 13/16 290/53 |
| 2012/0248865 A1 | 10/2012 | Eder et al. | |
| 2012/0261923 A1 | 10/2012 | Hassavari | |
| 2012/0280505 A1 * | 11/2012 | Thomas | F03B 13/186 290/53 |
| 2013/0069370 A1 | 3/2013 | Ames | |
| 2013/0113211 A1 | 5/2013 | Rohrer | |
| 2013/0127168 A1 | 5/2013 | Dragic | |
| 2013/0161948 A1 | 6/2013 | Sarokhan | |
| 2013/0313829 A1 | 11/2013 | Weller | |
| 2014/0132003 A1 | 5/2014 | Hayashi et al. | |
| 2014/0145442 A1 | 5/2014 | Hart | |

* cited by examiner

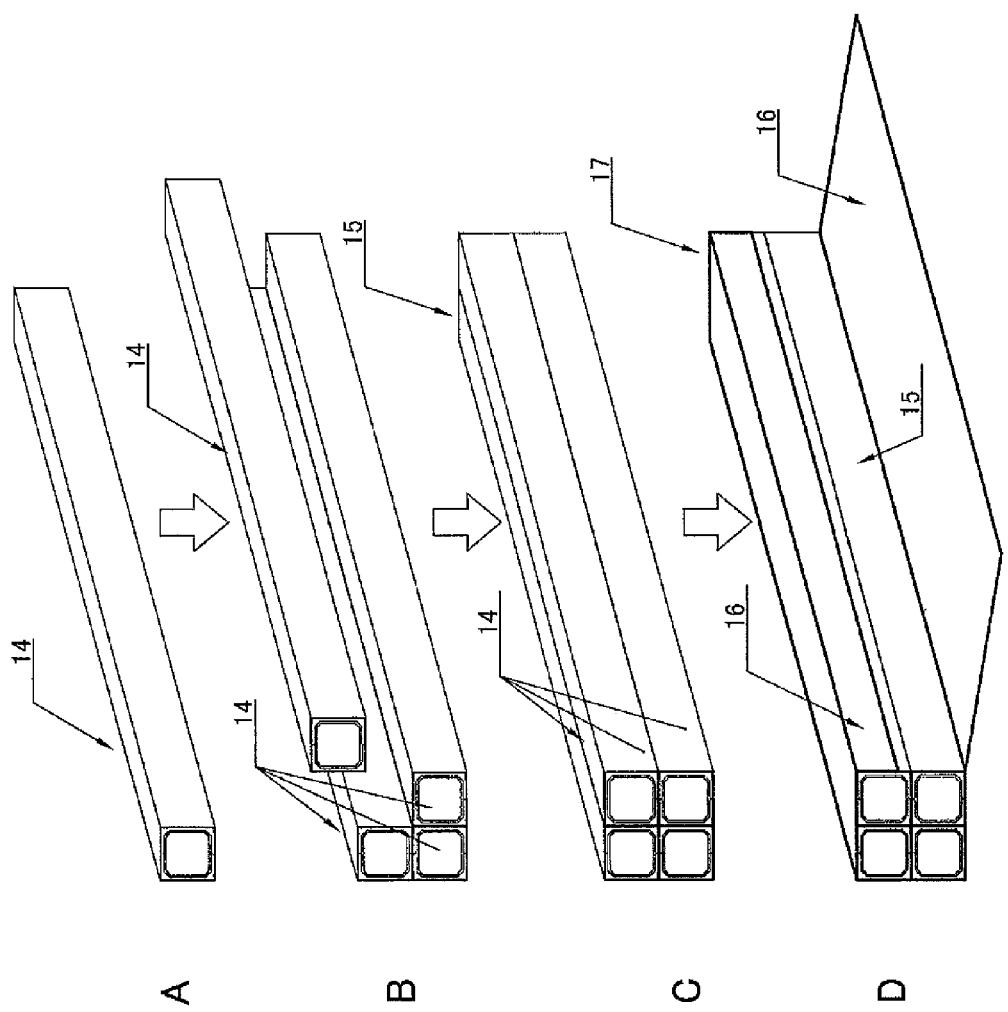

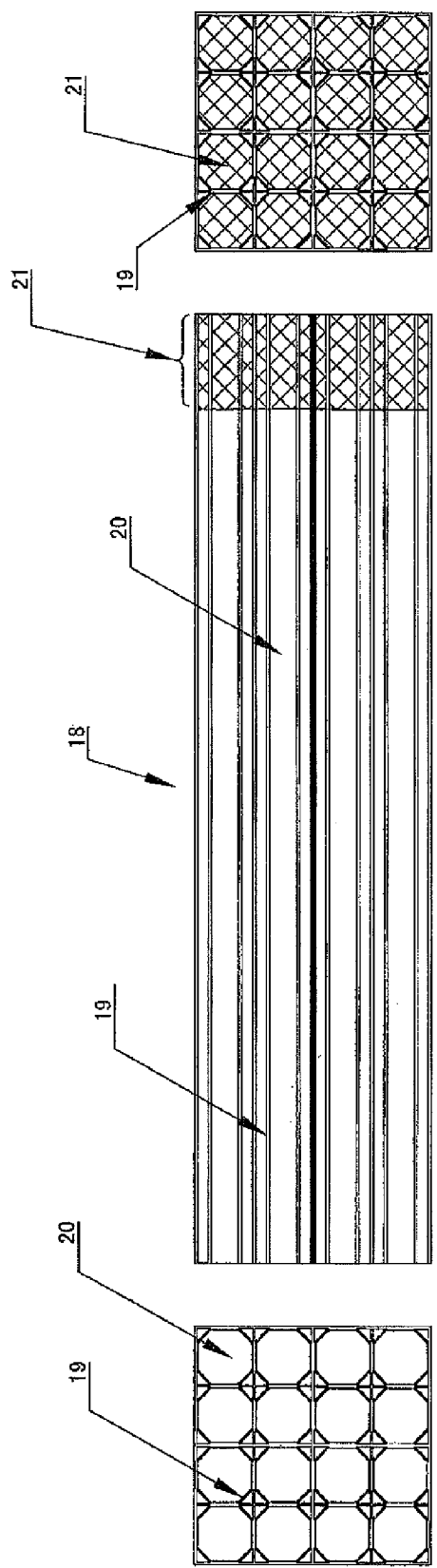

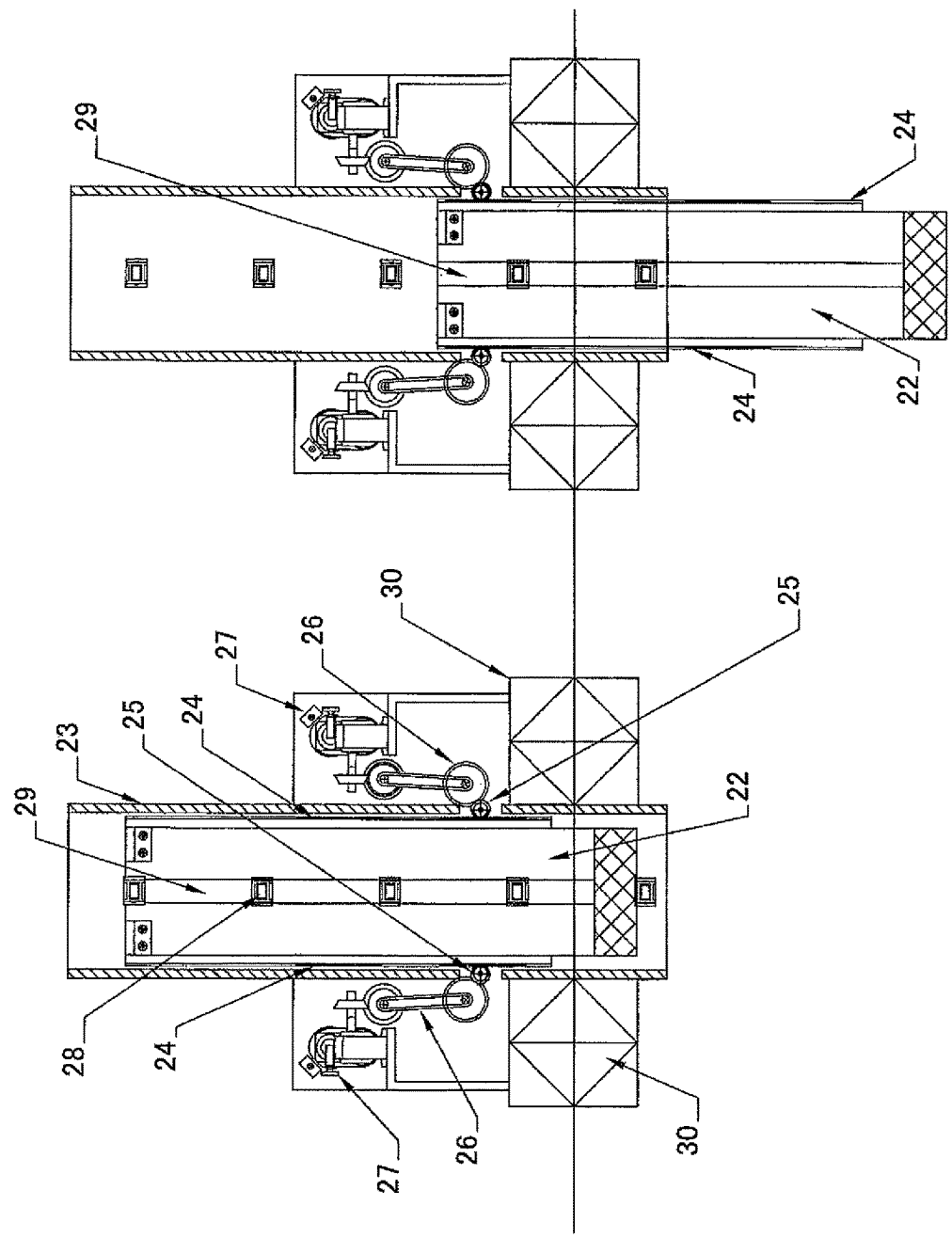

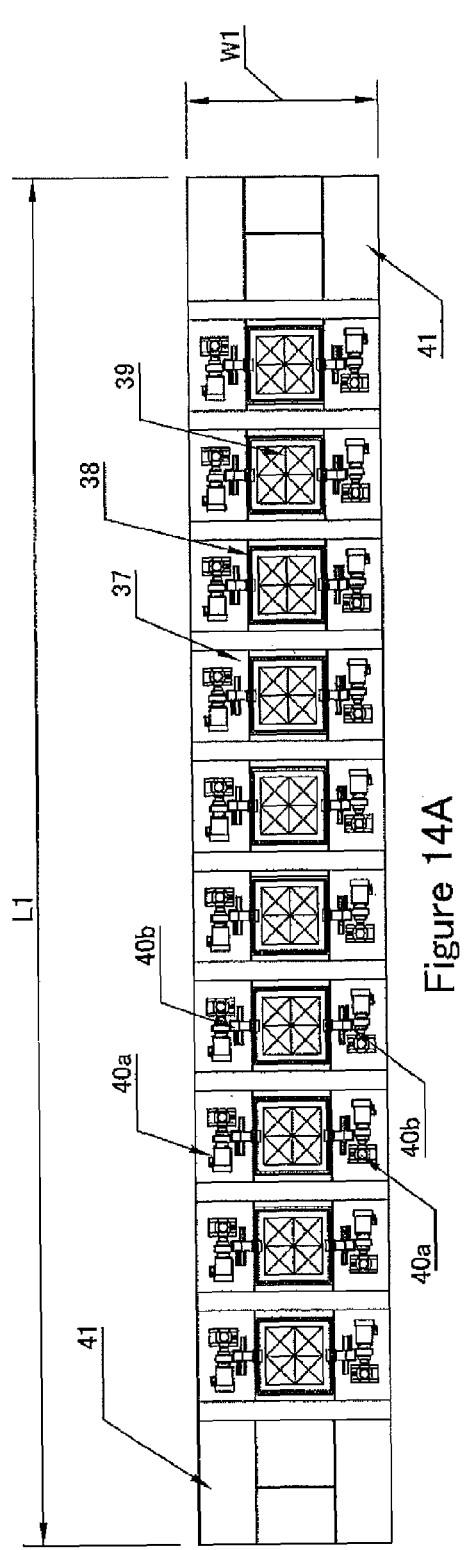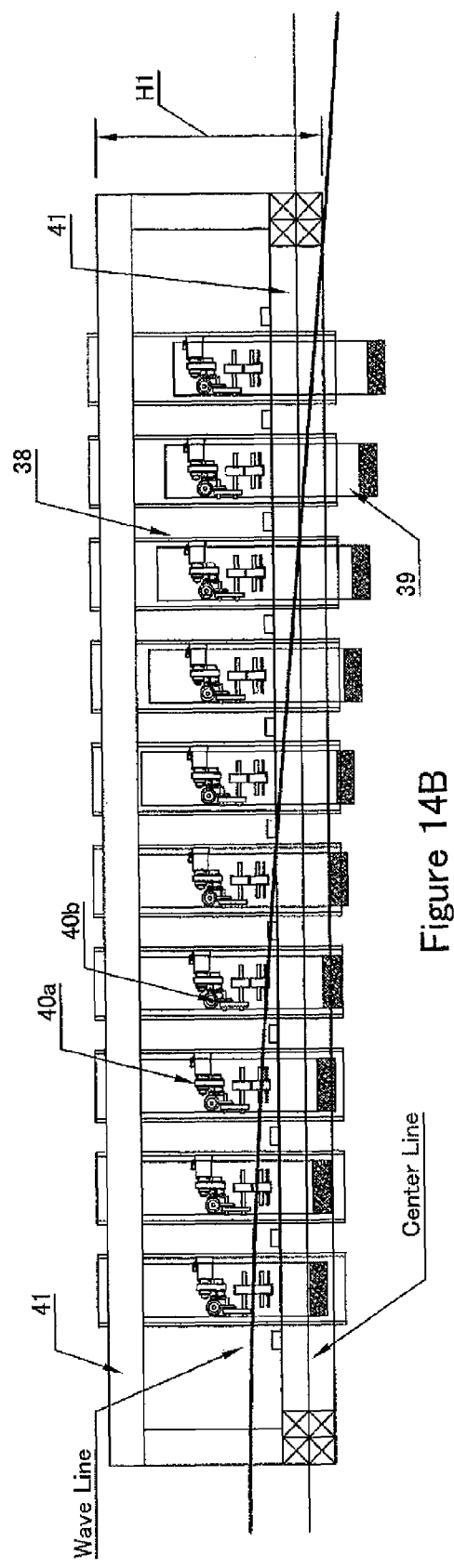

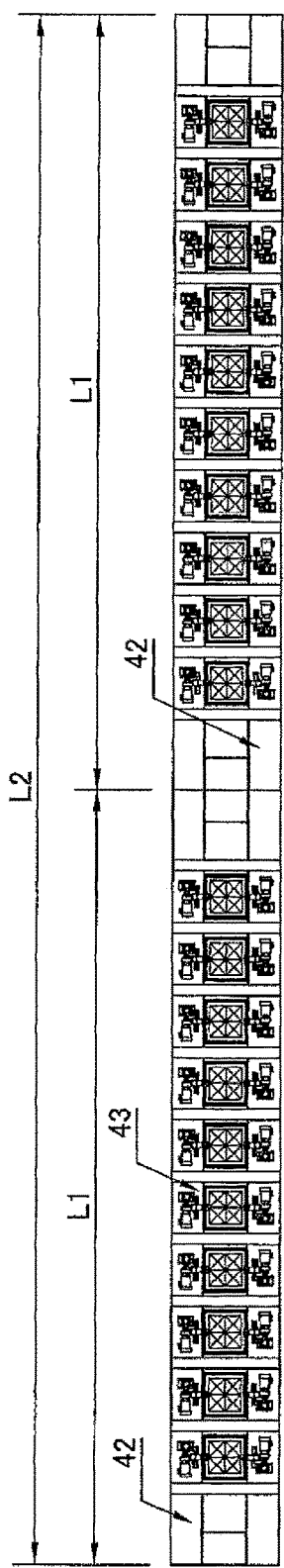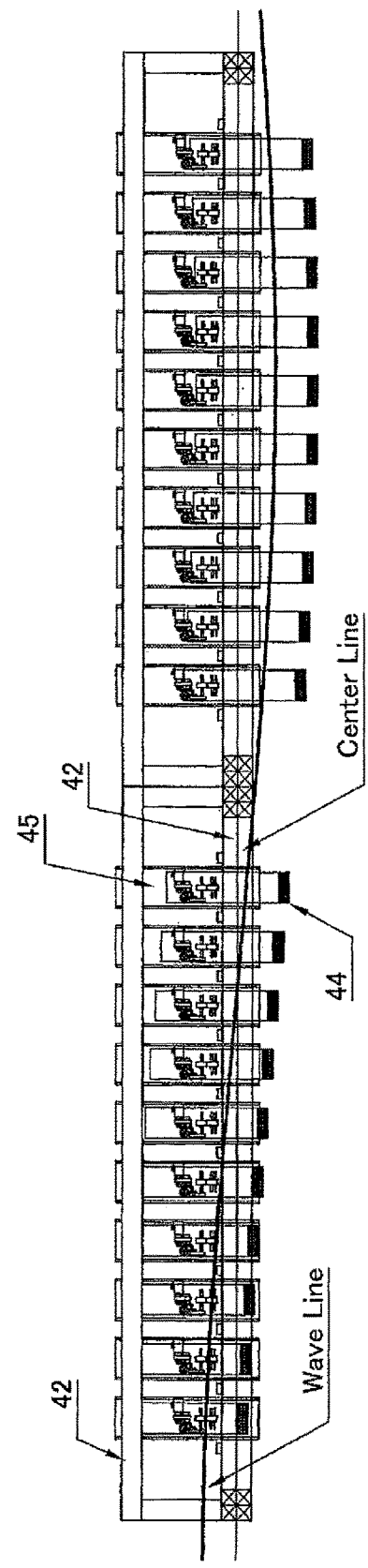
Figure 16A
Figure 16B

WAVE ACTIVATED POWER GENERATION SYSTEM WITH THE RACK AND PINION MECHANISM

This is a continuation-in-part of application Ser. No. 13/566,730 filed on Aug. 3, 2012, and of PCT Application No. PCT/IB2013/002851 filed on Dec. 21, 2013, both of which are hereby incorporated by reference in their entireties.

BACKGROUND OF THE INVENTION

Field of the Invention

This invention is concerned with a wave activated power generation system using a rack and pinion mechanism, in which a plurality of rectangular power generation buoys manufactured from fiber-reinforced plastic material are activated by wave action.

Description of the Prior Art

It is a root demand to enjoy a safe, comfortable civilization life. Modern civilization is based on electrical energy. The demand for electrical energy never disappears as long as the human race exists.

With respect to ocean energy, wave activated power generation is the steadiest form of energy. It is characterized by the large amount available. The energy per unit area is 20-30 times of photovoltaic generation energy and is at least five times more than the force of winds. Wave activated power generation can generate electricity for 24 hours and 365 days. It is said that the energy density for each area is 20-30 times the sunlight, and 5-10 times the force of the wind. Each country of the Pacific Ocean Rim is late in the energy use of the wave force. The research and development is worth making an effort.

The ability of the wave activated power generation system is only limited by the natural environment in the installation location and the local weather conditions. It is not uniform in all the oceans. The usage of wave activated power generation is put to practical use as a power supply of beacon buoys now. However, there is still a problem with stability and potential damage during stormy weather.

The advantages in which the wave activated power generation is adopted are as follows:
(A) Wave activated power generation is eternal energy.
(B) Wave energy is clean, safe, cheap and abundant. Oil fuel and the nuclear power are unnecessary with wave activated power generation of natural energy.
(C) The needed area for the wave activated power generation is smaller than that of wind power generation or photovoltaic generation.
(D) It is said that the wave activated power generation can generate 30,000 kW in an area of 1K square meters.
(E) As the matter of the wave activated power generation, the influence on the appearance of the surrounding area is a little compared with wind power generation.
(F) The amount of power generation can be easily estimated because the conditions of the waves maybe forecast from the local wind conditions.
(G) The structural mechanism is simple and the complex gearbox is unnecessary.

The system of wave activated power generation has some methods. When classified roughly, it is as follows:
(a) Method to use top and bottom of wave vibration
(b) Method to use horizontal vibration of wave
(c) Method to use the seawater stored to the water pond by using the wave force and to rotate the water mill.
(d) Additionally, there is a method of using both of (a) and (b) together, too.

The method of (a) is being researched by a lot of research laboratories. That is the one to operate the turbine by ventilating the compressed air generated by a top and bottom of the wave vibration. This method is called the turbine method and a vibration water column type. The structure is simple and is excellent in durability. It is a main current now. There is also a simple method, such as moving the coil up and down in the magnetic field floating body vibration. Moreover, there is the one Of the pendulum type that uses the horizontal vibration of the wave of (b), too.

Problems in the Prior Art

In the prior art, wave activated power generation is not so widespread. The usage is limited to small-scale power supply equipment, and it has a problem of being damaged by stormy weather.

The "Piston air turbine method" is the main method of the wave activated power generation now. The structure used therein is simple and has excellent durability, but it is necessary to turn the turbine blades by compression air. It sets up the air room where the bottom was opened in the sea, and compresses air in the air room because of the wave that enters from the bottom. The compress air rotates the air turbine. A large amount of energy is needed to turn the turbine blades with air. The energy of the sea wave becomes large if it totals it. However, individual energy is small. It is thought that a mechanical method is preferable to take out a lot of small energy.

Another known device is the "Gyro method" which converts the swell and fall of the waves into gyrations by the gyro. It has not arrived at practical use though both academic examination introductions have been done. The reasons are in structural strength shortage and poor power generation efficiency. (3) The efficiency in thermodynamics of the Carnot cycle is shown by "1-Tex/Ten". "Tex" is an exit temperature of the turbine, and "Ten" is an entrance temperature of the turbine. In the "Piston air turbine method", "Ten" is about 100° C., and "Tex" is about 15° C. 15° C. is 288K, and 100° C. is 373K. When "Ten" is roughly assumed to be 400K, and "Tex" is assumed to be 300K, the efficiency of Carnot cycle is 25%. The energy conversion efficiency of the "Piston air turbine method" does not exceed 25%.

Also, in the prior art, the corrosion problem with seawater has not yet been solved. Steel and aluminum have enough structural strength for wave activated power generation, but they are easily corroded by seawater. A power generation buoy that is degraded by corrosion loses buoyancy. Wood also rots by seawater. FRP material is excellent in structural strength and durability. However, its manufacturing cost is high because manufacturing processes for high volume production have not been established.

SUMMARY OF THE INVENTION

To answer the problems and the current state demanded by the use of a wave activated power generation system, the processing technology and concept for them are described herein. The feature of the method of this technology is a rack & pinion system, which mechanically converts the vertical movement of the sea wave into gyrations that then generate electricity with the power generator. The wave activated power generation of a rack & pinion method is not restrained to the equation of Carnot cycle. The electric power generated by the wave activated power generation of the rack & pinion method is an intermittent exchange current that can be converted into direct current. The technology that converts the exchange current into direct current already exists. A power generation farm can connect many power generation units. Each power generation unit is independently controlled, whereby the electric power created in a power generation farm can be leveled.

In terms of the wave activated power generation system, the most important problem that should be solved is the manufacturing of a power generation buoy that can endure exposure to seawater. The demand on the power generation buoy is not only the endurance against corrosion, it is necessary that the power generation buoy floats on the sea and stands up vertically in the sea. Moreover, it is preferable that the power generation buoy is filled with the material that prohibits the infiltration of seawater.

Also, a second demand is that the mechanism of converting the vertical movement into the gyration works with good efficiency. It is preferable that the mechanism has the ability to stop power generation system during stormy weather.

To satisfy the first demand, glass fiber FRP material is chosen. Glass fiber FRP is a compound material of the glass fiber and epoxy resin, and neither the glass fiber nor epoxy resin can be corroded by seawater. Moreover, it is easy to get the raw materials as price of such material is low. The process of manufacturing FRP structural material for the wave activated power generation is the same process as disclosed in U.S. application Ser. No. 13/407,196 "A HONEYCOMB STRUCTURE HAVING HONEYCOMB CORE ARRANGED PARALLEL TO A PANEL SURFACE AND A MANUFACTURING PROCESS THEREFOR". The FRP structures for power generation buoy manufactured from four-corner type though the FRP structure shown in U.S. application Ser. No. 13/407,196 is a honeycomb structure of six-corner type. This method can mass-produce FRP structural materials at low cost.

The honeycomb structure of six-corner type is less limited in the size than four-corner type structure, and is more excellent in structural strength. However, the power generation buoy only moves up and down in the shroud assembly by ocean wave. The power generation buoy does not need special strength. It is enough in the FRP structure of a four-corner type.

In U.S. application Ser. No. 13/407,196, vapor pressure power is used to pressurize the internal pressure device made of heat proof plastic. In this invention, styrene foam is used instead of the vapor pressure power of water and alcohol. The bead of the styrene foam foams because of steam when heating it filling the bead of the styrene foam in the internal pressure device. The internal pressure device is pressurized by the foaming pressure of the styrene foam. The styrene foam remains in the FRP structure. The styrene foam filled in the internal pressure device can be used to prevent seawater from invading into the power generation buoy.

The power generation buoy is filled with the styrene foam, so it floats on the sea. When the weight of iron is attached at the bottom part of buoy, the power generation buoy stands vertically in seawater. However, because the weight of iron is corroded with seawater, it is inferior to durability. When iron particles or fragments are filled at the bottom part of the power generation buoy and the iron is hardened with the urethane resin, the power generation buoy stands vertically in the sea. The iron in the buoy does not come in contact directly with seawater because it is hardened with the urethane resin.

To satisfy the second demand, the mechanical method of converting the vertical movement into the gyration is chosen. Current method by compression air is inefficient. The reason is that the energy of the wave is converted into thermal energy by the process into which air is compressed. The thermal energy generated by compressed air is the loss in vain. In this invention, the energy of the wave is taken out as vertical movement generated by a buoyancy of the seawater and the gravity of the earth.

In general, a crank and piston mechanism is used to convert the vertical movement into the gyration. It is adopted from the piston engine, etc. However, the crank and piston mechanism is not applicable to the power generation buoy. The reason is that the amplitude of the wave is not constant. The crank mechanism does not rotate when the amplitude of the vertical movement is not constant.

In this invention, the mechanism of a rack and pinion is adopted. Rack and pinion mechanisms can convert the vertical movement of the variable amplitude wave into the gyration. Of course, there is some limitation. The amplitude of the wave at stormy weather has the danger to exceed the length of the rack gear. At stormy weather it is necessary to stop the vertical movement generated by the wave.

The power generation buoy repeats the vertical movement because of buoyancy and gravity. The pinion gear converts the vertical movement of the rack gear, which is attached to power generation buoy into the gyration. The wave activated power generation turns a dynamo with the rotating torque of the pinion gear, and obtains the electric power. The rotating torque load of the dynamo is equal to the frictional force for the power generation buoy. The power generation buoy does not fall down by gravitation when the frictional force is larger than the gravity load. The power generation buoy stops the vertical movement in the air. When the pinion gears are connected to the dynamo with the gearless transmission, the torque of the dynamo can be arbitrarily varied. It becomes possible to stop the power generation buoy during stormy weather.

The speed of the pinion gear is changed by the wave conditions. When rotating movement of the pinion gear generates electricity, the electricity is an exchange current. The rotation speed of dynamo is not constant. The frequency of current is varied by the rotating speed of the dynamo. It is preferable that the current of the wave activated power generation is converted into direct current.

Among other features of the invention, since it is undesirable that the rack & pinion system be exposed directly to seawater:
  (A) The rack & pinion system can be placed inside of the power generation buoy, so that the gear system will not be exposed to seawater. To put the gear system in the power generation buoy, the power generation buoy should have vacant space in the power generation buoy.
  (B) Since a vacant power generation buoy can be inferior in structural strength, it is necessary to reinforce the power generation buoy structurally. It is preferable that the power generation buoy is composed of the surface material of stainless steel and the frame of the steel material. Of course, FRP is acceptable.

To adjust the distance between the guide roller and the slide frame when the power generation buoy is shaken to the right and left by waves of the sea:
  (A) The power generation buoy is restricted with guide rollers and a slide frame.
  (B) It is necessary to control the engagement distance of the rack gear and the pinion gear in units of millimeters. However, it is impossible to control the movement of the power generation buoy in units of millimeters.
  (C) When we give up the impossible control, the structure becomes simple. The movement of the power generation buoy cannot be controlled in precision. The structure becomes simple when the guide roller is attached on the surface of power generation buoy.

(D) The power generation buoy is enclosed with the fence because of worker's safety.

To solve the problem in maintaining the distance between the rack gear and the pinion gear constant:

(A) It is necessary to control the engagement distance of the rack gear and the pinion gear by the unit of the millimeter. Otherwise, the rack gear and pinion gear will come off. However, it is impossible to control the movement of the power generation buoy in units of millimeters. So, it is impossible to control the movement of the rack gear in units of millimeters because the rack gear is attached to the power generation buoy.

(B) When the pinion gear is fixed, it is inevitable that the rack gear and the pinion gear come off. Therefore, the pinion gear should vary its position according to the movement of the rack gear. However, the pinion gear is not floating in the air. The pinion gear must be fixed to the power generation unit. Otherwise, it falls down, (C) Fortunately, because the movement of the power generation buoy is restrained with the guide roller and the slide frame, the vibration of the rack gear is not large. Therefore, the blurring of the center axis of pinion gear is not large either.

(D) If the pinion gear is fixed to loose fit type, the vibration of the axis center of the pinion gear will be controllable. However, the rotation axis connected with the Generator must be supported fi (E) We connected the pinion gear axis to the axis of Generator with universal joint. This method is effective.

For purposes of forming a mechanical stopper for the power generation buoy:

(A) The wave height of the ocean has the possibility to exceed the length of the rack gear. When the wave height exceeds the length of the rack gear, it is necessary to stop the power generation buoy. There are several methods for stopping the power generation buoy. Mechanical stopper is most reliable.

(B) The power generation buoy moves up and down inside of the space surrounded by the slide frames of the power generation unit. The movement of the power generation buoy is limited in this space. Therefore, the lower end stopper of power generation buoy is placed at the bottom of the slide frame so that the power generation buoy should not fall down anymore. It is necessary to note the assembly procedure because the power generation buoy does not enter when the lower end stopper is previously built in.

(C) The upper end stopper is clever a little more. The inside of the power generation buoy in this invention is vacant. It is effective to stop the power generation buoy using the inside bottom surface of power generation buoy.

(D) The pinion system is placed to the frame of the power generation unit. The frame of the power generation unit has come into the power generation buoy because the pinion system is inside of the power generation buoy. The bottom surface of the power generation buoy rises when the power generation buoy rises because of the wave. The position of the frame of the power generation unit to which the pinion system has attached is fixation. The rise of the power generation buoy is stopped with the frame of the power generation unit.

(E) The position of upper end stopper and lower end stopper is decided by the length of rack gear and the position of pinion gear.

To recover the potential energy of the power generation buoy, the load of the generator is adjusted to zero, as follows:

(A) The cutting device is necessary to adjust the load to zero instantaneously. It is thought that the electromagnetic clutch is necessary.

(B) The output of the Generator is a load of the power generation buoy. The alternating-current generator can adjust the output of the Generator to zero by adjusting the field current to zero. However, it is uncertain whether to be able to adjust the load of the Generator to zero only by controlling the field current.

(C) When the electromagnetic clutch is put on the upstream of the Generator, the load of the Generator mechanically becomes zero.

In another embodiment of the invention, the power generation unit incorporates a unit float system with a unit posture stability mechanism and a unit anchor system.

In yet another embodiment, the power generation unit includes a magnet that moves up and down in an electromagnetic coil, whereby an electric voltage (Electromotive force) is generated in an electromagnetic coil.

(A) A plurality of bar magnets are installed on the bottom of power generation buoy and the same number of electromagnetic coils are fixed to the power generation frame.

(B) A lot of bar magnets installed on the bottom of power generation buoy move up and down by wave energy. The electromagnetic coils fixed to the power generation frame don not move by the wave. When the bar magnet moves up and down in a stationary coil, the electromotive force is generated.

(C) Main structures are the same as "Wave Activated Power Generation System with the Rack & Pinion Mechanism". Only replace a rack & a pinion mechanism with a plurality of bar magnets and electromagnetic coils.

(D) The direct coil method is suitable for the wave activated power generation at the place where the wave is comparatively small.

(E) The bar magnet fixed to the power generation buoy can be changed to the electromagnet. Strength of the flux of magnetic induction of the electromagnet is proportional to the current that flows to the electromagnet.

In an even further embodiment, the power generation unit includes a rack gear installed on the side hull of the power generation buoy that is moving up and down and right and left because of waves of the ocean. The hull of the power generation buoy is a thin board. The rack gear easily meanders when a lot of rack gears are installed directly on the thin hull of the power generation buoy. A base block that has a high rigidity is necessary to install a plurality of rack gears in highly accurately in a straight line. To secure the engagement of the rack gear and the pinion gear, it is necessary to fix a plurality of rack gears in straight line to a wide and thick block. The position where the rack gear is cut must be calculated beforehand because the rack gear is a cogwheel.

BRIEF DESCRIPTION OF THE DRAWINGS

FIGS. 5A-5D show an assembly procedure explanation chart for FRP structure pillar material with the references (14) basic square pillar assembly, (15) square pillar unit, (16) soft FRP prepreg, and (17) FRP structure pillar material with four basic pillar assemblies.

FIGS. 6A-6C show a power generation buoy of wave activated power generation using the references (18) power generation buoy, (19) glass fiber FRP, (20) styrene foam, (21) weight mass.

FIGS. 7A and 7B show an wave activated power generation unit with the references (22) power generation buoy, (23) shroud assembly, (24) rack gear, (25) pinion gear, (26) gearless transmission, (27) dynamo, (28) support roller, (29) shuttle slide and (30) rigid barge.

FIGS. 14A-14B show an image chart of the wave activated power generation module with the references (37) power generation unit, (38) shroud assembly, (39) power generation buoy, (40a) dynamo assembly, (40b) gearless transmission assembly, (41) rigid barge, (L1) length of module, (W1) width of module and (H1) height of module.

FIGS. 16A and 16B show an image chart of the long size wave activated power generation module with the references (42) rigid barge, (43) power generation unit, (44) power generation buoy and (45) shroud assembly (L1) Length of single module and (L2) Length of double module.

Guide roller, (134) Pinion system support frame, (135) Slide frame, (136) Unit frame, and (137) Lower end stopper.

Figure 26:
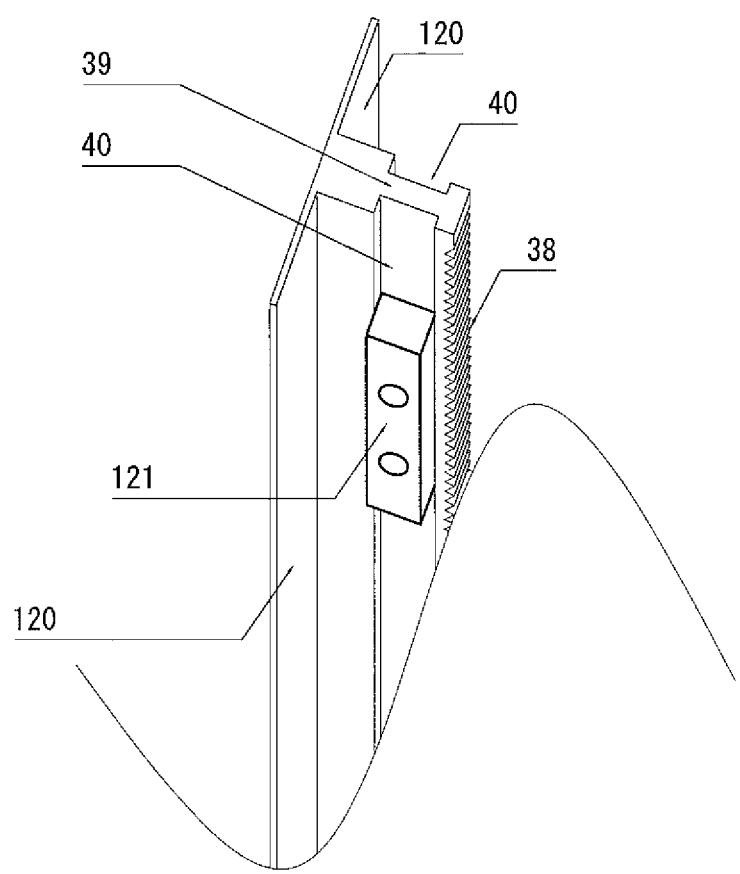

FIG. 26 shows a shape of rack gear using the references of (138) Rack teeth, (139) Rack web, (140) Rack ditch, (1120) Rack flange, and (1121) Slide bearing.

Figure 27:
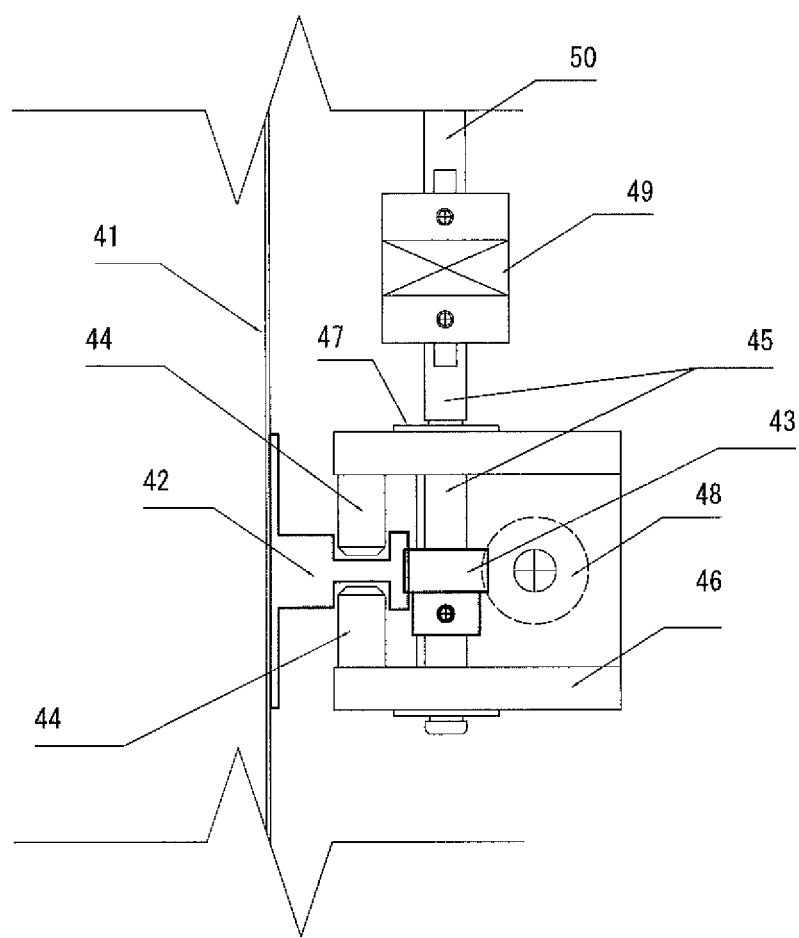

FIG. 27 shows a figure where rack & pinion system is seen right above using the references of (141) Side surface, (142) Rack gear, (143) Pinion gear, (144) Slide bearing, (145) Pinion axis, (146) Gear box, (147) Axis bearing, (148) Damper, (149) Universal joint, and (150) Generator axis.

Figure 28:
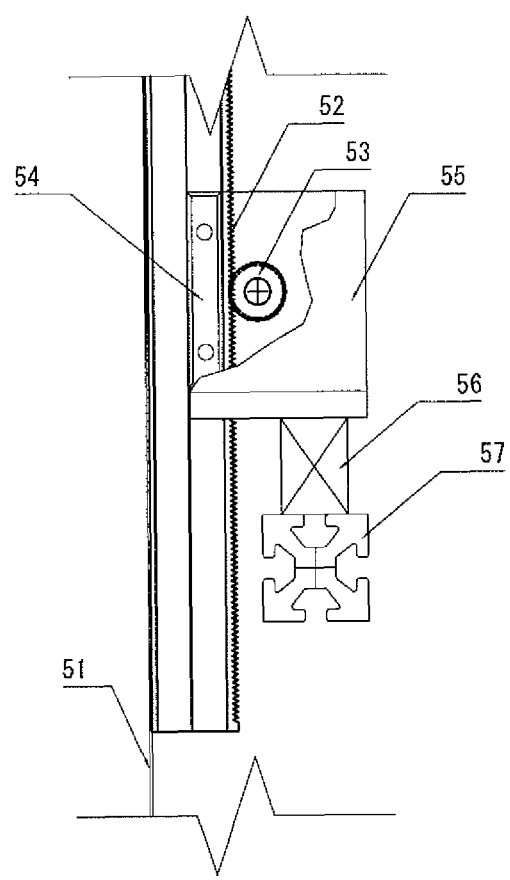

FIG. 28 shows a figure where rack & pinion system is seen in front chart using the references of (151) Side surface, (152) Rack gear, (153) Pinion gear, (154) Slide bearing, (155) Gear box, (156) Damper, and (157) Pinion system support frame.

Figure 29:
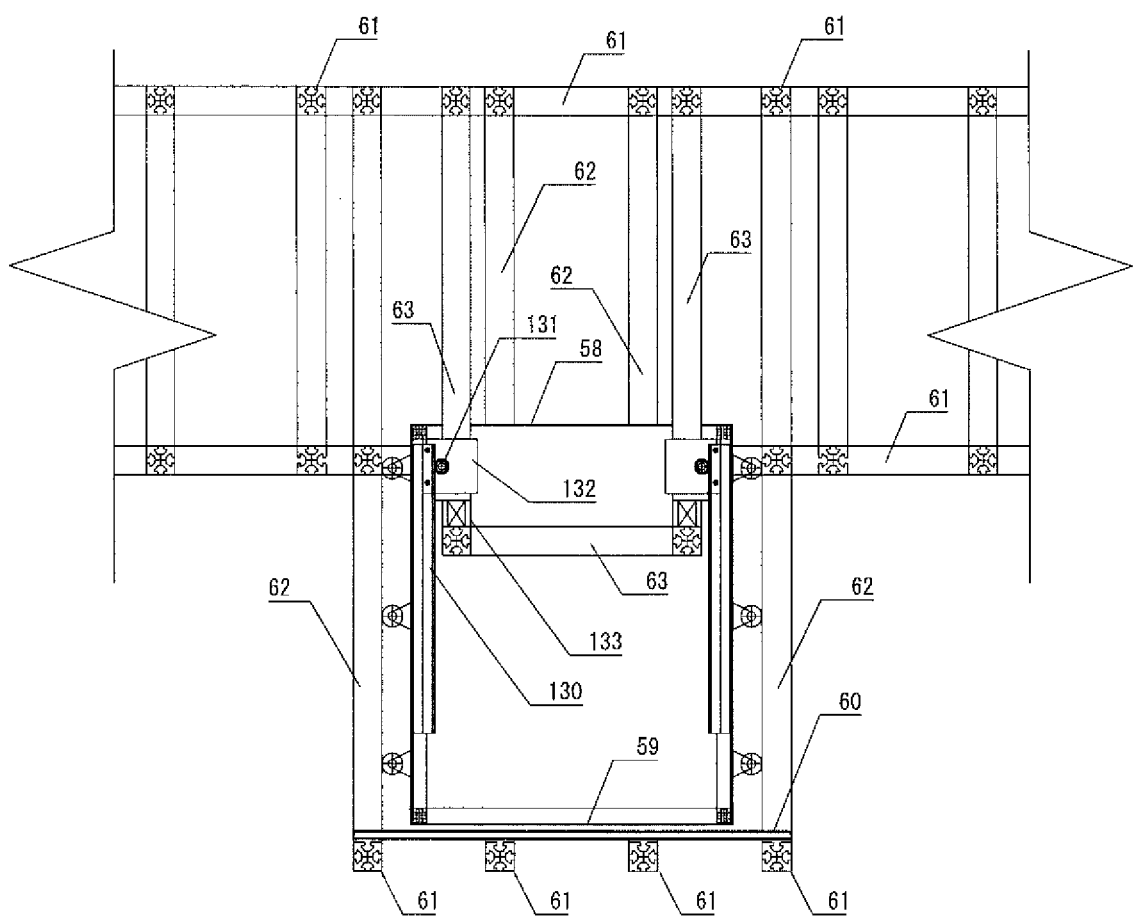

FIG. 29 shows a figure that power generation buoy assembly stops at the lower end stopper using the references of (158) Power generation buoy assembly, (159) Bottom surface, (160) Lower end stopper, (161) Unit frame, (162) Slide frame, (163) Pinion system support frame, (1130) Rack gear, (1131) Pinion gear, (1132) Gearbox, and (1133) Damper.

Figure 30:
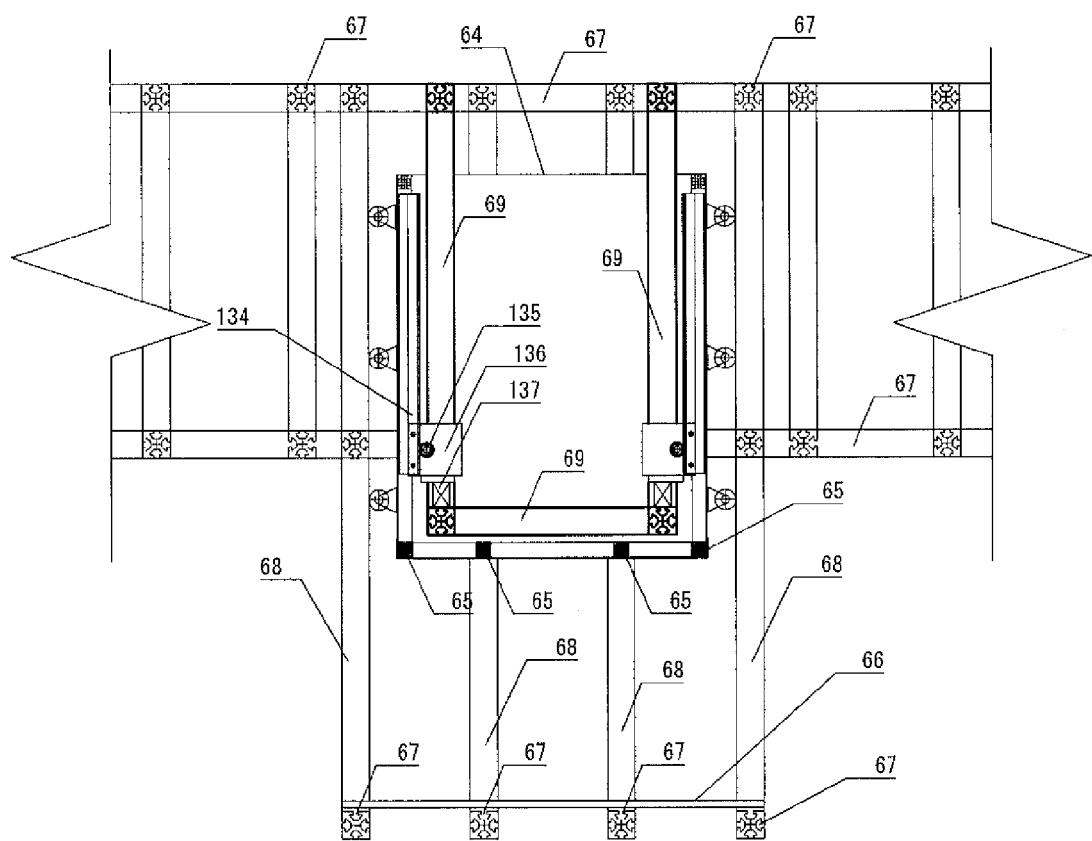

FIG. 30 shows a figure that power generation buoy assembly stops at the upper end stopper (Pinion support frame) using the references of (164) Power generation buoy assembly, (165) Buoy frame, (166) Lower end stopper, (167) Unit frame, (168) Slide frame, (169) Pinion system support frame, (1134) Rack gear, (1135) Pinion gear, (1136) Gearbox, and (1137) Damper.

Figure 31:
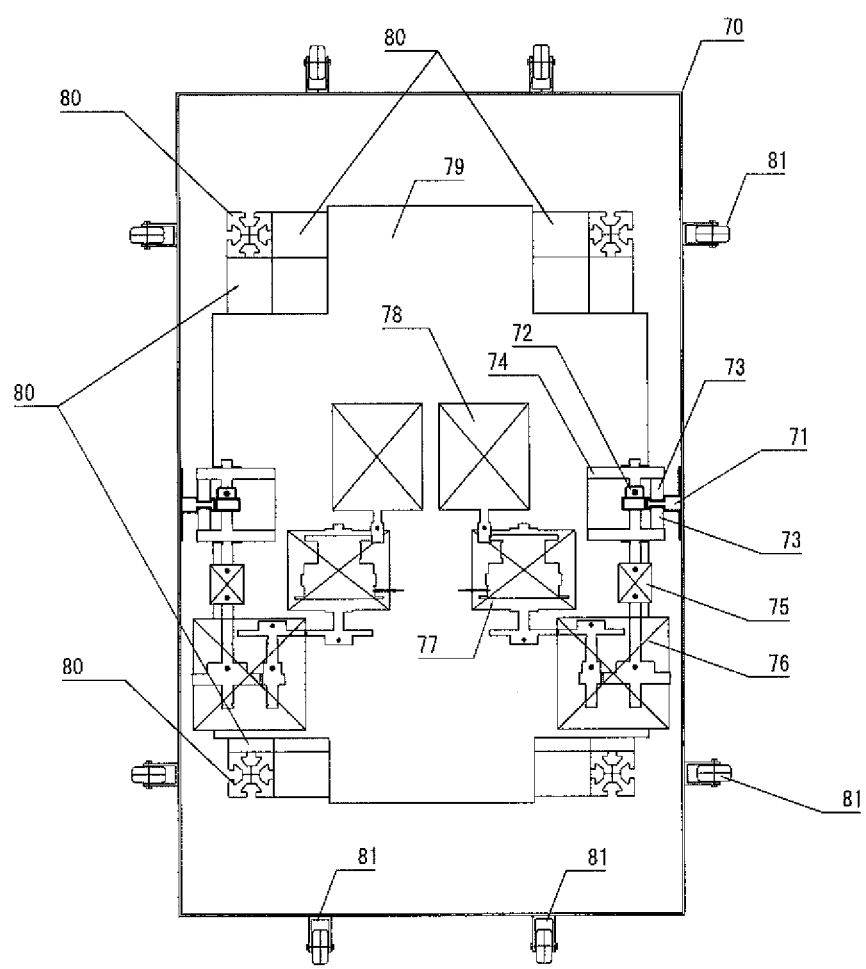

FIG. 31 shows a figure of power generation system placed in the power generation buoy using the references of (170) Power generation buoy assembly, (171) Rack gear, (172) Pinion gear, (173) Slide bearing, (174) Gearbox, (175) Universal joint, (176) Relay gearbox, (177) Electromagnetic clutch, (178) Generator, (179) Power generation device support board, (180) Pinion system support frame, and Guide roller (181).

Figure 32:
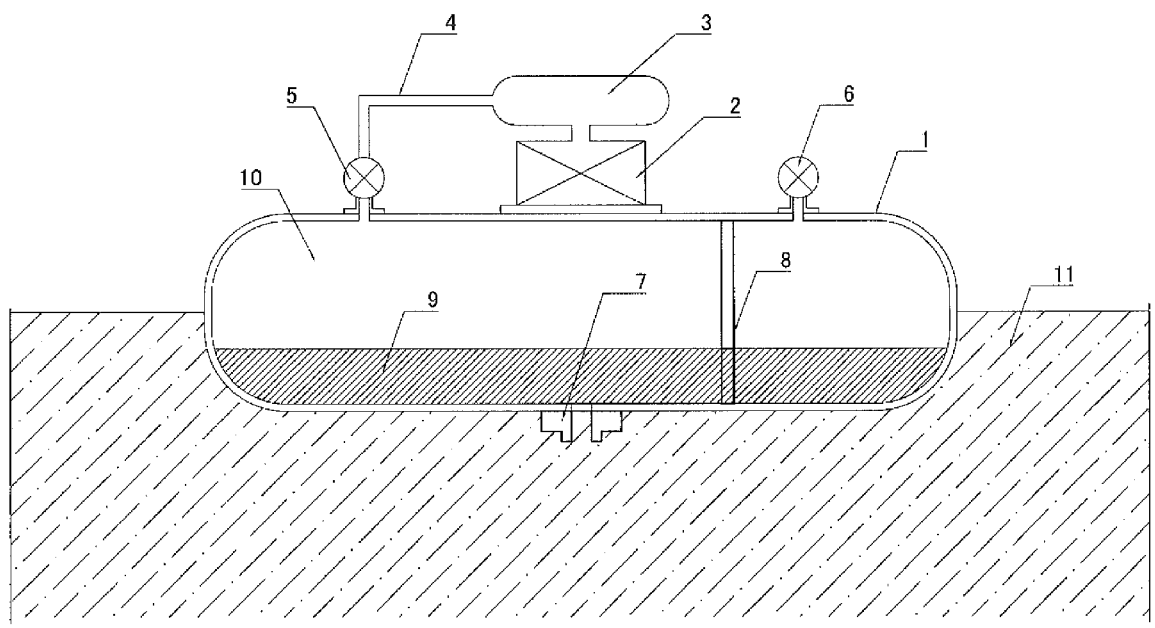

FIG. 32 shows a cross section of unit float system of power generation unit in the sea using the references of (201) Unit Float, (202) Air Compressor, (203) Air Tank, (204) Air Pipe, (205) Compressed Air Open/Close Valve, (206) Float Air Open/Close Valve, (207) Seawater Open Valve, (208) Water Gauge, (209) Inside Water, (210) Inside Air and (211) Seawater.

Figure 33:
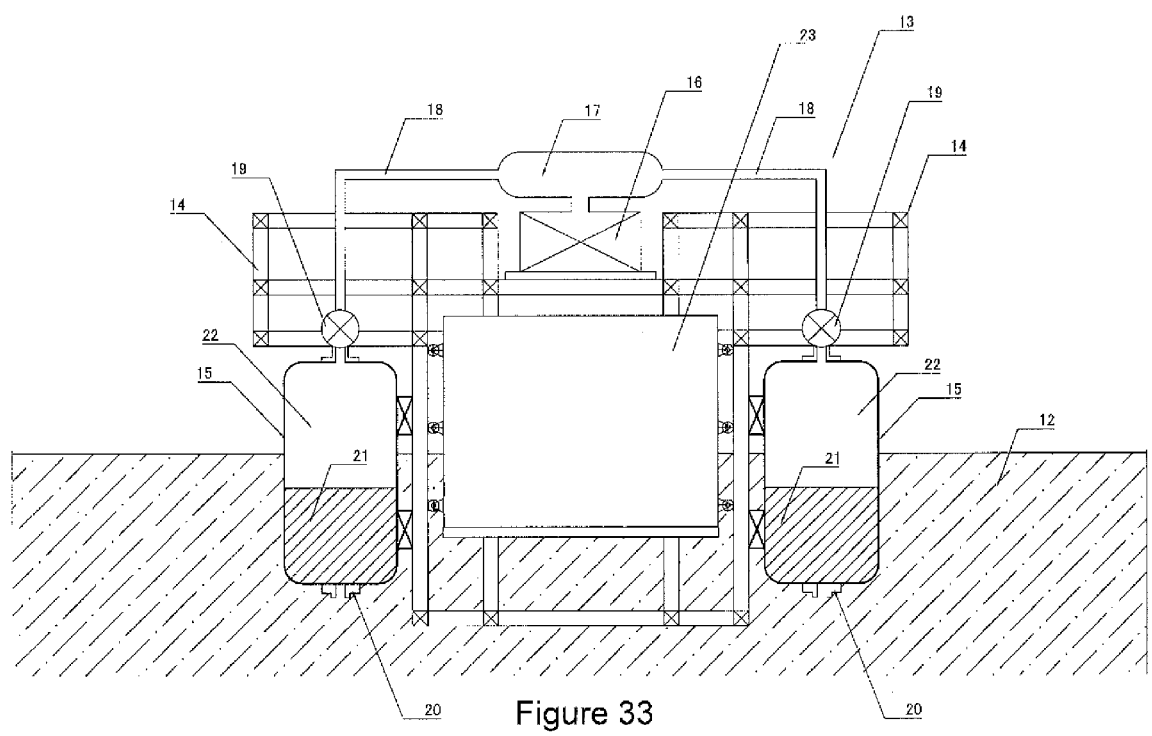

FIG. 33 shows a cross section of power generation unit in the sea using the references of (212) Seawater, (213) Power Generation Unit, (214) Unit Frame, (215) Unit Float, (216) Air Compressor, (217) Air Tank, (218) Air Pipe, (219) Air Valve, (220) Seawater Valve, (221) Inside Water, (222) Inside Air and (223) Power Generation Buoy Assembly.

Figure 34:
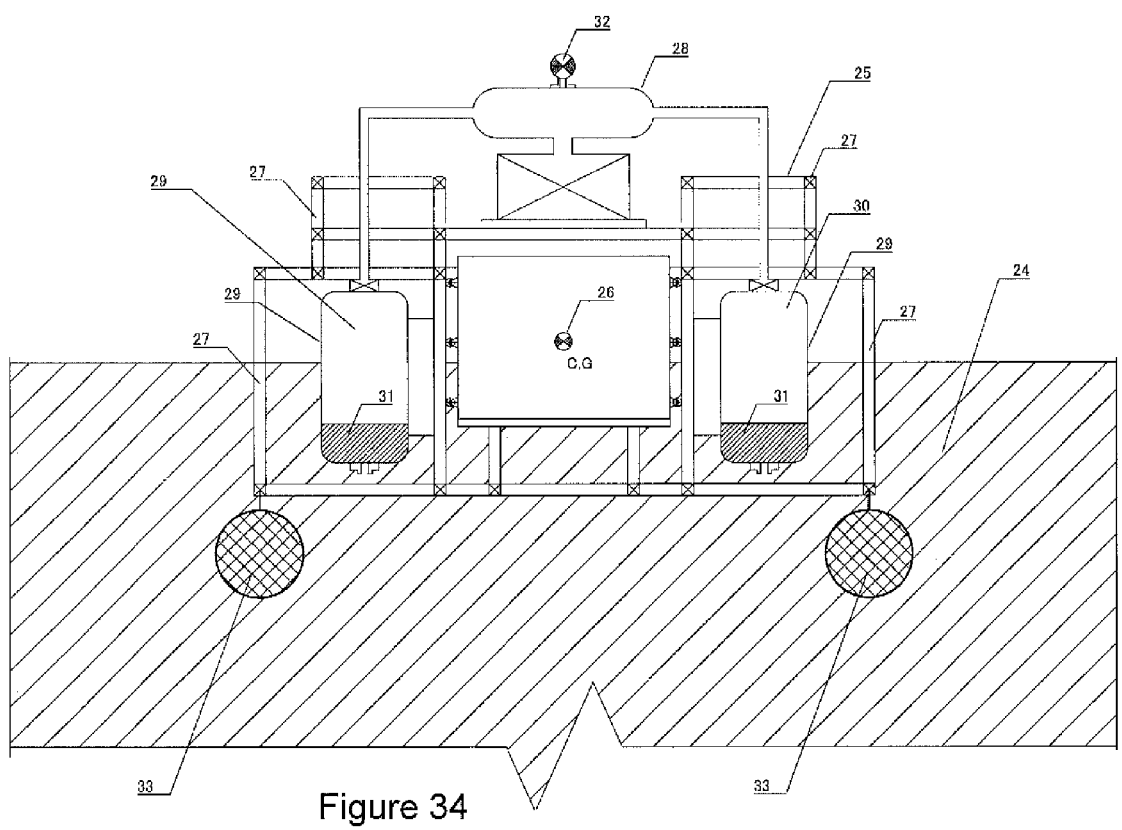

FIG. 34 shows a cross section of a power generation unit with a unit posture stability mechanism in the sea using the references of (224) Seawater, (225) Power Generation Unit, (226) Center of Gravity, (227) Unit Frame, (228) Air Compressor system, (229 Unit Float Assembly, (230) Inside Air, (231) Inside Water, (232) Gyroscope and (233) Balance Weight.

Figure 35:
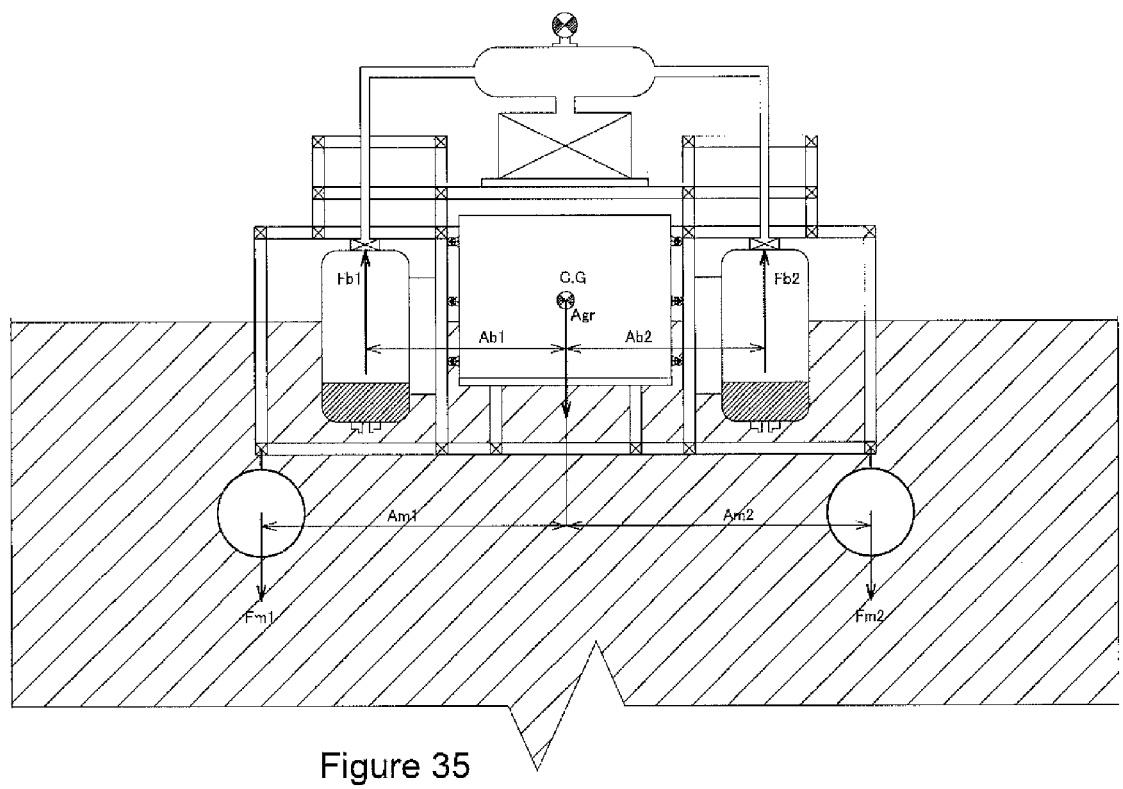

FIG. 35 shows a figure where a power generation unit equipped a unit posture stability mechanism is horizontal with stability in the sea, using the references of (C.G) Center of Gravity, (Fgr) Gravity Force, (Agr) Moment Arm of Gravity, (Fb1) Buoyancy Force of Float-1, (Ab1) Moment Arm of Float-1, (Fb2) Buoyancy Force of Float-2, (Ab2) Moment Arm of Float-2, (Fm1) Weight Force of Balance Weight-1, (Am1) Moment Arm of Balance Weight-1, (Fm2) Weight Force of Balance Weight-2 and (Am2) Moment Arm of Balance Weight-2.

Figure 36:
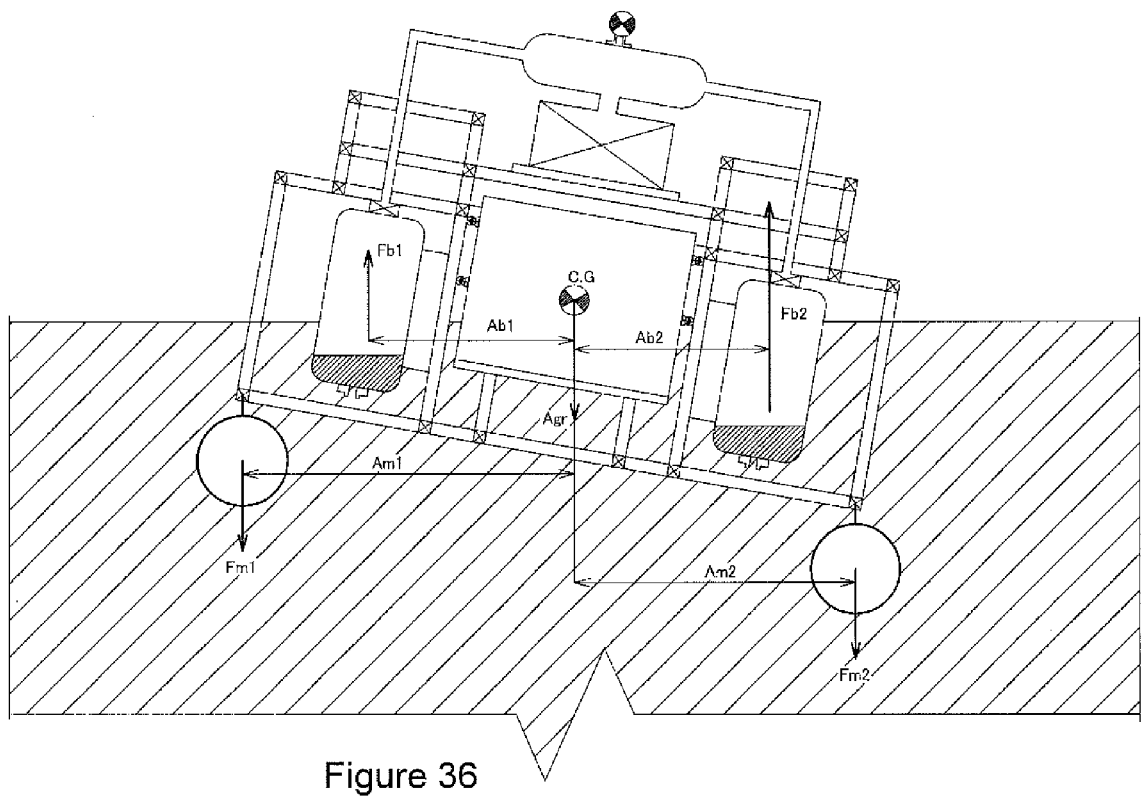

FIG. 36 shows a figure where a power generation unit equipped a unit posture stability mechanism inclined to right in the sea, using the references of (C.G) Center of Gravity, (Fgr) Gravity Force, (Agr) Moment Arm of Gravity, (Fb1) Buoyancy Force of Float-1, (Ab1) Moment Arm of Float-1, (Fb2) Buoyancy Force of Float-2, (Ab2) Moment Arm of Floa-2, (Fm1) Weight Force of Balance Weight-1, (Am1) Moment Arm of Balance Weight-1, (Fm2) Weight Force of Balance Weight-2 and (Am2) Moment Arm of Balance Weight-2.

Figure 37:
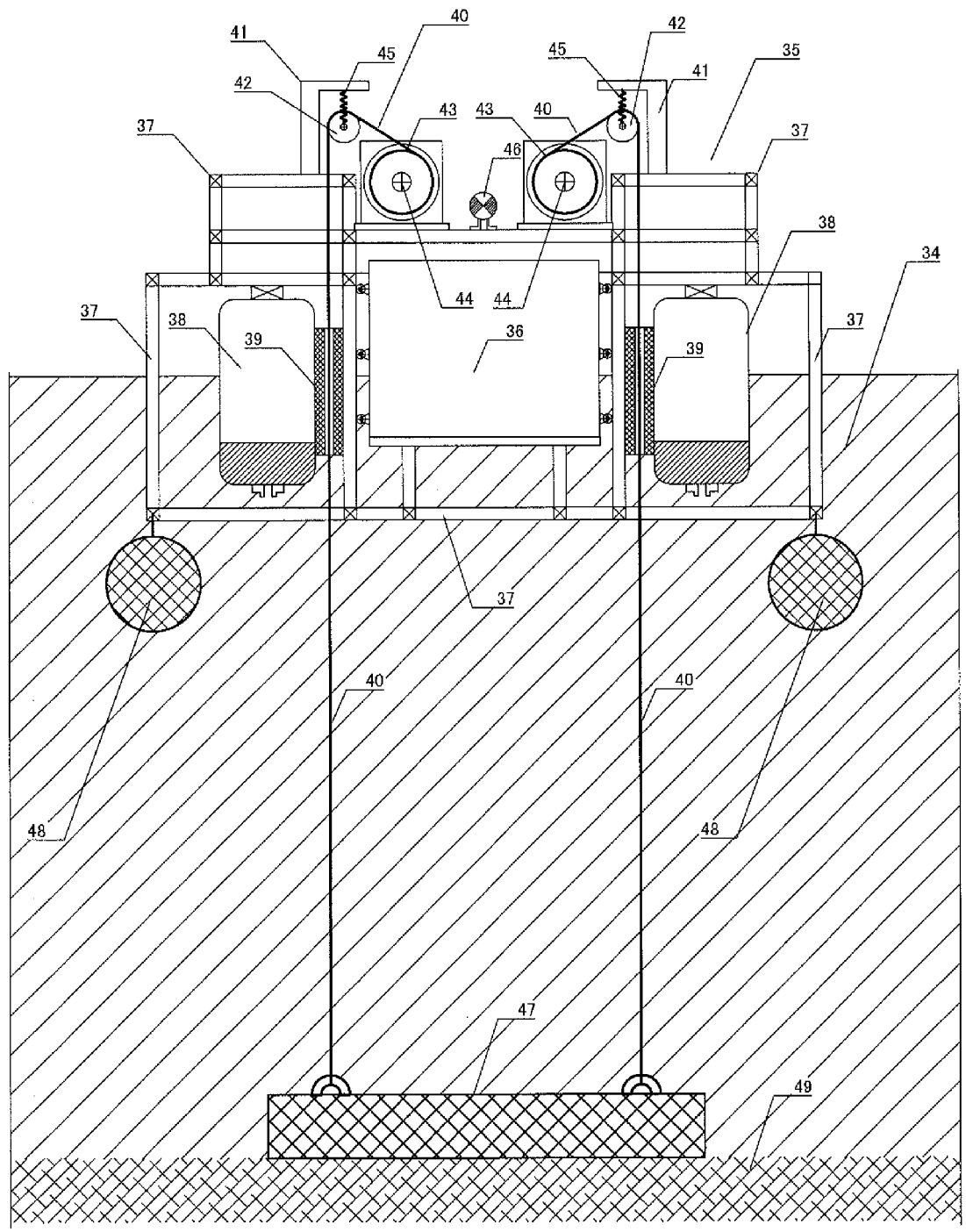

FIG. 37 shows a cross section of power generation unit with unit anchor system in the sea using the references of (234) Seawater, (235) Power Generation Unit, (236) Power Generation Buoy Assembly, (237) Unit Frame, (238) Unit Float Assembly, (239) Unit Float Support, (240) Anchor Cable, (241) Cable Tension Support, (242) Cable Tension Pulley, (243) Cable Drum, (244) Cable Motor, (245) Cable Tension Spring, (246) Gyroscope, (247) Anchor Weight Block, (248) Balance Weight and (249) Sea Bottom.

Figure 38:
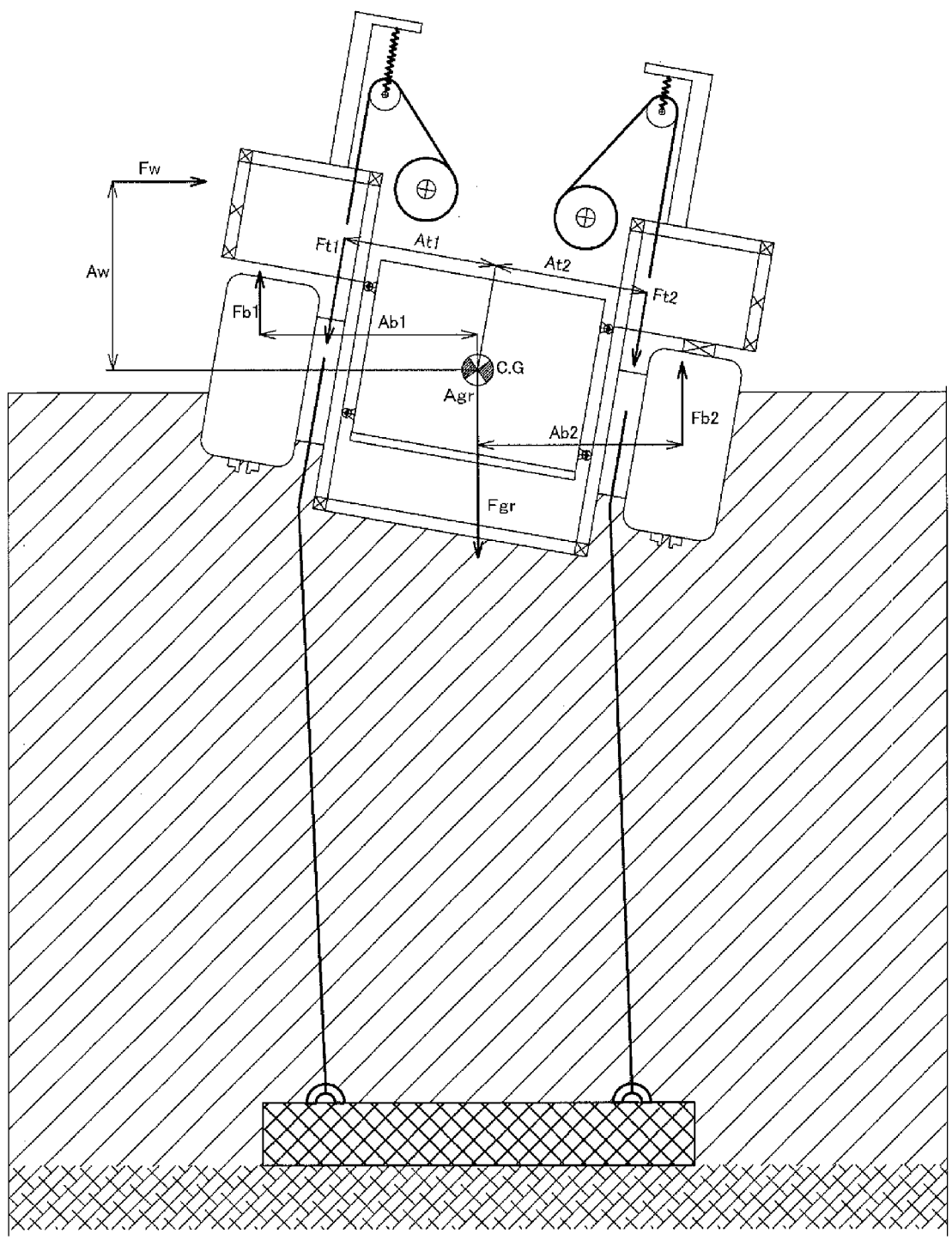

FIG. 38 shows a figure where a power generation unit equipped a unit anchor system is inclined to right by the wind in the sea, using the references of (C.G) Center of Gravity, (Fgr) Gravity Force, (Agr) Moment Arm of Gravity, (Fb1) Buoyancy Force of Float-1, (Ab1) Moment Arm of Float-1, (Fb2) Buoyancy Force of Float-2, (Ab2) Moment Arm of Floa-2, (Ft1) Tension Force of Cable-1, (At1) Moment Arm of Cable-1, (Ft2) Tension Force of Cable-2, (At2) Moment Arm of Cable-2, (Fw) Wind Force and (Aw) Moment Arm of Wind Force.

Figure 39:
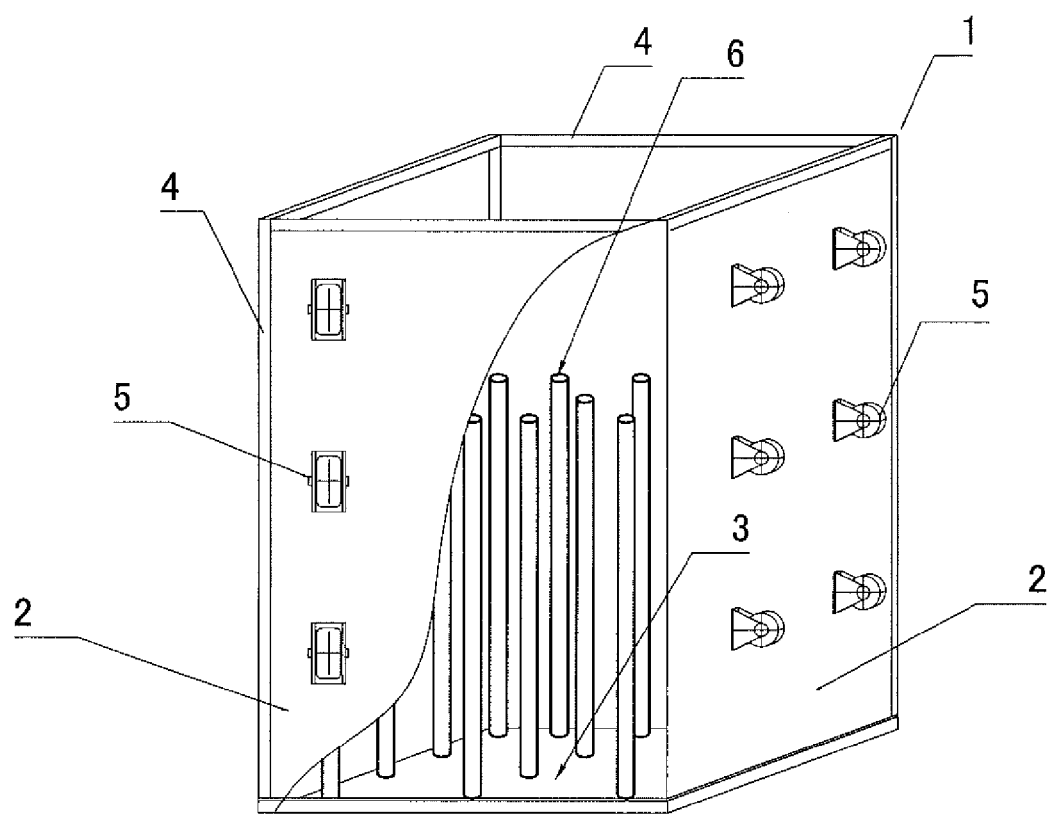

FIG. 39 shows a power generation buoy of direct coil method using the references of (301) Power Generation Buoy Assembly, (302) Side Surface, (303) Bottom Surface, (304) Buoy Frame, (305) Guide Rollers, and (306) Bar Magnets.

Figure 40:
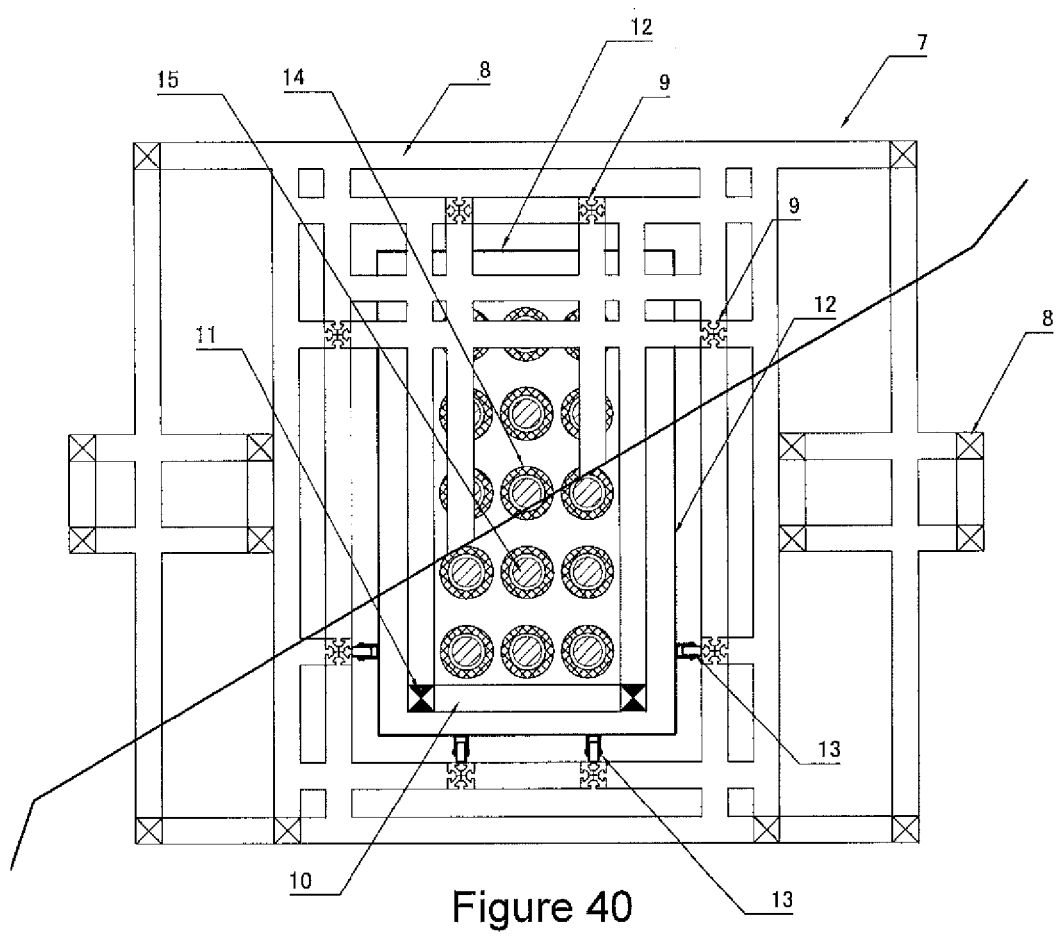

FIG. 40 shows a figure where power generation buoy of direct coil method is seen right above using the references of (307) Power Generation Unit Assembly, (308) Power Generation Unit Frame, (309) Slide Frame, (310) Coil Support Horizontal Base, (311) Coil Support Perpendicular Frame, (312) Power Generation Buoy Assembly, (313) Guide Roller, (314) Magnet Coil and (315) Bar Magnet.

Figure 41:
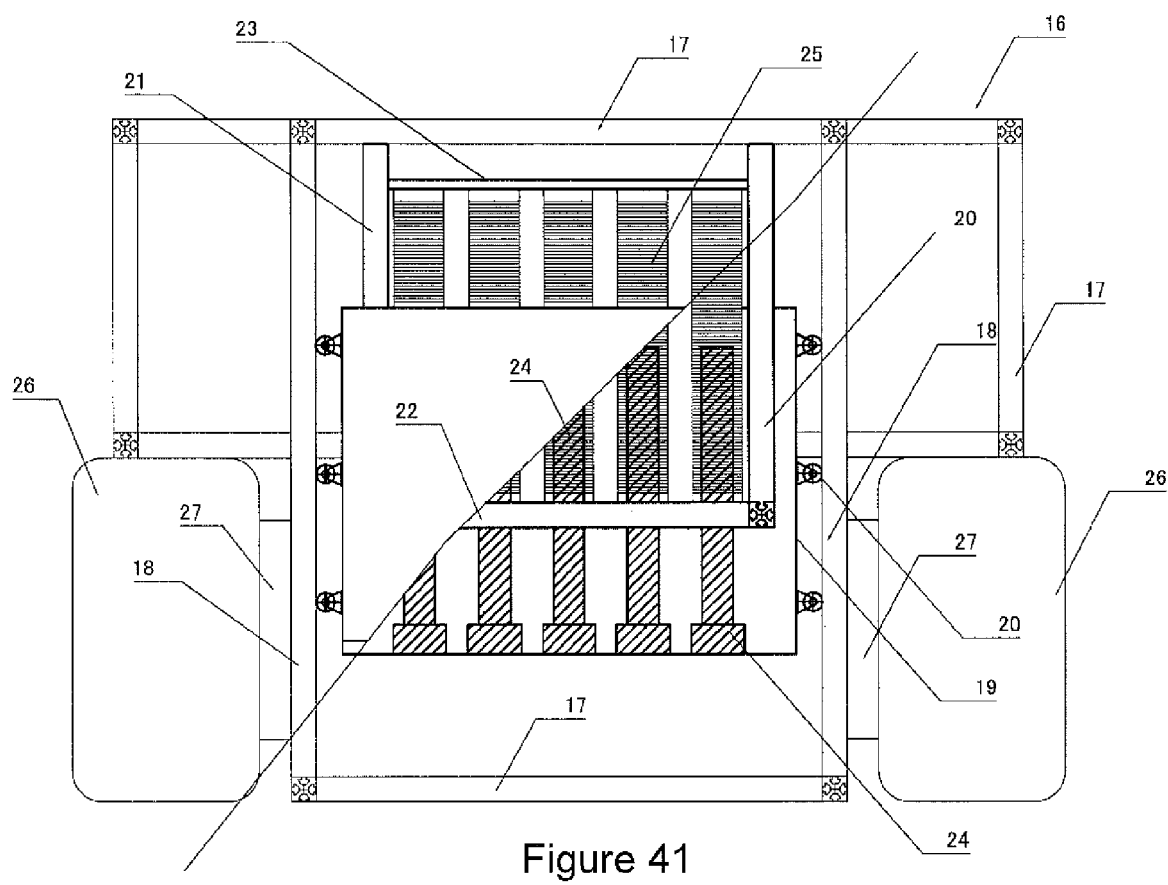

FIG. 41 shows a figure where power generation buoy of direct coil method is seen in center position by front chart, using the references of (316) Power Generation Unit Assembly, (317) Power Generation Unit Frame, (318) Slide Frame, (319) Power Generation Buoy Assembly, (320) Guide Roller, (321) Coil Support Perpendicular Frame, (322) Coil Support Horizontal Base, (323) Coil Support Horizontal Upper, (324) Bar Magnet, (325) Magnet Coil, (326) Float Chamber and (327) Float Camber Connection.

Figure 42:
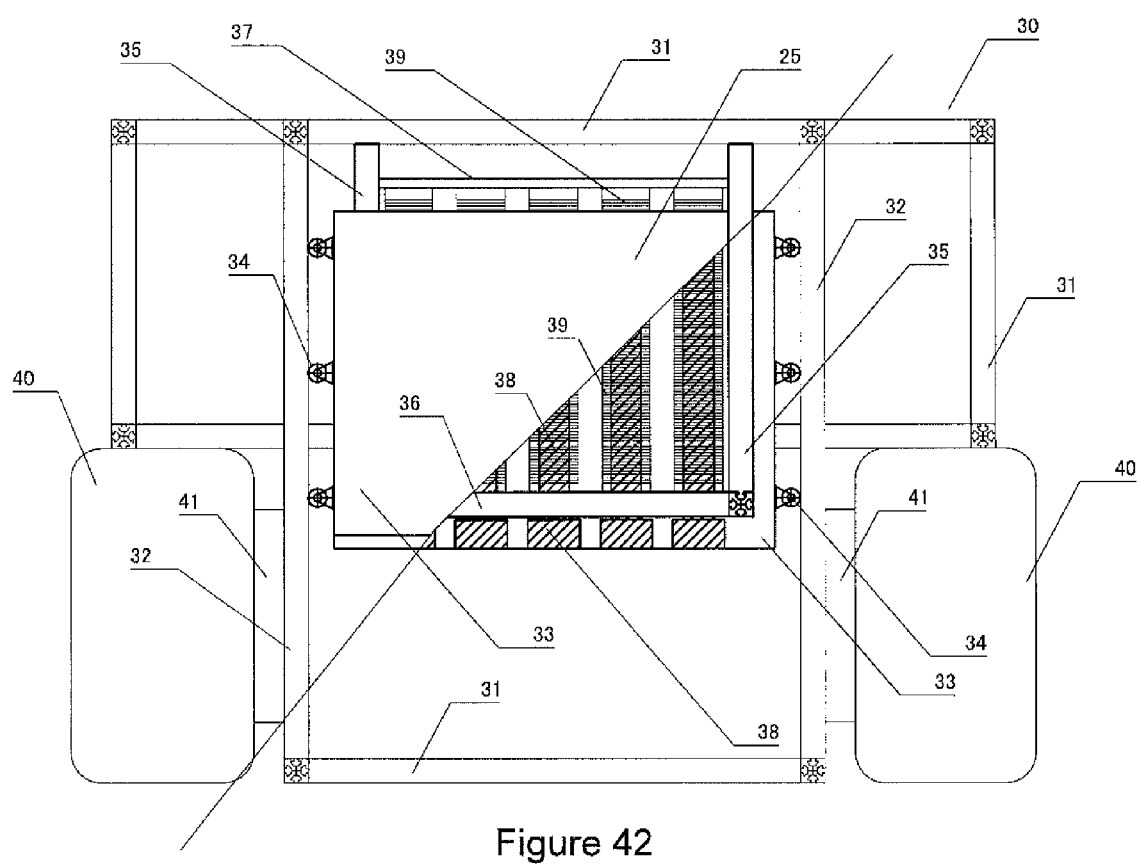

FIG. 42 shows a figure where power generation buoy of direct coil method is seen in upper position by front chart, using the references of (330) Power Generation Unit Assembly, (331) Power Generation Unit Frame, (332) Slide Frame, (333) Power Generation Buoy Assembly, (334) Guide Roller, (335) Coil Support Perpendicular Frame, (336) Coil Support Horizontal Base, (337) Coil Support Horizontal Upper, (338) Bar Magnet, (339) Magnet Coil, (340) Float Chamber and (341) Float Camber Connection.

Figure 43:
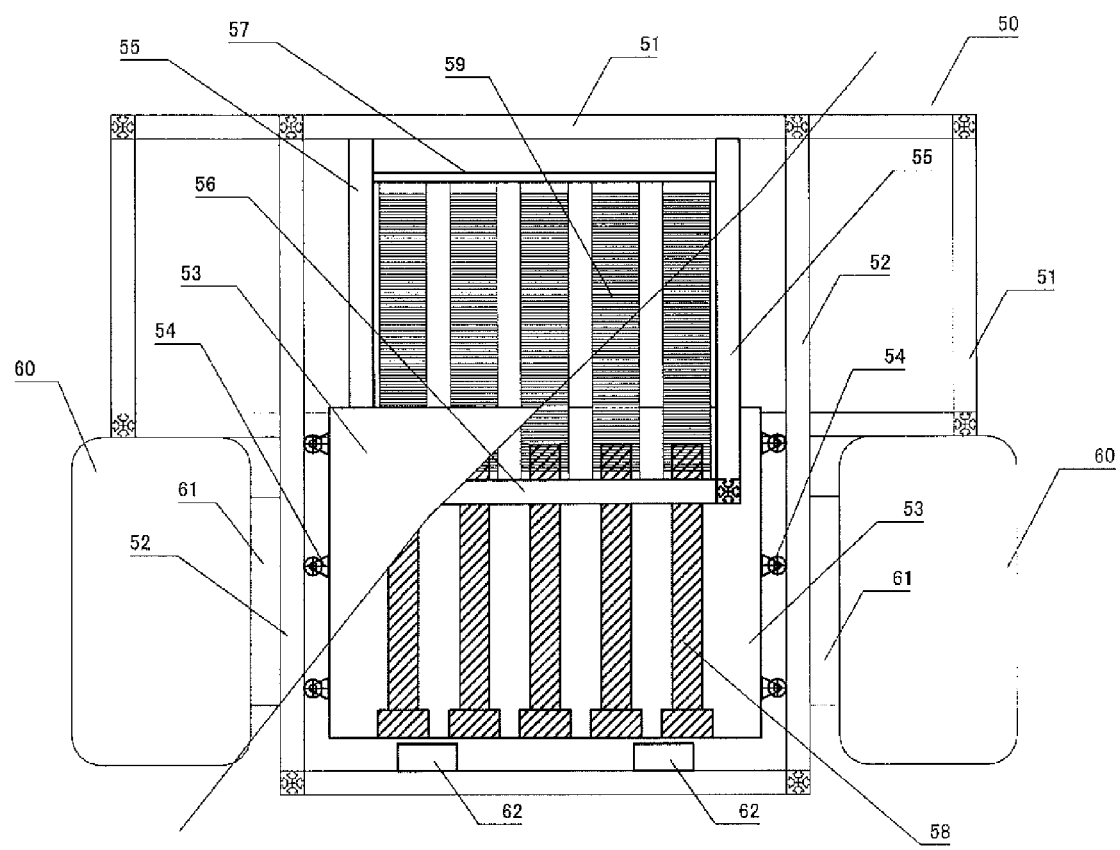

FIG. 43 shows a figure where power generation buoy of direct coil method is seen in lower position by front chart, using the references of (350) Power Generation Unit Assembly, (351) Power Generation Unit Frame, (352) Slide Frame, (353) Power Generation Buoy Assembly, (354) Guide Roller, (355) Coil Support Perpendicular Frame, (356) Coil Support Horizontal Base, (357) Coil Support Horizontal Upper, (358) Bar Magnet, (359) Magnet Coil, (360) Float Chamber, (361) Float Camber Connection and (362) Lower End Stopper.

Figure 44:
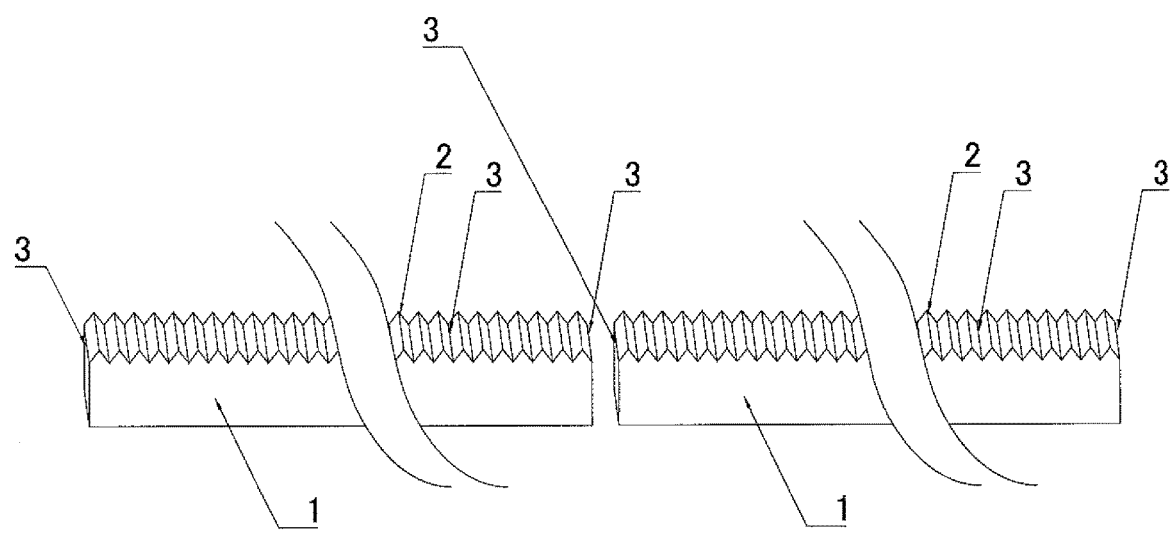

FIG. 44 shows a rack gear for connection continuously in straight line using the references of (401) Rack Gear, (402) Mountain Teeth and (403) Valley Teeth.

Figure 45:
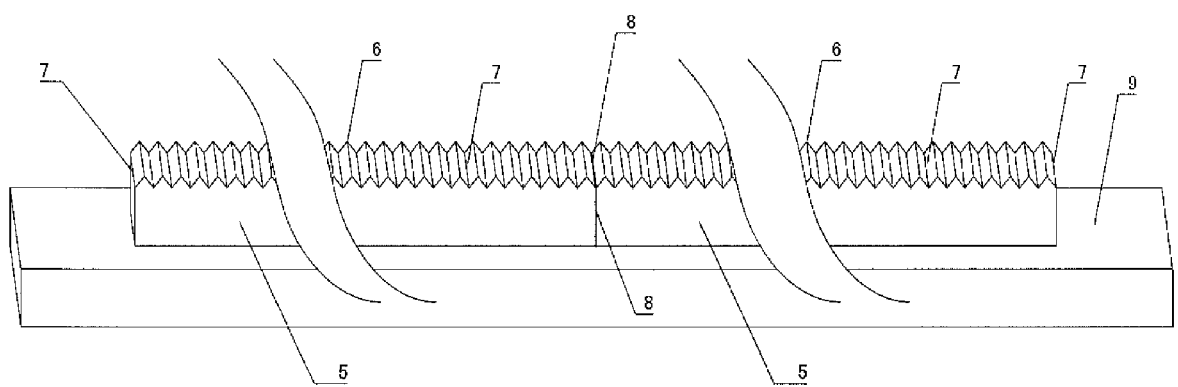

FIG. 45 shows a rack gear & base block assembly using the references of (405) Rack Gear, (406) Mountain Teeth, (407) Valley Teeth, (408) Connection Line and (409) Base Block.

Figure 46:
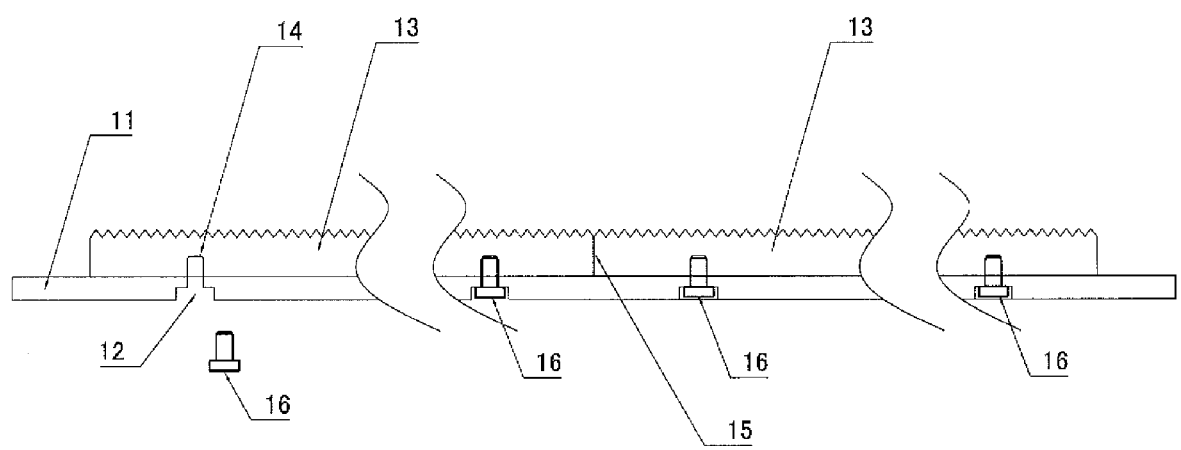

FIG. 46 shows a rack gear & base block assembly cross sectional side view using the references of (411) Base Block, (412) Penetration Hole, (413) Rack Gear, (414) Tap Hole, (415) Connection Line and (416) Connection Bolt.

Figure 47:
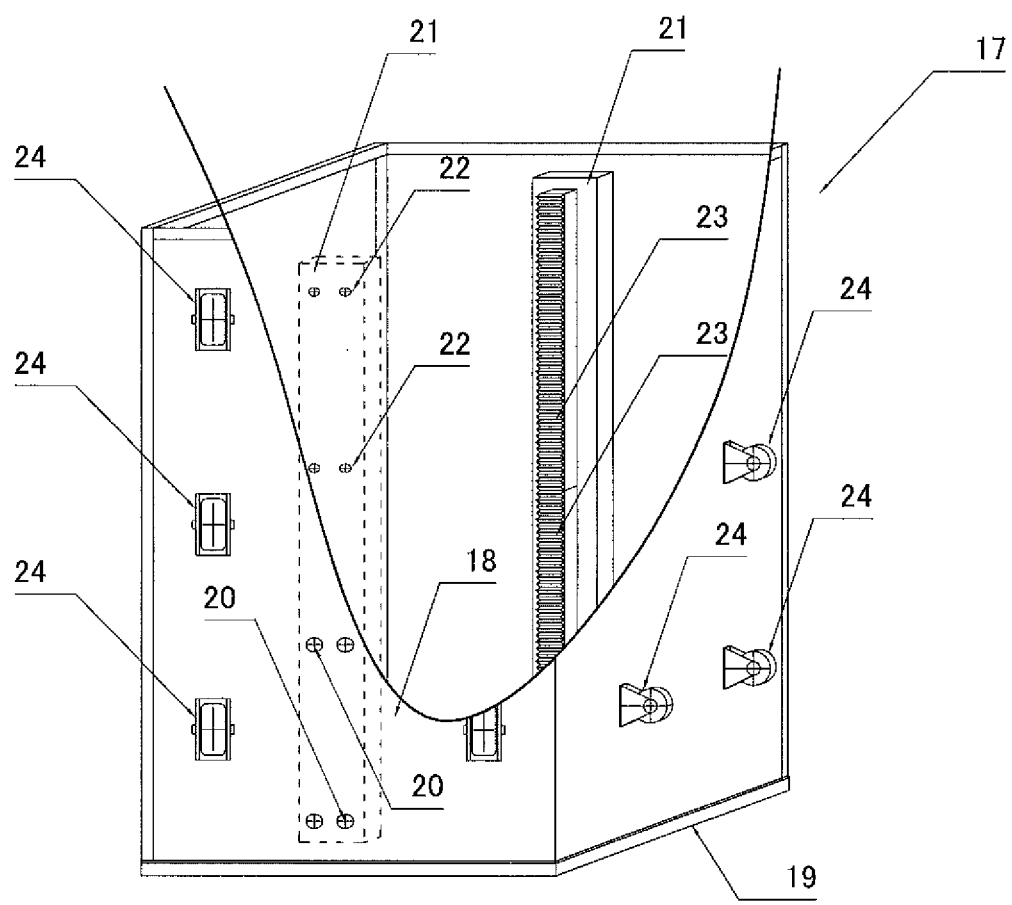

FIG. 47 shows a power generation buoy assembly with long rack gear method, using the references of (417) Power Generation Buoy Assembly, (418) Side Hull, (419) Bottom Hull, (420) Installation Bolt (421) Base Block, (422) Tap Hole, (423) Rack Gear and (424) Guide Roller.

DESCRIPTION OF THE PREFERRED EMBODIMENTS

Referring to the drawings as outlined hereinabove, the following explains the form of concrete execution of the manufacturing process of power generation buoy and explains a wave activated power generation system by a rack and pinion mechanism.

Figure 1:
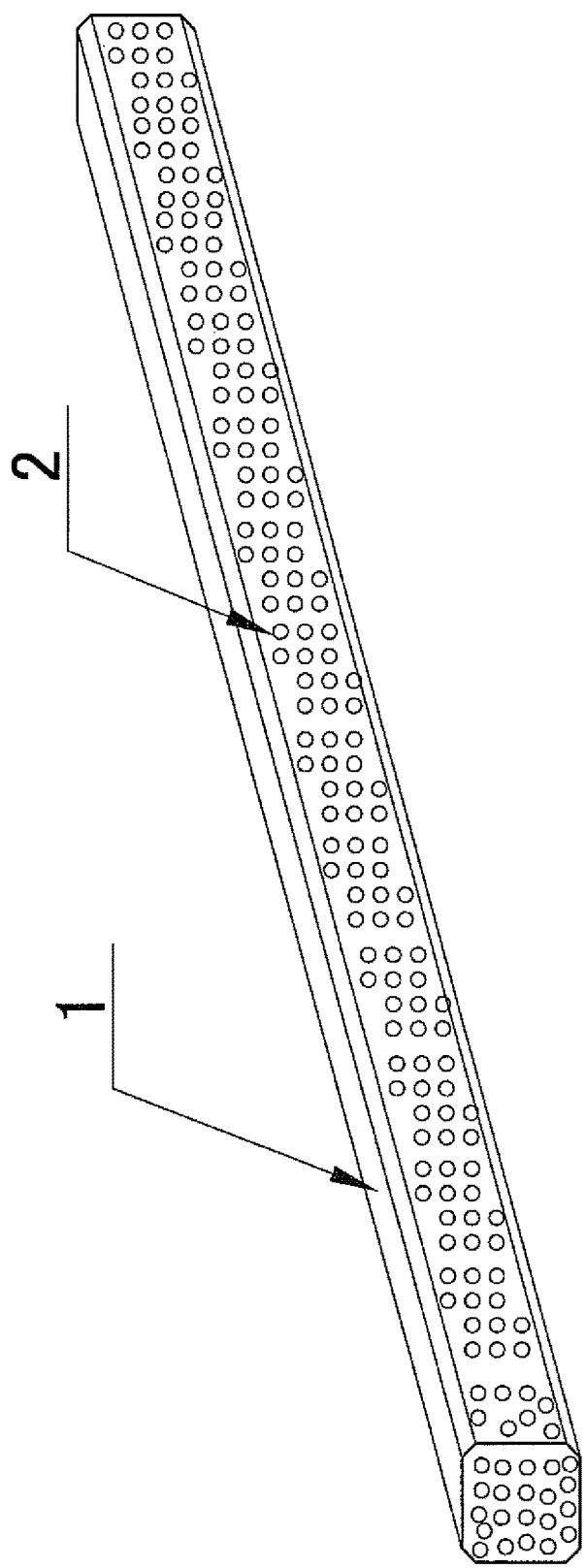
FIG. 1 shows a square pillar internal pressure device using the references of (1) square pillar internal pressure device, and (2) beads of styrene foam.

In a first embodiment of the invention, FIG. 1 shows a square pillar internal pressure device. The square pillar internal pressure device (1) is made from heatproof plastic tube and it has enough length and it encloses beads of styrene foam (2). As for the both ends of square pillar internal pressure device (1), they are sealed lightly to prevent the beads of styrene foam (2) dropping off from (1). The seal is not shown in the figure.

The square pillar internal pressure device (1) can be made from the tube of heatproof plastic material, so the length of the internal pressure device (1) is arbitrary. The beads of the styrene foam (2) are foamed by heat and the pressure of steam.

The reasons why every corner of the square pillar internal pressure device is chamfered are as follows:
  A. It is difficult to manufacture the corner part of plastic squarely when the product is manufactured from the metal mold of pushing out or blowing process.
  B. It is impossible to press every corner of the square pillar internal pressure device when internal pressure expands the internal pressure device.
    (a) The internal pressure expands the internal pressure device roundly like the cylinder.
    (b) Therefore, the internal pressure device cannot pressurize the corner edge.
  C. Every four corners of the FRP pillar material are pressurized with a thermal expansion solid resin.
    (a) The powder, which generates the bubble by heating, is kneaded to the heat foam resin.
    (b) When the heat foam powder is heated, the powder generates a large amount of small bubbles.
    (c) A large amount of small bubbles swells within the resin, and expands the heat foam resin,
    (d) As for the heat foam resin, a polyethylene system resin or a polypropylene system resin is selected.
    (e) Those resins have the strength by which a large amount of small bubbles can be maintained at the high temperature.

Figure 2:
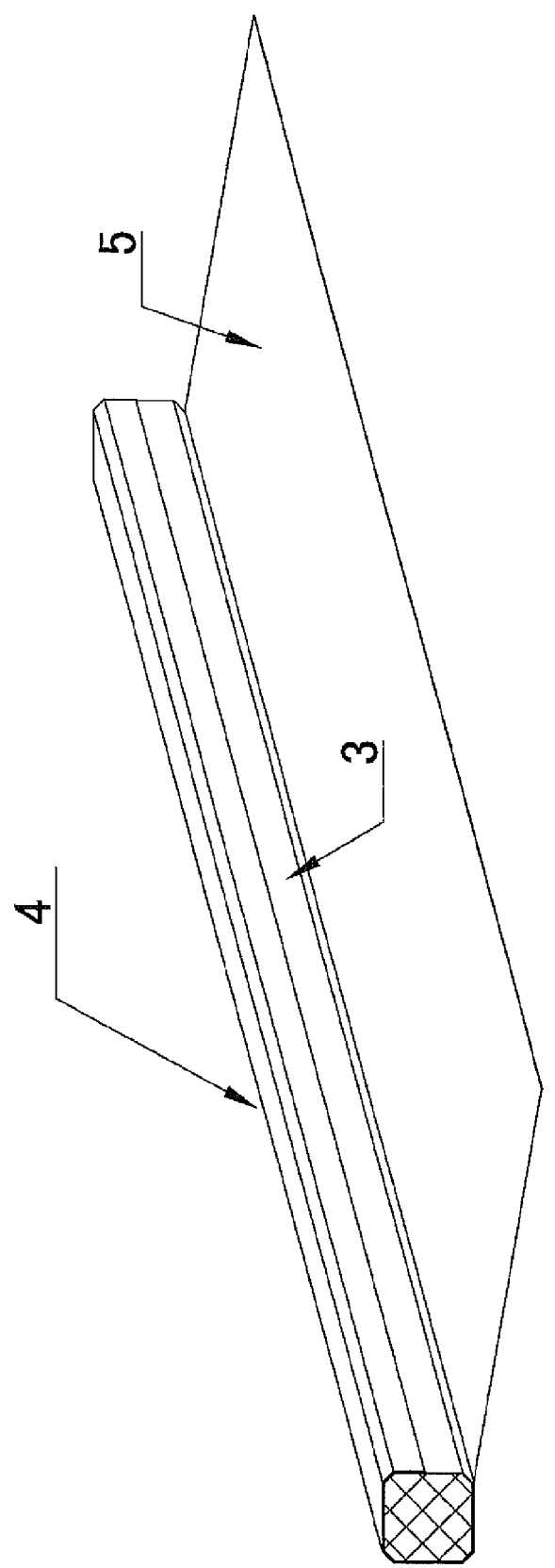
FIG. 2 shows a square pillar internal pressure device assembly that uses the references (3) square pillar internal pressure device, (4) square pillar internal pressure device assembly, and (5) soft FRP prepreg.

FIG. 2 shows a square pillar internal pressure device assembly. The square pillar internal pressure device assembly (4) is manufactured by wrapping the external surface of square pillar internal pressure device (3) with a soft FRP prepreg (5) two or more times. The soft FRP prepreg (5) becomes the internal FRP wall of the FRP structure materials.

At room temperature, the soft FRP prepreg (5) is a wet soft cloth, so it is not difficult to wrap the square pillar internal pressure device (3) with the soft FRP prepreg (5). The adhesive of prepreg deteriorates at room temperature; it is preferable to preserve the product within the freezer at minus 5° C. or less.

Figure 3:
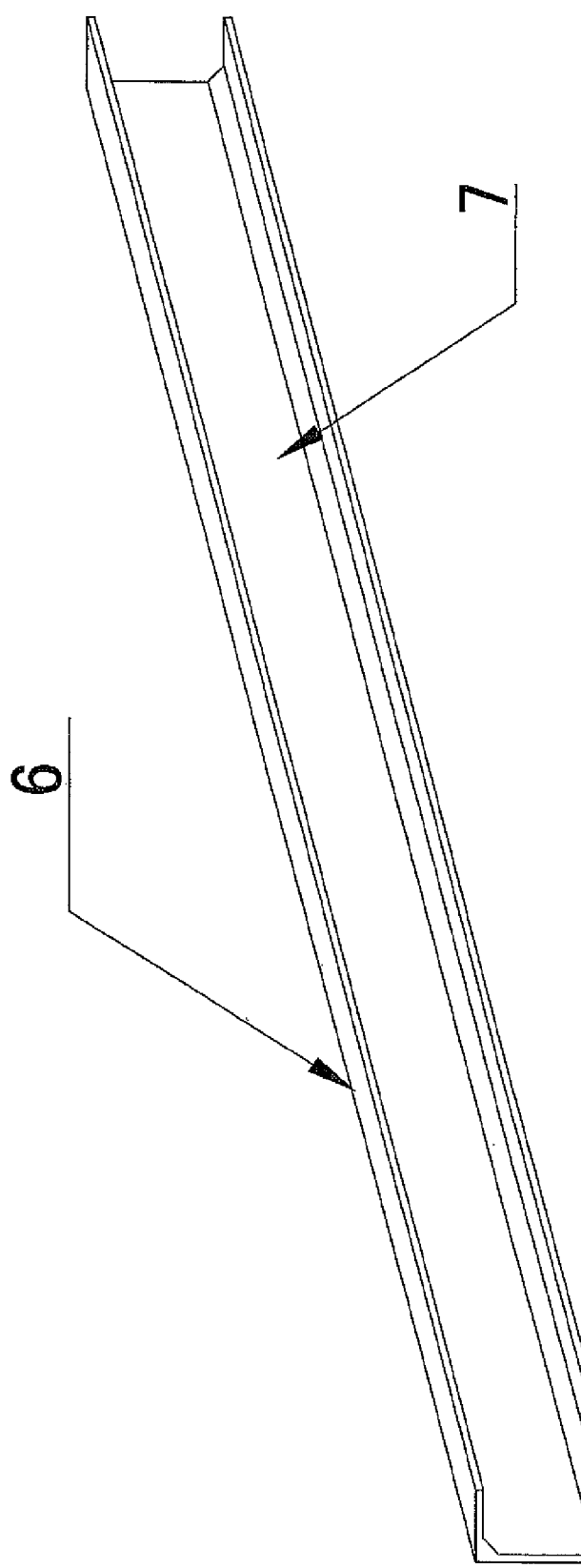
FIG. 3 shows a solid-type pressure device using the references (6) square solid-type pressure device of half cut, and (7) square vacant space of half cut.

FIG. 3 shows a solid-type pressure device. The solid-type pressure device of half cut (6) is made from the heat foam plastic resin by the metal mold of pushing out. It has the same length as the square pillar internal pressure device assembly and has square vacant space of half cut (7) inside it. As the solid-type pressure device can be manufactured by metal mold of pushing out, the length of the solid-type pressure device is arbitrary.

The reasons why a square solid pressure device is necessary are as follows.
  A. Because the pillars of FRP structure materials are manufactured by assembling the four square pillars, the size accuracy requested to a basic square pillar is severe.
  B. It is difficult to pressurize a square corner part by the internal pressure device.
    (a) The internal pressure device expands to the form of a cylinder.
  C. The solid pressure device can pressurize the corner part of a square pillar.
    (a) Because the solid pressure device is manufactured from the heat foam resin, the accuracy of the shape size is good.
    (b) The solid pressure device can make a lot of heat foam resins gather in a square corner part.
    (c) Big expansion pressure can be generated in a square corner part by a large amount of heat foam.

Figure 4:
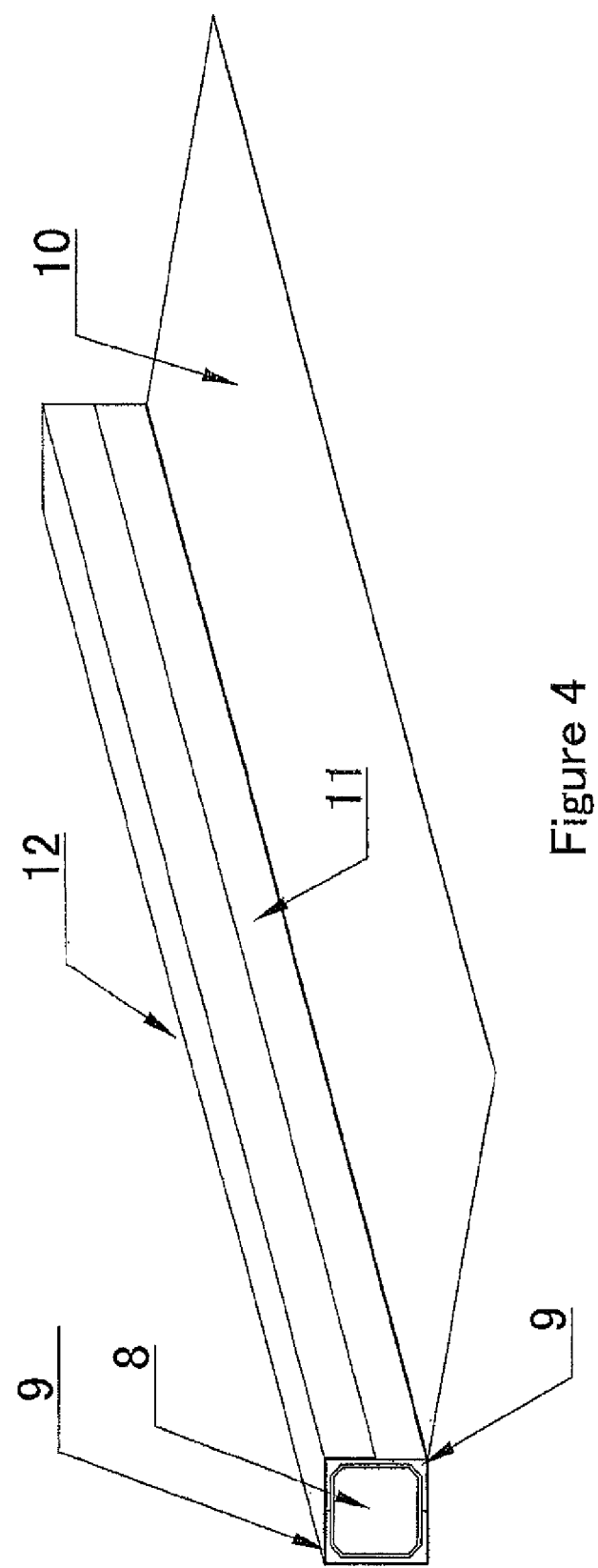
FIG. 4 shows a basic square pillar assembly using the references (8) square pillar internal pressure device assembly, (9) square solid-type pressure device of half cut, (10) soft FRP prepreg, (11) square solid-type pressure device, and (12) basic square pillar assembly.
Figures 8A, 8B, 8C, 8D, 8E:
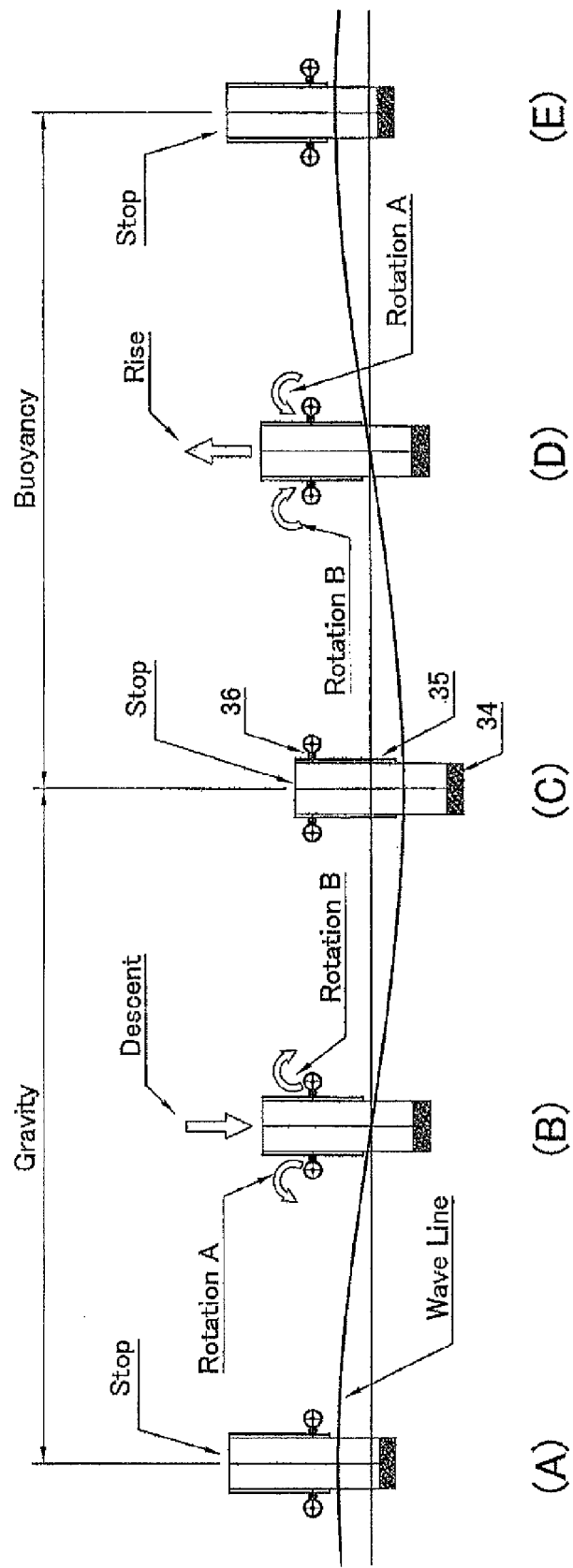
FIGS. 8A-8E show a image chart, which converts the vertical movement of the power generation buoy into the gyration by rack and pinion mechanism, with the references (34) power generation buoy, (35) rack gear and (36) pinion gear.
Figures 9A, 9B, 9C, 9D, 9E:
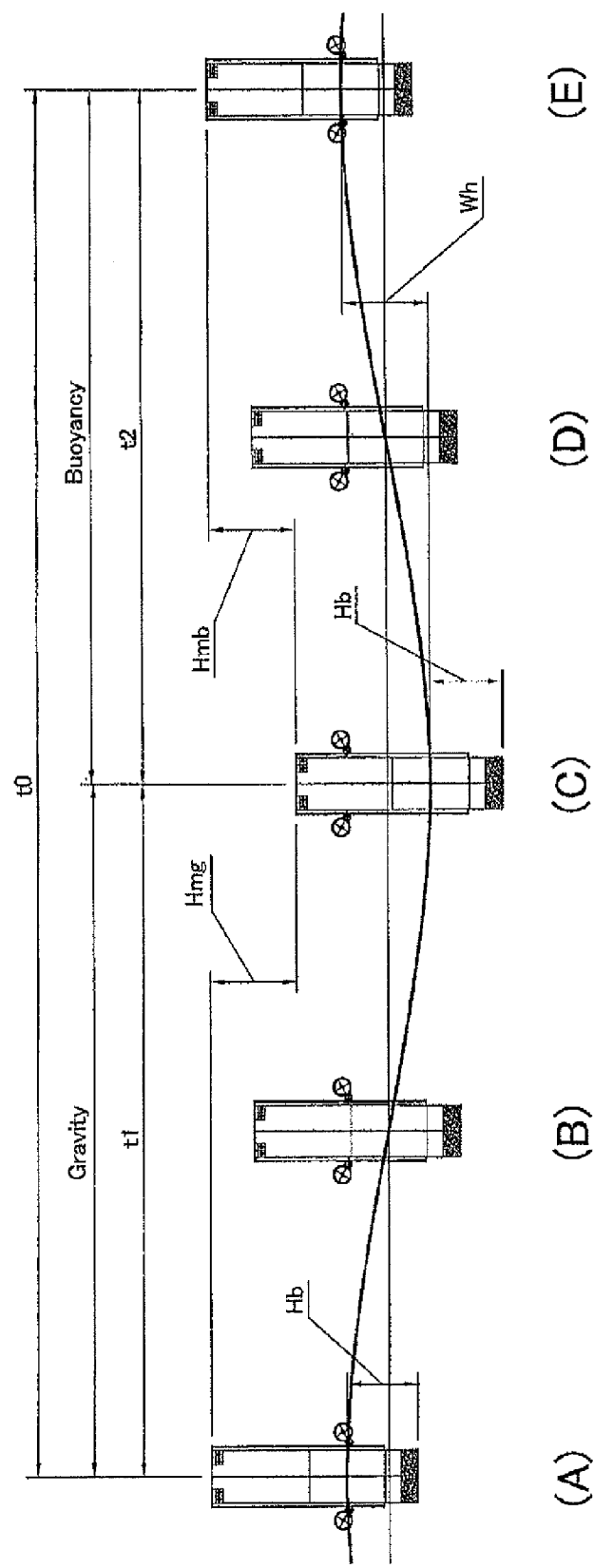
FIGS. 9A-9E show a free vibration chart of power generation buoy in 2500 mm height of ocean wave with the references (t0) cycle of wave, (t1) period of descent, (t2) period of rise, (Hmg) moving height by gravity, (Hmb) moving height by buoyancy, (Hb) depth of sinking by buoy weight and (Wh) wave height.
Figures 10A, 10B, 10C, 10D, 10E:
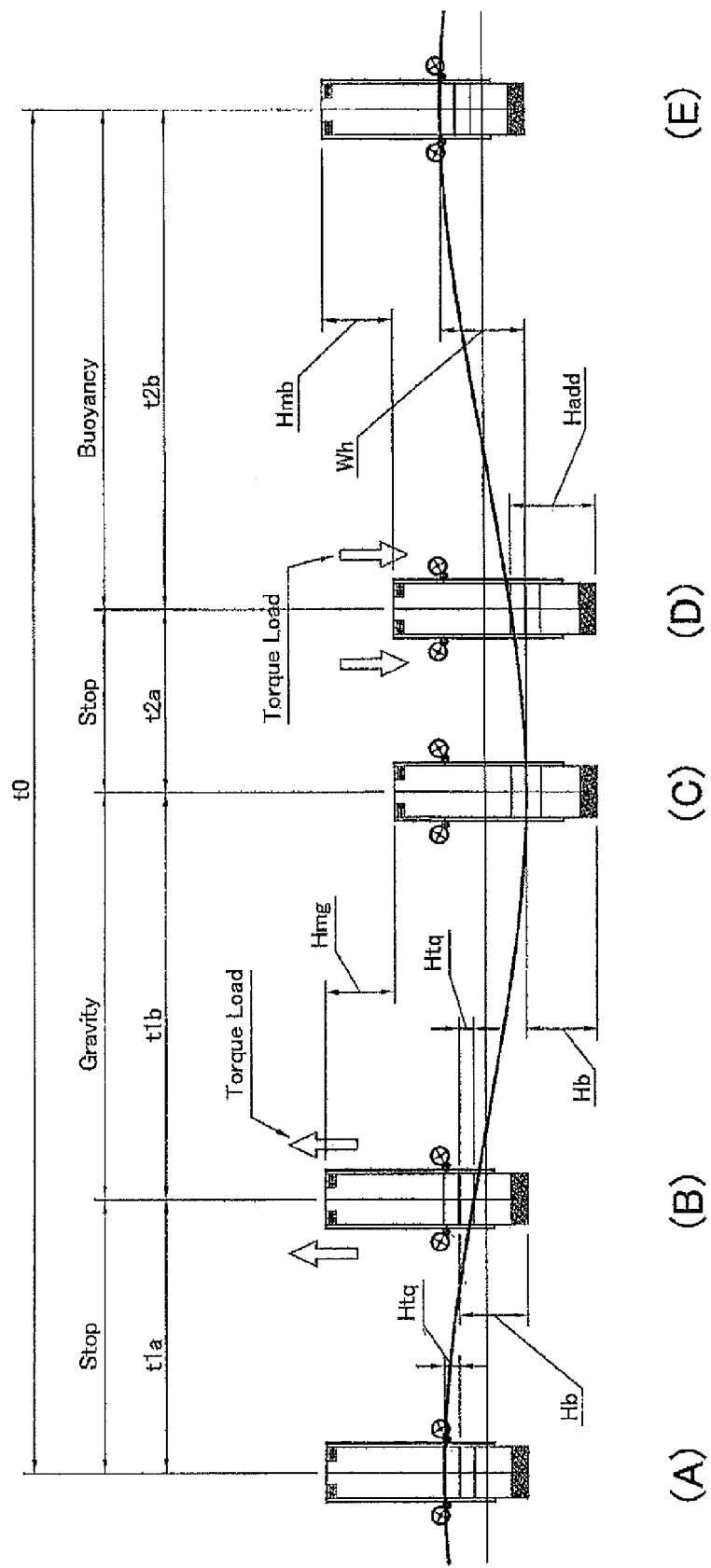
FIGS. 10A-10E show an image chart of the power generation buoy movement with torque load (1000 kgf) in 2500 mm height of ocean wave with the references (t0) cycle of wave, (t1a) period of stop in descent, (t1b) period of descent, (t2a) period of stop in rise, (t2b) period of rise, (Hmg) moving height by gravity, (Hmb) moving height by buoyancy, (Hb) depth of sinking by buoy weight, (Htq) depth of sinking by torque load, (Hadd) depth of sinking by buoy weight and torque load and (Wh) wave height.
Figures 11A, 11B, 11C, 11D, 11E, 11F:
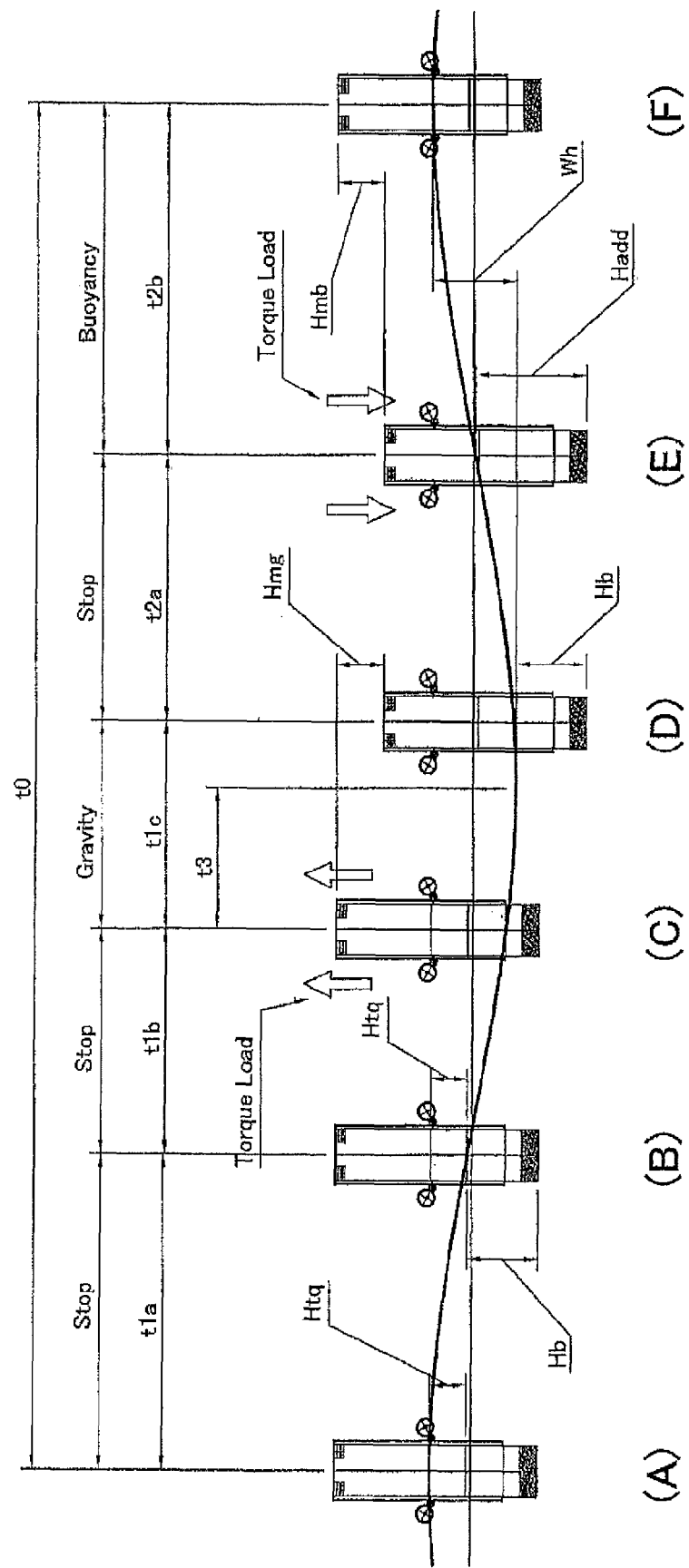
FIGS. 11A-11F show an image chart of the power generation buoy movement with torque load (2500 kgf) in 2500 mm height of ocean wave with the references (t0) cycle of wave, (t1a) period of stop to balance point, (t1b) period of stop in descent, (t1c) period of descent, (t2a) period of stop in rise, (t2b) period of rise, (t3) reference time to bottom dead center, (Hmg) moving height by gravity, (Hmb) moving height by buoyancy, (Hb) depth of sinking by buoy weight, (Htq) depth of sinking by torque load, (Hadd) depth of sinking by buoy weight and torque load and (Wh) wave height.
Figures 12A, 12B, 12C, 12D, 12E:
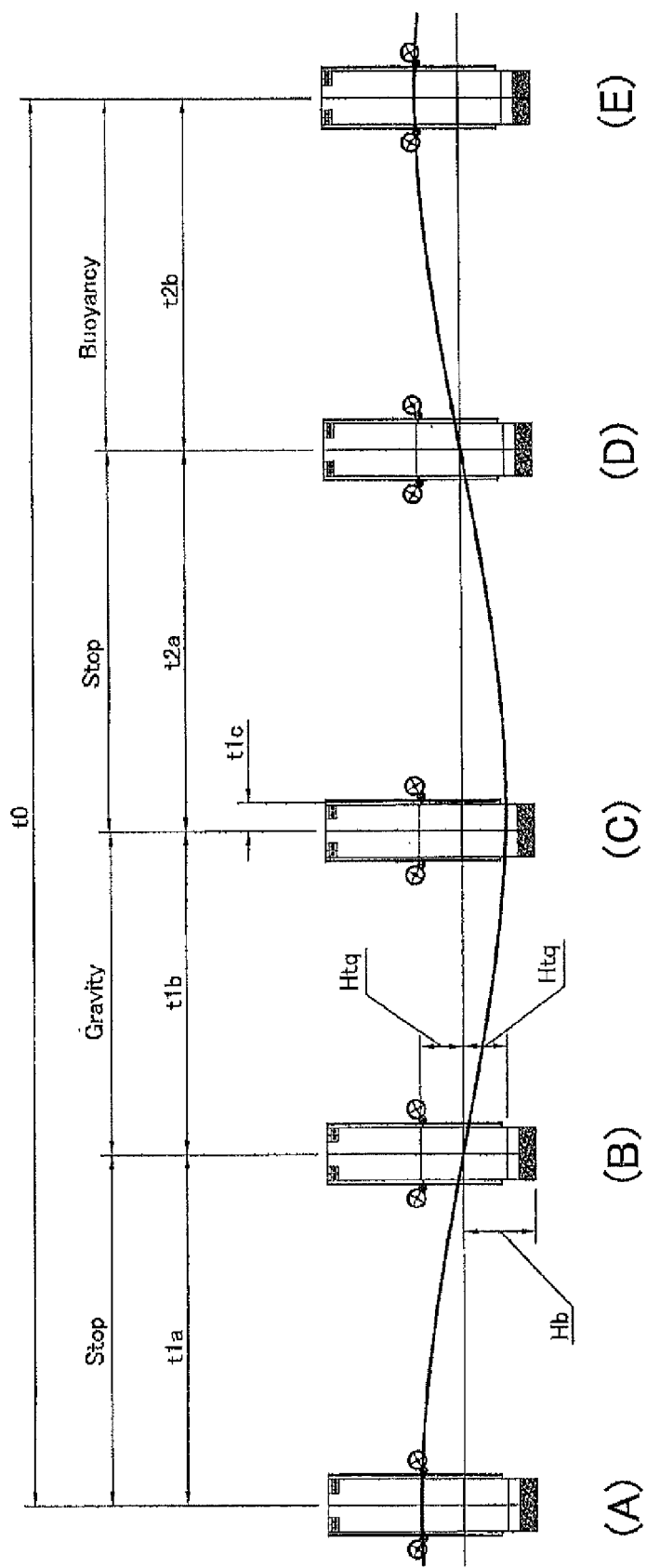
FIGS. 12A-12E show an image chart of the power generation buoy movement with torque load (2800 kgf) in 2500 mm height of ocean wave with the references (t0) cycle of wave, (t1a) period of stop to balance point, (t1b) period of descent, (t2a) period of stop in rise, (t2b) period of rise, (t1c) reference time to bottom dead center, (Hb) depth of sinking by buoy weight, (Htq) depth of sinking by torque load, and (Wh) wave height.
Figures 13A, 13B, 13C, 13D, 13E, 13F:
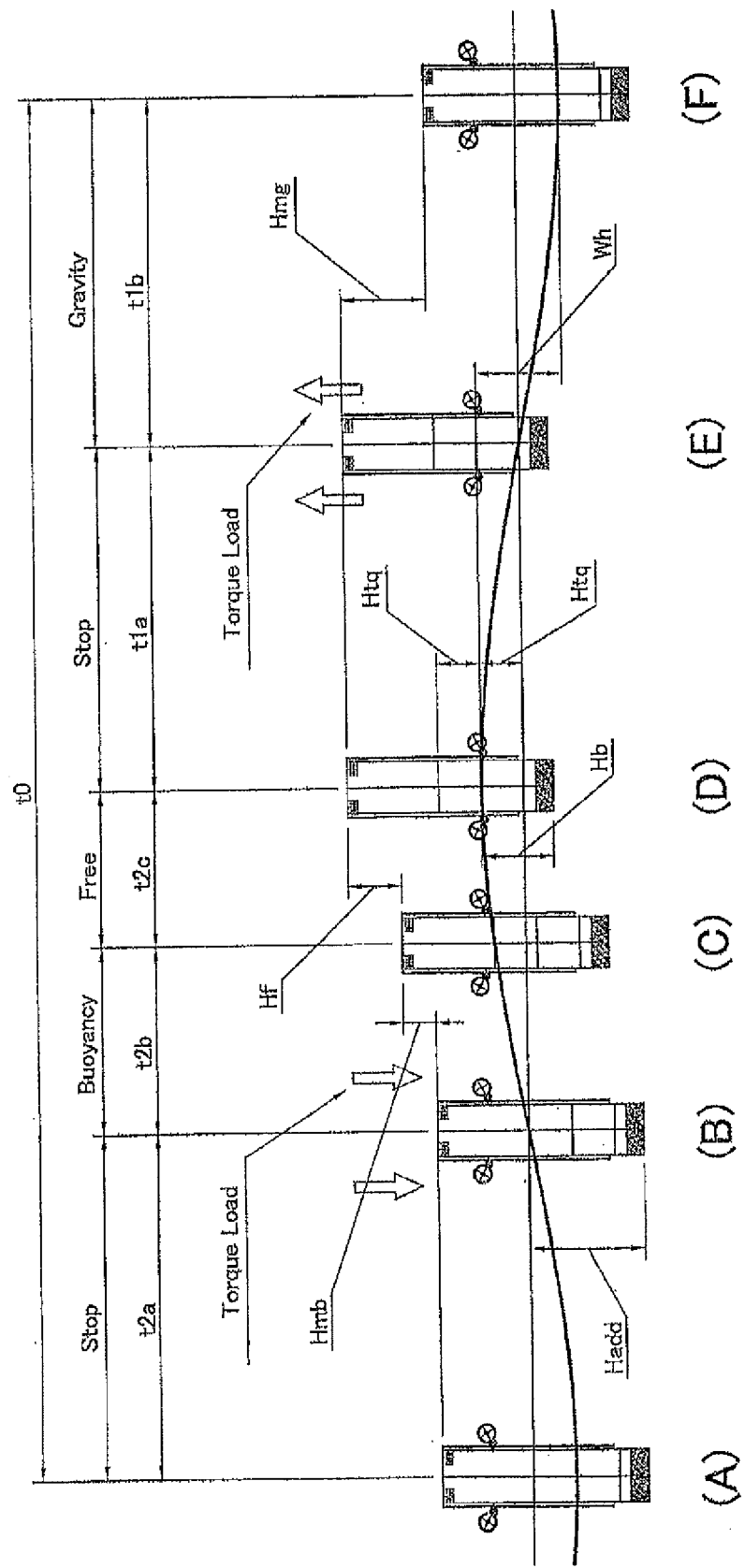
FIGS. 13A-13F show an image chart of the power generation buoy movement by torque load (2800 kgf) with freeing the load at the top dead center in 2500 mm height of ocean wave with the references (t0) cycle of wave, (t1a) period of stop to the balancing point, (t1b) period of descending, (t2a) period of stop in rise, (t2b) period of rising, (t2c) period of free rising to top dead center, (Hmg) moving height by gravity, (Hmb) moving height by buoyancy, (Hf) moving height in free rising, (Hb) depth of sinking by buoy weight, (Htq) depth of sinking by torque load, (Hadd) depth of sinking by buoy weight and torque load and (Wh) wave height.

FIG. 4 is a basic square pillar assembly. When two parts of square solid-type pressure device of half cut (9) are combined, they are shaped to be a square solid-type pressure device (11) with a square vacant space inside it. The square pillar internal pressure device assembly (8) is stored in the square vacant space of the square solid-type pressure device (11). The basic square pillar assembly (12) is manufactured by wrapping the square solid-type pressure device (11) two or more times by the soft FRP prepreg (10). This basic square pillar assembly (12) is used as the base element of the FRP structure materials.

At room temperature, the soft FRP prepreg (10) is the wet soft cloth, so it is not difficult to wrap square solid-type pressure device (11) with the soft FRP prepreg (10). Because the adhesive of prepreg deteriorates at the room temperature, it is preferable to preserve the product within the freezer at minus 5° C. or less.

FIGS. 5A-5D show an assembly procedure explanation chart of FRP structure pillar material that illustrates the procedure sequence as follows:
  A. The process of preparation is as follows:
    (a) Four basic square pillar assemblies (14) preserved in the freezer at minus 5° C. or less are taken out from the freezer.
    (b) The adhesive function of FRP prepreg is lost at that temperature; therefore it is not difficult to assemble them.

B. The first step is as follows:
  (a) Four basic square pillar assemblies (14) are combined with horizontal direction and the vertical direction.
  (b) One square pillar unit (15) with four basic square pillar assemblies is manufactured.
C. The second step is as follows:
  (a) FRP pillar structure material with four basic square pillar assemblies (17) is manufactured by wrapping the square pillar unit (15) with the soft prepreg (16).

Theoretically, the square pillar can be infinitely arranged. However the structural position is not unique. It is difficult to connect more than four pillars to one unit. A honeycomb structure is superior for a large-scale structure. But, the square pillar can be manufactured at low-cost when it is compared with honeycomb structures. The square pillar is suitable for the power generation buoy of wave activated power generation.

The pressurizing process and the heat stiffening process by the internal pressurizing device and the external frame reaction force are the same as the manufacturing process of the application Ser. No. 13/407,196 "A HONEYCOMB STRUCTURE HAVING HONEYCOMB CORE ARRANGED PARALLEL TO A PANEL SURFACE AND A MANUFACTURING PROCESS THEREFOR".

Internal pressure device by the styrene foam is useful for expanding method instead of the vapor pressure. Water and alcohol need not be drained from the internal pressure device after the heat stiffening process; the process is shown in application Ser. No. 13/407,196. Epoxy resin stiffens completely during the cooling time though epoxy resin, which is the bonding resin of the FRP prepreg, starts stiffening at 130° C. Therefore, the internal pressure device should keep pressurizing the FRP prepreg during the cooling time. The styrene foam is manufactured from cooling gradually with pressurizing it. The manufacturing process is the same.

FIGS. 6A-6C illustrate a power generation buoy for wave activated power generation. FIG. 6B is a front chart. FIG. 6A is a left side chart, and FIG. 6C is a right side chart. The power generation buoy (18) is composed of 16 basic elements. Each basic element is manufactured from glass fiber FRP (19), and the styrene foam (20) is filled. The weight mass (21) is installed at the bottom part of the power generation buoy. The weight mass is the one that the iron fragments were hardened with the urethane resin.

The power generation buoy is filled with the styrene foam. Seawater cannot invade into the power generation buoy, so it floats on the sea. When the weight of iron is installed at the bottom part of buoy, the power generation buoy stands vertically in seawater. The weight mass is the one that the iron fragments was hardened with the urethane resin. The iron fragments do not come in contact directly with seawater because it is hardened with the urethane. And, glass fiber FRP is a compound material of the glass fiber and epoxy resin, and neither the glass fiber nor epoxy resin is corroded by seawater. Therefore, the power generation buoy is not corroded with seawater. The durability of power generation buoy is excellent.

The specs of the power generation buoy of FIG. 6A-6C are shown in Table 1. The length of the power generation buoy is 6,000 mm. The buoyancy of the buoy is calculated to be 13,500 kgf from the volume. Weight material of the buoy is calculated to be 3,222 kgf. The weight force of the iron fragments is 1,463 kgf. The total weight force is 4,685 kgf, so the power generation buoy sinks by about 2,082 mm, and stands up vertically in the water:

TABLE 1

| Length (mm) | Width (mm) | Height (mm) | Buoyancy (kgf) | Weight (kg) Buoy | Weight mass | Total |
|---|---|---|---|---|---|---|
| 6000 | 1500 | 1500 | 13500 | 3222 | 1463 | 4685 |

FIGS. 7A and 7B show a wave activated power generation unit. FIG. 7A shows the power generation buoy in top center of waves. FIG. 7 B shows the power generation buoy in the bottom center of waves. Power generation unit is composed of power generation buoy (22) and shroud assembly (23). Rack gear (24) and shuttle slide (29) are installed on power generation buoy (22). Pinion gear (25), gearless transmission (26), dynamo (27), and support roller (28) are installed in the shroud assembly. Power generation unit is fixed on both sides by rigid barge (30), and is floating on the sea. Power generation buoy (22) moves up and down in the shroud assembly (23).

FIGS. 8A-8E show an image chart, which converts the vertical movement of the power generation buoy into the gyration by the rack and pinion mechanism. The rack gear (35), which is attached on the buoy (34), moves up and down because of the vibration of the waves. The pinion gear (36) converts the vertical movement of the rack into the gyration. The pinion gear (36) is attached in a shroud assembly. (The shroud assembly is omitted in the figure.) When the movement is analyzed in physics, the power generation buoy (34) rises by the buoyancy, and descends by gravitation.

Rack and pinion systems are installed in both surfaces of the left and a right of the buoy. Therefore, the hand of cut of the right side pinion is opposite to the left side pinion. The rotation speed of the pinion is varied by the cycle of the wave. When electricity is generated by rotating movement of the pinion, the generated electricity is an exchange current and its frequency is not constant. It is preferable that the current generated by the wave activated power generation is converted into the direct current electricity.

In this invention, the rack and pinion mechanism can convert the vertical movement of the variable wave into the gyration. Of course there is some limitation. The amplitude of the wave at stormy weather has the danger to exceed the length of the rack gear. At stormy weather it is necessary to stop the vertical movement of power generation buoy.

The power generation buoy repeats the vertical movement by the buoyancy and gravity. The pinion gear converts the vertical movement into the gyration. The wave activated power generation unit turns the dynamo with the rotating torque of the pinion gear, and obtains the electric power. The rotating torque load of the dynamo is equal to the frictional force for the power generation buoy. The power generation buoy does not fall down by gravitation when the frictional force is larger than the gravity load. The power generation buoy stops the vertical movement in the air. When the pinion gears are connected to the dynamo with the gearless transmission, the torque of the dynamo can be arbitrarily varied. Therefore, it becomes possible to stop the power generation buoy at stormy weather.

The motion of the power generation buoy is simulated by using the sample power generation buoy and ocean wave data. Ocean wave is generated by the wind and gravity. The wave data is observed as a function of the velocity of the wind. Table 2 shows the observational data:

TABLE 2

| Amplitude of wave (m) | Velocity of the wind (m/sec) | Cycle (sec) | Wavelength (m) |
|---|---|---|---|
| 1.5 | 7.07 | 5.7 | 50.00 |
| 2.0 | 8.16 | 6.5 | 66.67 |
| 2.5 | 9.13 | 7.3 | 83.33 |
| 3.0 | 10.00 | 8.0 | 100.00 |
| 3.5 | 10.80 | 8.6 | 116.67 |
| 4.0 | 11.55 | 9.2 | 133.33 |
| 4.5 | 12.25 | 9.8 | 150.00 |
| 5.0 | 12.91 | 10.3 | 166.67 |

FIGS. 9A-9E show the free vibration chart of power generation buoy in 2500 mm height of ocean wave. When the torque load of dynamo does not load, power generation buoy vibrates freely by ocean wave. When wave height (Wh) is 2500 mm, the cycle of the wave (t0) is 7.30 sec. Thus, the period of descent (t1) by gravity is 3.65 sec and the period of rise by buoyancy is 3.65 sec. Because the power generation buoy vibrates without load restriction, the moving height by gravity (Hmg) and the moving height by buoyancy (Hmb) are the same as the wave height (Wh).

The length of the power generation buoy is 6,000 mm. The buoyancy of the buoy is calculated to be 13,500 kgf from the volume. Weight material of the buoy is calculated to be 3,222 kgf. The weight force of the iron fragments is 1,463 kgf. The total weight force is 4,685 kgf (46865=3222+1463), so the depth of sinking by buoy weight (Hb) is about 2,082 mm. The power generation buoy sinks 2,082 mm and stands up vertically in the sea.

Electricity is not generated in the system of FIG. 9A-9E. It is necessary to install the dynamo to generate electricity. The buoy that floats on the ocean wave cannot vibrate freely when the dynamo is installed. The power generation buoy receives the resistance force from the pinion, which corresponds to the torque force turning the dynamo.

FIGS. 10A-10E show the image chart of the power generation buoy movement with torque load (1000 kgf) in 2500 mm height of ocean wave. When wave height (Wh) is 2500 mm, the cycle of wave (t0) is 7.30 sec. The pinion load from the dynamo torque load is the same as the frictional force for the buoy. The buoy does not rise when the buoyancy of the buoy does not reach 1000 kgf. Similarly the buoy does not descend if the buoyancy of the buoy does not lose 1000 kgf or more. The pinion load becomes 500 kgf because there are two dynamos.

The depth of sinking by buoy weight (Hb) is 2082 mm. The depth of sinking by torque load (Htq) is 444 mm. The depth of sinking by buoy weight and torque load (Hadd) is 2526 mm. The period of stop in descent (t1a) is calculated to be 1.47 sec. The period of descent (t1b) is calculated to be 2.18 sec. The period of stop in rise (t2a) is calculated to be 0.98 sec. The period of rise (t2b) is calculated to be 2.67 sec. The moving height by gravity (Hmg) is calculated to be 2056 mm. The moving height by buoyancy (Hmb) is calculated to be 2056 mm. The data of the torque load and the buoy assembly is shown in Table 3:

TABLE 3

| Size of Buoy (mm) | Weight of Buoy (kgf) | Depth of Sinking by Buoy Weight (mm) | Torque Load (kgf) | Depth of Sinking by Torque Load (mm) |
|---|---|---|---|---|
| 1500 × 1500 × 6000 | 4685 | 2082 | 1000 | 444 |

Analysis of movement at 2500 mm height, torque load 1000 kgf:
1. Analysis of movement by buoyancy
    (A) The buoyancy acts at the cycle from the bottom dead center (C) of the wave to the top dead center (E).
    (B) When there is a torque load, the buoy does not move from the bottom dead center (C) until the buoyancy exceeds the torque load.
    (C) The torque load and the buoyancy are balanced at the point (D).
    (D) Then, the buoy rises from point (D) to the top dead center (E).
    (E) The total buoyancy of the buoy is 13500 kgf, so the buoy buoyancy is much larger than 1000 kgf of the torque load. Therefore, the buoy rises from point (D) to the top dead center (E) without fail.
2. Movement analysis-1 by gravity
    (A) The gravity acts at the cycle from the top dead center (A) of the wave to the bottom dead center (C).
    (B) When there is a torque load, the buoy does not move from the top dead center (A) until the buoyancy loses the force corresponding to the torque load.
    (C) The torque load and the buoyancy are balanced at the point (B).
    (D) Then, the buoy descends from the point (B) to the bottom dead center (C).
    (E) The total weight of the buoy is 4685 kgf, so the buoy gravity is larger than 1000 kgf of the torque load. Therefore, the buoy descends from the point (B) to the bottom dead center (C).
3. Movement analysis-2 by gravity
    (A) The buoy should fail down from point (B) to the bottom dead center (C) within 2.18 seconds (t1b). Otherwise, next wave comes.
    (B) The gravity increases from 0 kgf of point (B) to 3685 kgf (3685=4685−1000) of point (C). The buoyancy that corresponds to gravity (3685 kgf) is 1638 mm. The gravity of 1842.5 kgf acts on the average.
    (C) The mass of the buoy is 4685 kg. In the equation of Newton, it is F=mα. Therefore it is 1842.5 (kgf)=4685 (kg)*α
    (D) α0.3932764 (kgf/kg), 1 kgf=9.81N, 1N=1 (kg)*1 (m/sec^2), α=0.3932764*9.81 (N/kg)=3.85804 (N/kg)= 3.85804 (m/sec^2)
    (E) S=(½)*α*t^2, α=3.85804 (m/sec^2), t1b=2.18 (sec)
    (F) S=(½)*3.85804 (m/sec^2)*2.18 (sec)*2.18 (sec)= 9.16747 (m)=9167.47 (mm)
    (G) The falling distance from point (B) to point (C) is 2056 mm (Hmg).
    (H) The calculated distance (9167 mm) is larger than 2056 mm (Hmg). Therefore; the buoy will fall down from the point (B) to the point (C) without fail,
4. Actual movement
    This calculation is considerably rough. The viscosities etc. of seawater are not considered. Because the buoy receives the torque load in the neighborhood of the bottom dead center, the buoy will stabilize in the neighborhood of the bottom dead center. It is impossible to get the stability point by the hand calculation.

Calculation of work and work rate at 2500 mm height, torque load 1000 kgf:
1. Work by buoyancy
    (A) Work by the buoyancy is obtained by multiplying the torque load and the vertical distance between the point (D) and the point (E).
    (B) The torque load is 1000 kgf, and the distance is 2056 mm (Hmb).

(C) Therefore, the work by buoyancy: Wb=1000 (kgf)* (2056/1000) (m)=2056.0 (kgf*m)

2. Work by gravity
   (A) Work by the gravity is obtained by multiplying the torque load and the vertical distance between the point (B) and the point (C).
   (B) The torque load is 1000 kgf, and the distance is 2056 mm (Hmg).
   (C) Therefore, the work by gravity: Wg=1000 (kgf)* (2056/1000) (m)=2056.0 (kgf*m)

3. Total Work
   (A) The total work (Wt) is obtained by adding the work by buoyancy (Wb) and work by gravity (Wg).
   (B) Wb=2056.0 (kgf*m), Wg=2056.0 (kgf*m)
   (C) Therefore, the total work: Wt=2056.0 (kgf*m)+ 2056.0 (kgf*m)=4112.0 (kgf*m)

4. Work rate
   (A) Work by buoyancy (Wb) and work by gravity (Wg) are repeated at the cycle of wave.
   (B) Therefore, the total work rate is obtained by dividing the total work by the cycle of wave.
   (C) Total work is 4112.0 kgf*m, and the cycle of the wave is 7.30 seconds.
   (D) Total work rate: Wr=4112.0 (kgf*m)/7.30 (sec)= 563.28 (kgf*m/sec)
   (E) 1(kgf*m/sec)=9.81 (W)=0.00981 (kW)
   (F) Therefore, Wr=563.28*0.00981 (kW)=5.525 (kW)

FIGS. 11A-11F show the image chart of the power generation buoy movement with torque load (2500 kgf) in 2500 mm height of ocean wave. When wave height (Wh) is 2500 mm, the cycle of wave (t0) is 7.30 sec. The pinion load from the dynamo torque load is the same as the frictional force for the buoy. The buoy does not rise when the buoyancy of the buoy does not reach 2500 kgf. Similarly the buoy does not descend if the buoyancy of the buoy does not lose 2500 kgf or more.

The depth of sinking by buoy weight (Hb) is 2082 mm. The depth of sinking by torque load (Htq) is 1111 mm. The depth of sinking by buoy weight and torque load (Hadd) is 3193 mm. The period of stop to balance point (t1$a$) is calculated to be 1.69 sec. The period of stop in descent (t1$b$) is calculated to be 1.20 sec. The period of descent (t1$c$) is calculated to be 1.11 sec. The period of stop in rise (t2$a$) is calculated to be 1.42 sec. The period of rise (t2$b$) is calculated to be 1.87 sec. The reference time (t3) from descending point to bottom dead center is 0.76 sec. The moving height by gravity (Hmg) is calculated to be 1389 mm. The moving height by buoyancy (Hmb) is calculated to be 1389 mm. The data of the torque load and the buoy assembly is shown in Table 4:

TABLE 4

| Size of Buoy (mm) | Weight of Buoy (kgf) | Depth of Sinking by Buoy Weight (mm) | Torque Load (kgf) | Depth of Sinking by Torque Load (mm) |
|---|---|---|---|---|
| 1500 × 1500 × 6000 | 4685 | 2082 | 2500 | 1111 |

Analysis of movement at 2500 mm height, torque load 2500 kgf

1. Movement analysis by buoyancy
   (A) The torque load and the buoyancy are balanced at the point (E). Then, the buoy rises from point (E) to the top dead center (F).
   (B) The total buoyancy of the buoy is 13500 kgf, so the buoy buoyancy is much larger than 2500 kgf of the torque load. Therefore, the buoy rises from point (E) to the top dead center (F) without fail.

2. Movement analysis-1 by gravity
   (A) The torque load and the buoyancy are balanced at the point (C). Point (B) is the reference point on which the weight of the buoy and the buoyancy is balancing.
   (B) Then, the buoy descends from the point (C) to the bottom center. It is 0.76 seconds (t3) from point (C) to the bottom center. And the distance corresponding 0.76 sec is 833 mm.
   (C) The point (D) is neighborhood of the bottom center.
   (D) The total weight of the buoy is 4685 kgf, so the buoy gravity is larger than 2500 kgf of the torque load. Therefore, the buoy descends from the point (C) to the bottom center.

3. Movement analysis-2 by gravity
   (A) The gravity force increases from 0 kgf of point (C) to 2185 (2185=4685−2500) kgf of the bottom center. The gravity force of 1092.5 kgf acts on the average.
   (B) The mass of the buoy is 4685 kg. F=mα. Therefore it is 1092.5 (kgf)=4685 (kg)*α
   (C) α=0.233191 (kgf/kg)=0.233191*9.81 (N/kg)= 2.28760 (m/sec^2)
   (D) S=(½)*α*t^2, α=2.28760 (m/sec^2), t1$c$=1.11 (sec), It is 1.11 sec from point (C) to point (D).
   (E) S=(½)*2.28760 (m/sec^2)*1.11 (sec)*1.11 (sec)= 1.4092 (m)=1409.2 (mm)
   (F) The vertical distance from point (C) to point (D) is 1409.2 mm, 1409 mm and 833 mm are numerical values that are very near. The buoy will stabilize in the neighborhood of the bottom center (D). It is impossible to get the stability point by the hand calculation.

Calculation of work and work rate at 2500 mm height, torque load 2500 kgf

1. Work by buoyancy
   (A) The torque load is 2500 kgf, and the distance is 1389 mm Hmb).
   (B) Therefore, the work by buoyancy: Wb=2500 (kgf)* (1389/1000) (m)=3472.5 (kgf*m)

2. Work by gravity
   (A) The torque load is 2500 kgf, and the distance is 1389 mm (Hmg).
   (B) Therefore, the work by gravity: Wg=2500 (kgf)* (1389/1000) (m)=3472.5 (kgf*m)

3. Total Work; Wt=3472.5 (kgf*m)+3472.5 (kgf*m)=6945.0 (kgf*m)

4. Work rate
   (A) The total work rate is obtained by dividing the total work by the cycle of wave.
   (B) Total work is 6945.0 kgf*m, and the cycle of the wave is 7.3 seconds.
   (C) Total work rate: Wr=6945.0 (kgf*m)/7.3 (sec)= 951.3698 (kgf*m/sec)
   (D) 1(kgf*m/sec)=9.81 (W)=0.00981 (kW)
   (E) Wr=951.3698*0.00981 (kW)=9.33 (kW)

The optimization of the torque load is a difficult problem. In the calculation, the torque load that becomes ½ of the height of waves obtains the maximum efficiency. However, the power generation buoy comes not to descend easily by gravity when the torque load becomes large.

The buoyancy that corresponds to the torque load 2800 kgf is 1244 mm. The buoyancy that corresponds to weight (4685 kgf) of the buoy is 2082 mm. The total load that adds torque force (2800 kgf) to weight (4685 kgf) of the buoy is 7485 kgf. The buoyancy that corresponds to the total load (7485 kg) is 3326 mm. The data of the torque load and the buoy assembly is shown in Table 5:

TABLE 5

| Size of Buoy (mm) | Weight of Buoy (kgf) | Depth of Sinking by Buoy Weight (mm) | Torque Load (kgf) | Depth of Sinking by Torque Load (mm) |
|---|---|---|---|---|
| 1500 × 1500 × 6000 | 4685 | 2082 | 2800 | 1244 |

FIGS. 12A-12E show the image chart of the power generation buoy movement with torque load (2800 kgf) in 2500 mm height of ocean wave. When wave height (Wh) is 2500 mm, cycle of wave (t0) is 7.30 sec. The pinion load from the dynamo torque load is the same as the frictional force for the buoy. The buoy does not rise when the buoyancy of the buoy does not reach 2800 kgf. Similarly the buoy does not descend if the buoyancy of the buoy does not lose 2800 kgf or more.

The depth of sinking by buoy weight (Hb) is 2082 mm. The depth of sinking by torque load (Htq) is 1244 mm. The depth of sinking by buoy weight and torque load (Hadd) is 3193 mm. The period of stop to balance point (t1a) is calculated to be 1.69 sec. The period of stop in descent (t1b) is calculated to be 1.68 sec. The period of descent (t1c) is calculated to be 0.15 sec. The period of stop in rise (t2a) is calculated to be 1.97 sec. The period of rise (t2b) is calculated to be 1.83 sec. Gravity begins to act from the point (C). However, it is only 0.15 second to the bottom dead center. It is thought that the power generation buoy does not move when the torque load is 2800 kgf. In this case, it is impossible to get the answer by the hand calculation.

FIGS. 13A-13F show the image chart of the power generation buoy movement by torque load (2800 kgf) with freeing the load at the top dead center in 2500 mm height of ocean wave. When the wave height (Wh) is 2500 mm, the cycle of wave (t0) is 7.30 sec. The period of stop to the balancing point (t1a) is calculated to be 1.81 sec. The period of descending (t1b) is calculated to be 1.84 sec. The period of stop in rise (t2a) is calculated to be 1.83 sec. The period of rising (t2b) is calculated to be 1.00 sec. The period of free rising (t2c) to top dead center is calculated to be 0.82 sec. The moving height by gravity (Hmg) is calculated to be 2500 mm. The moving height by buoyancy (Hmb) is calculated to be 930 mm. The moving height in free rising (Hf) is calculated to be 1570 mm. The depth of sinking by buoy weight (Hb) is calculated to be 2082 mm. The depth of sinking by torque load (Htq) is calculated to be 1244 mm. The depth of sinking by buoy weight and torque load (Hadd) is calculated to be 3326 mm.

The power generation buoy is assumed to be stopping at the bottom dead center (A). The frictional force does not act on the object that is stopping. Similarly, the torque load does not act on the power generation buoy that is stopping. The power generation buoy does not rise until the buoyancy exceeds the torque load though the power generation buoy obtains the buoyancy as the wave rises.

Buoyancy acts from the point (A) to the point (D). The torque load and the buoyancy do the balance in point (B). When the power generation buoy exceeds the point (B), it rises with turning the dynamo. The torque load is freed a few seconds before the top dead center (D). Point (C) is the point to free the torque load. The weight of power generation buoy and the buoyancy do the balance when the torque load is freed at the point (D). The potential energy of the power generation buoy at the point (D) recovers greatly though power generation is not done from the point (C) to the point (D).

Gravity acts from the point (D) to the point (F). When gravity is larger than the torque loads, the power generation buoy goes down to the bottom dead center (F). The torque load and the buoyancy do the balance in point (E). When the power generation buoy exceeds the point (E), it descends with turning the dynamo. And, the weight of the power generation buoy and the buoyancy do the balance, and the power generation buoy stabilizes in neighborhood of the bottom dead center (F). The dynamo generates electricity from the point (D) to the point (F) by gravitation.

Analysis of movement at 2500 mm height, torque load (2800 kgf) with freeing the load at the top dead center:
1. Movement analysis by buoyancy-1
   (A) Buoyancy acts from the point (A) to the point (D),
   (B) The torque load and the buoyancy do the balance in point (B).
   (C) When the power generation buoy exceeds the point (B), it rises with turning the dynamo.
   (D) The torque load is freed 0.82 seconds (t2c) before the top dead center (D). Point (C) is the point to free the torque load.
   (E) The weight of power generation buoy and the buoyancy do the balance because the torque load is freed.
   (F) The potential energy of the power generation buoy at the point (D) recovers greatly though power generation is not done from the point (C) to the point (D),
2. Movement analysis by buoyancy-2
   (A) The torque load is freed 0.82 seconds (t2c) before the top dead center (D).
   (B) The power generation buoy receives the force corresponding to the opened torque load (2500 kgf).
   (C) It is 0.82 seconds (t2c) from point (C) to point (D).
   (D) The mass of the buoy is 4685 kg. F=mα. Therefore it is 2500 (kgf)=4685 (kg)*α
   (E) α=0.53367 (kgf/kg)=0.53367*9.81 (N/kg)=5.23535 (m/sec^2)
   (F) S=(½)*α*t^2, α=5.23535 (m/sec^2), t2c=0.82 (sec)
   (G) S=(½)*5.23535 (m/sec^2)*0.82 (sec)*0.82 (sec)= 1.8033 (m)=1803.3 (mm)
   (H) The rising distance from point (C) to point (D) is 1570 mm (Hmf). The calculated distance (1803 mm) is larger than 1570 mm (Hmf). Therefore the power generation buoy will stabilize in the neighborhood of the top dead center (D). It is impossible to get the stability point by the hand calculation.
3. Movement analysis-1 by gravity
   (A) Gravity acts from the point (D) to the point (F).
   (B) When gravity (4685 kgf) is larger than the torque loads (2800 kgf), the power generation buoy goes down to the bottom dead center (F).
   (C) The torque load and the buoyancy do the balance in point (E),
   (D) When the power generation buoy exceeds the point (E), it descends with turning the dynamo,
   (E) The weight of the power generation buoy and the buoyancy do the balance, and the power generation buoy stabilizes in neighborhood of the bottom dead center (F).
   (F) The dynamo generates electricity from the point (D) to the point (F) by gravitation.
4. Movement analysis-2 by gravity
   (A) The gravity force increases from 0 kgf of point (E) to 1885 (1885=4685−2800) kgf of the bottom center. The gravity force of 942.5 kgf acts on the average.
   (B) The mass of the buoy is 4685 kg. F=mα. Therefore it is 942.5 (kgf)=4685 (kg)*α

(C) α=0.201174 (kgf/kg)=0.201174*9.81 (N/kg)= 1.973516 (m/sec^2)
(D) S=(½)*α*t^2, α=1.973516 (m/sec^2), t1b=1.84 (sec), It is 1.84 sec from point (E) to point (F).
(E) S=(½)*1.973516 (m/sec^2)*1.84 (sec)*1.84 (sec)= 3.3476 (m)=3347.6 (mm)
(F) The falling distance from point (E) to point (F) is 2500 mm (Hmg). The calculated distance (3347 mm) is larger than 2500 mm (Hmg). The buoy will stabilize in the neighborhood of the bottom dead center (F). It is impossible to get the stability point by the hand calculation.

Calculation of work and work rate at 2500 mm height, torque load (2800 kgf) with freeing the load at the top dead center
1. Work by buoyancy
   (A) The torque load is 2800 kgf, and the distance is 930 mm (Hmb).
   (B) The work by buoyancy: Wb=2800 (kgf)*(930/1000) (m)=2604.0 (kgf*m)
2. Work by gravity
   (A) The torque load is 2800 kgf, and the distance is 2500 mm (Hmg).
   (B) The work by gravity: Wg=2800 (kgf)*(2500/1000) (m)=7000.0 (kgf*m)
   (C) Total Work; Wt=2604.0 (kgf*m)+7000.0 (kgf*m)= 9604.0 (kgf*m)
3. Work rate
   (A) The total work rate is obtained by dividing the total work by the cycle of wave.
   (B) Total work is 9604.0 (kgf*m), and the cycle of the wave is 7.30 sec (t0).
   (C) Total work rate: Wr=9604.0 (kgf*m)/7.3 (sec)=1315.6 (kgf*m/sec)
   (D) 1 (kgf*m/sec)=9.81 (W)=0.00981 (kW)
   (E) Wr=1315.6*0.00981 (kW)=12.90 (kW)

When the method of controlling in FIGS. 13A-13F is used, the wave activated power generation can be driven by the most efficient torque load. The power generation ability by torque load 2500 kgf is 9.33 kW, and the power generation ability by torque load 2800 kgf is 12.90 kW. 12.90 kW is 1.38 times 9.33 kW. The torque load can be varied with the gearless transmission. If the clutch mechanism is used, the torque load can be easily made free. Both methods are the same in using the rack and pinion and gearless transmission.

The power generation buoy does not descend by gravity when the torque load becomes larger than the weight of the power generation buoy. During stormy weather, the power generation buoy can be stopped by this method.

Because the calculation becomes complex, the following calculations are calculated by the method of uniform torque load. Table 6 shows the forecast of the power generation ability calculated by the method of the uniform torque load as shown below:

TABLE 6

| Amplitude of wave (m) | Torque Load (kgf) | Moving range (mm) | Work rate (kW) |
|---|---|---|---|
| 1.5 | 1500 | 833 | 4.30 |
| 2.5 | 2500 | 1389 | 9.33 |
| 3.5 | 3300 | 2033 | 15.30 |
| 4.5 | 4700 | 0 | 0.00 |

The incidence of the wave in North Ocean is assumed as shown in Table 7:

TABLE 7

| Amplitude of wave (m) | Average (m) | Incidence per year Days (%) | Incidence per year Days | Time/year (Hours) |
|---|---|---|---|---|
| 1.0~2.0 | 1.5 | 10 | 36.5 | 876 |
| 2.0~3.0 | 2.5 | 40 | 140.0 | 3504 |
| 3.0~4.0 | 3.5 | 40 | 140.0 | 3504 |
| 4.0~more | 4.5 | 10 | 36.5 | 876 |

Power generation (kW) in this sample unit is calculated as shown in Table 8:

TABLE 8

| Amplitude of Wave (m) | Torque Load (kgf) | Range of Movement (mm) | Work Rate (kW) | Efficiency of Dynamo (%) | Rate of Incidence (%) | Amount of Power Generation (kW) |
|---|---|---|---|---|---|---|
| 1.5 | 1500 | 833 | 4.30 | 80 | 10 | 0.34 |
| 2.5 | 2500 | 1389 | 9.33 | 80 | 40 | 2.99 |
| 3.5 | 3300 | 2033 | 15.30 | 80 | 40 | 4.80 |
| 4.5 | 4700 | 0 | 0.00 | 80 | 10 | 0.00 |
| Amount of Power Generation (kW) | | | | | | 8.13 |

The amount of power generation (kW*h/year) during year in this sample wave activated power generation unit is calculated as shown in Table 9:

TABLE 9

| Amplitude of Wave (m) | Torque Load (kgf) | Range of Movement (mm) | Work Rate (kW) | Efficiency of Dynamo (%) | Time/Year (Hour) | Amount of Power Generation (kW * h/year) |
|---|---|---|---|---|---|---|
| 1.5 | 1500 | 833 | 4.30 | 80 | 876 | 3,013 |
| 2.5 | 2500 | 1389 | 9.33 | 80 | 3504 | 27,696 |
| 3.5 | 3300 | 2033 | 15.30 | 80 | 3504 | 42,889 |
| 4.5 | 4700 | 0 | 0.00 | 80 | 876 | 0 |
| Amount of Power Generation (kW * h/year) | | | | | | 75,598 |

FIGS. 14A-14B show the image chart of the wave activated power generation module. The power generation unit (37) is composed of the shroud assembly (38), the power generation buoy (39), the dynamo assembly (40a) and the gearless transmission assembly (40b). Wave activated power generation module is produced by connecting a lot of power generation units to the straight line by rigid barge (41). In this example, the length of module (L1) is about 36 meters. The width of module (W1) is about 5.1 meters. The height of module (H1) is about 6.3 meters.

The module is produced like the bar in which the rigidity is high. It is desirable that the power generation module is manufactured at the factory. Therefore, the longitudinal length is limited by the size of the manufacturing factory. The power generation module in this image chart is composed by 10 power generation units.

Figure 15:
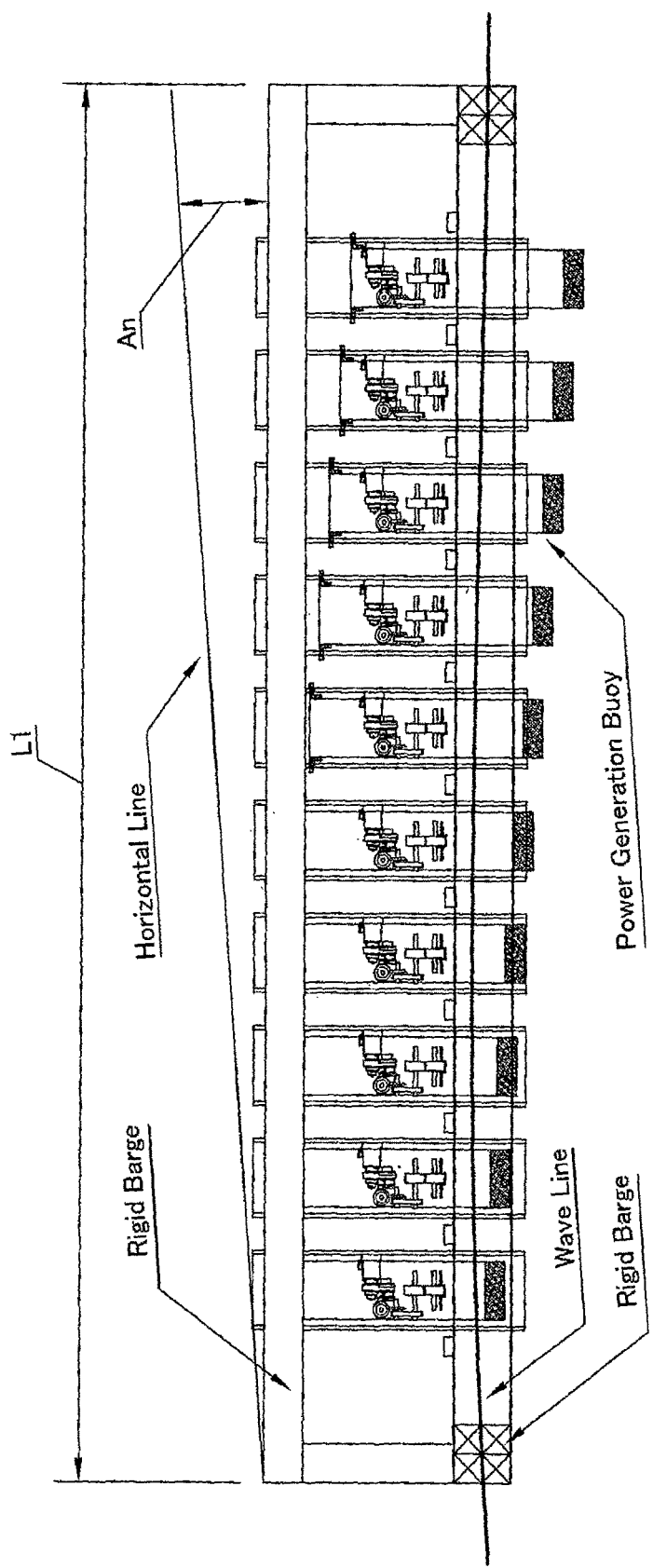
FIG. 15 shows an image chart of the wave activated power generation module inclined by the wave with the references (L1) Length of module and (An) inclined angle.

FIG. 15 shows the image chart of the wave activated power generation module inclined by the wave. The wavelength of the wave of 3.0 m in pulse height is 100 meters. The power generation module is inclined by the buoyancy of wave when the length of the power generation module is shorter than that of wavelength. It is not preferable that the length of the power generation module is shorter than the wavelength of the wave. In this sample chart, the length of module (L1) is 36 meters. The inclined angle (An) is 4.0 degrees.

FIGS. 16A and 16B show the image chart of long size wave activated power generation module. The long size wave activated power generation module is a combined one of two power generation modules. The length of single module (L1) is 36 meters. And the (L2) length of double module (L2) is 72 meters. The long size power generation module in the sample chart has 20 power generation units (43). Rigid barges (42) support both sides of power generation module. The power generation units (43) is composed of shroud assembly (45) and power generation buoy (44). The power generation buoy (44) moves up and down with ocean wave inside the shroud assembly (45).

It is not realistic to manufacture 100 m in length power generation module in one unit. Two power generation modules of 36 m in length are connected, and the long size power generation module is 72 m in length. The long size power generation module will not be inclined greatly by 100 m wavelengths.

Figure 17:
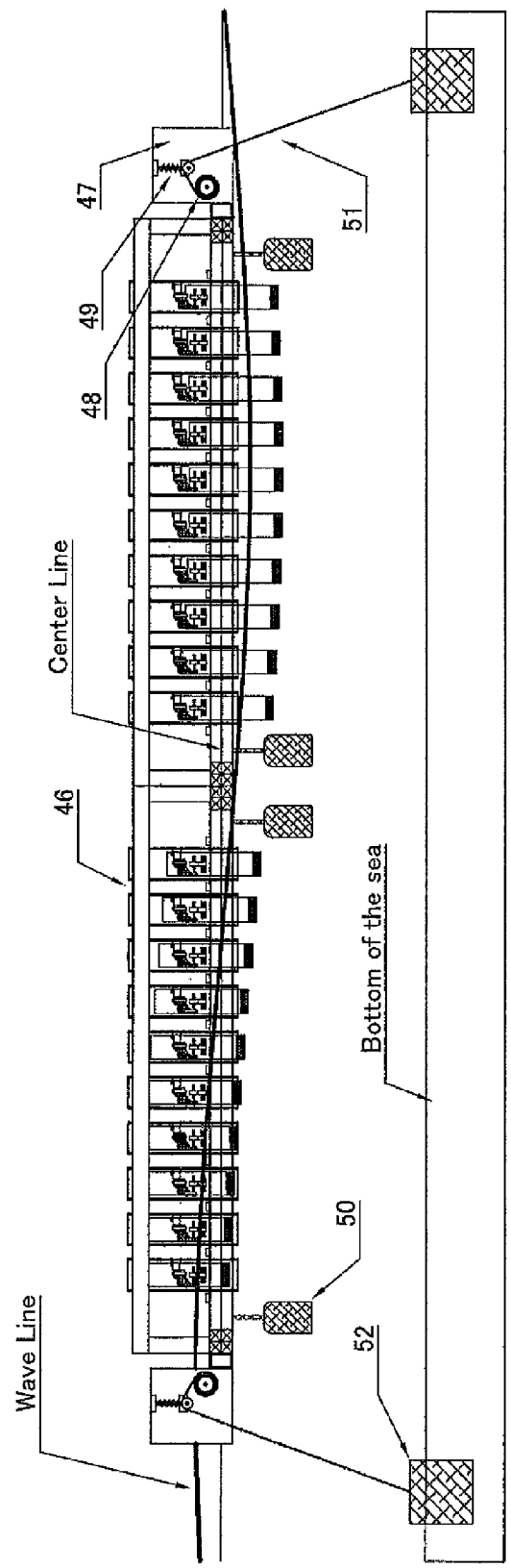
FIG. 17 shows an image chart of the tension buoy and dumping weight for power generation module with the references (46) long size power generation module, (47) tension buoy, (48) cable drum, (49) tension spring, (50) dumping weight, (51) connecting cable, (52) foundation block, (Lb) length of barge and (Wb) width of barge.

FIG. 17 shows the image chart of the tension buoy and dumping weight for power generation module. Long size wave activated power generation module (46) is a combined one of two power generation modules. Dumping weight (50) is hung down on the long size power generation module (46). Tension buoy (47) is floating on the sea and is connected to foundation block (52) buried in the bottom of the sea with connecting cable (51). The connecting cable (51) always connects the tension buoy (47) and the foundation block (52) with constant tension. The constant tension is adjusted by tension spring (49) and cable drum (48).

In the rack and pinion method, the power generation energy is obtained from the relative movement of shroud assembly and power generation buoy. The power generation buoy always synchronizes with the wave. When the shroud assembly is floating on the sea, it is inevitable to move up and down by the wave. The power generation efficiency worsens when the shroud assembly and the power generation buoy synchronize at the same time. It is necessary to restrain the shroud assembly when we adopt the rack and pinion method in practical use.

It is easy to connect the shroud assembly to the foundation block buried in bottom of the sea with cable. However, this method has some faults. There are a flood tide and an ebb tide in the sea. The cable loosens at the ebb tide when the length of the cable is matched to the surface of the sea of the flood tide. Oppositely, the cable is cut by the tension at the flood tide when the length of the cable is matched to the surface of the sea of the ebb tide. Moreover, the height of the wave is not constant.

The power generation energy is obtained from the relative movement between the shroud assembly and the power generation buoy. It is useless work to manage the absolute position of the shroud assembly. The purpose can be achieved by shifting the phase of movement. Seawater has viscosity. The phase of the buoy and the shroud assembly shifts by installing the dumping weight to the power generation module.

However, the power generation module should be connected to the bottom of the sea with cable. Otherwise, the power generation module drifts by the wave. A pair of tension buoys is installed at both ends of the power generation module. Each tension buoy is connected to the foundation block in the bottom of the sea, and is floating on the sea. In the tension buoy, there is a mechanism that constantly controls the cable tension. The tension mechanisms are composed of the motor drum that winds up the cable and the tension spring that gives cable the tension. The magnitude of the tension is calculated from the buoyancy of the barge. The cable becomes long by the control program at high water. Oppositely, the cable shortens at low water. At stormy weather, the cable tension in leeward is freed. Though the power generation efficiency of the power generation module deteriorates, the power generation module is prevented being damaged.

Figure 18:
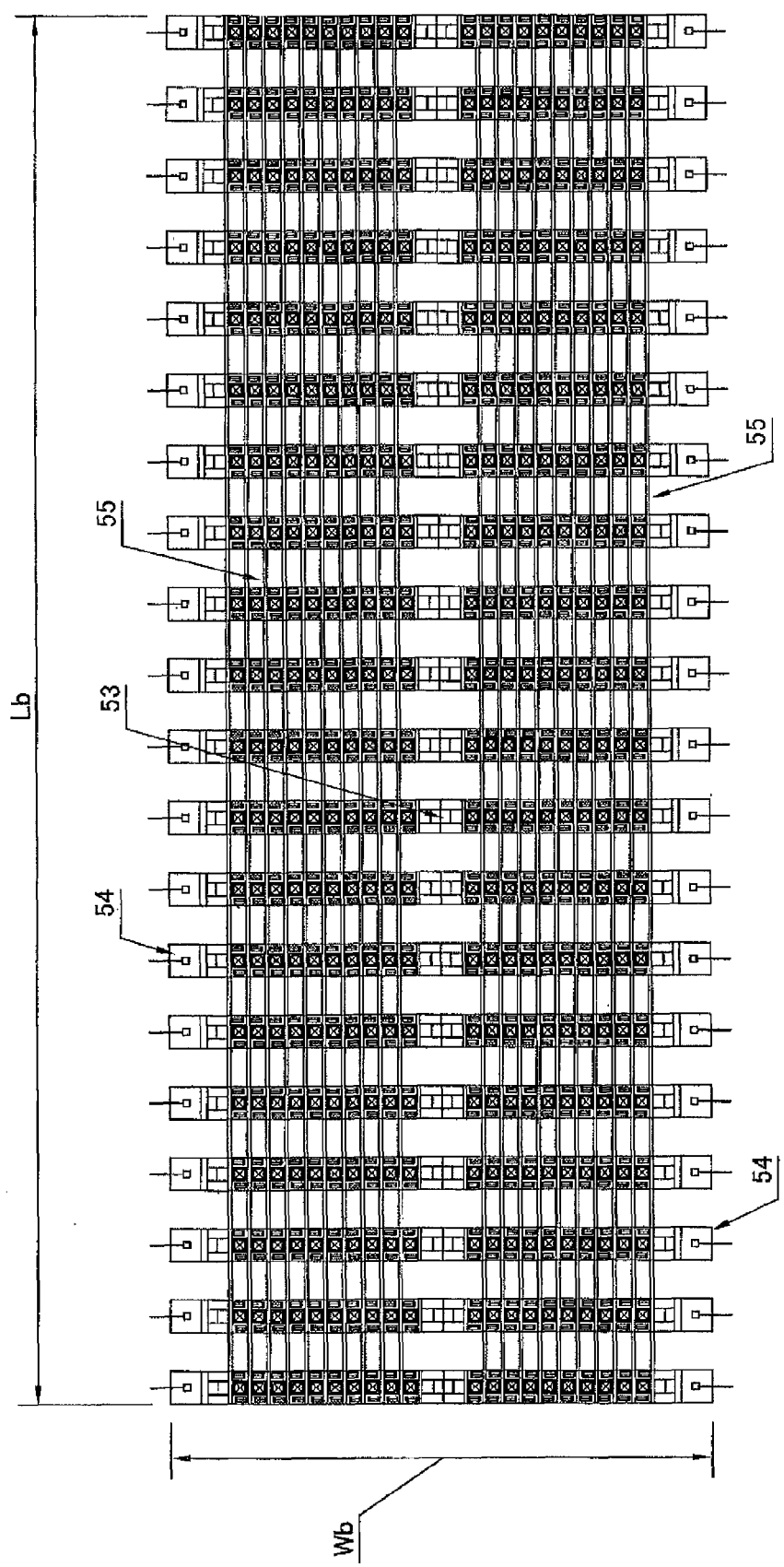
FIG. 18 shows an image chart of the wave activated power generation barge with the references (53) long size power generation module, (54) tension buoy and (55) tying cable.

FIG. 18 shows the image chart of the wave activated power generation barge. The wave activated power generation barge is composed of a lot of long size power generation modules (53) connected with a lot of tying cables (55). A pair of tension buoy (54) is installed at both ends of the long size power generation module (53). In this sample chart, the length of barge (Lb) is 215 meters. And the width of barge (Wb) is 84 meters, The wave activated power generation barge in sample chart is composed of 20 power generation modules and is composed of 400 power generation units. The barge is side by side connected by a lot of tying cables. The wave activated power generation barge is produced like a carpet with high flexibility. Each power generation module is almost independent. The wave activated power generation barge is constructed on open sea. There is little limitation in the length of barge.

Figure 19:
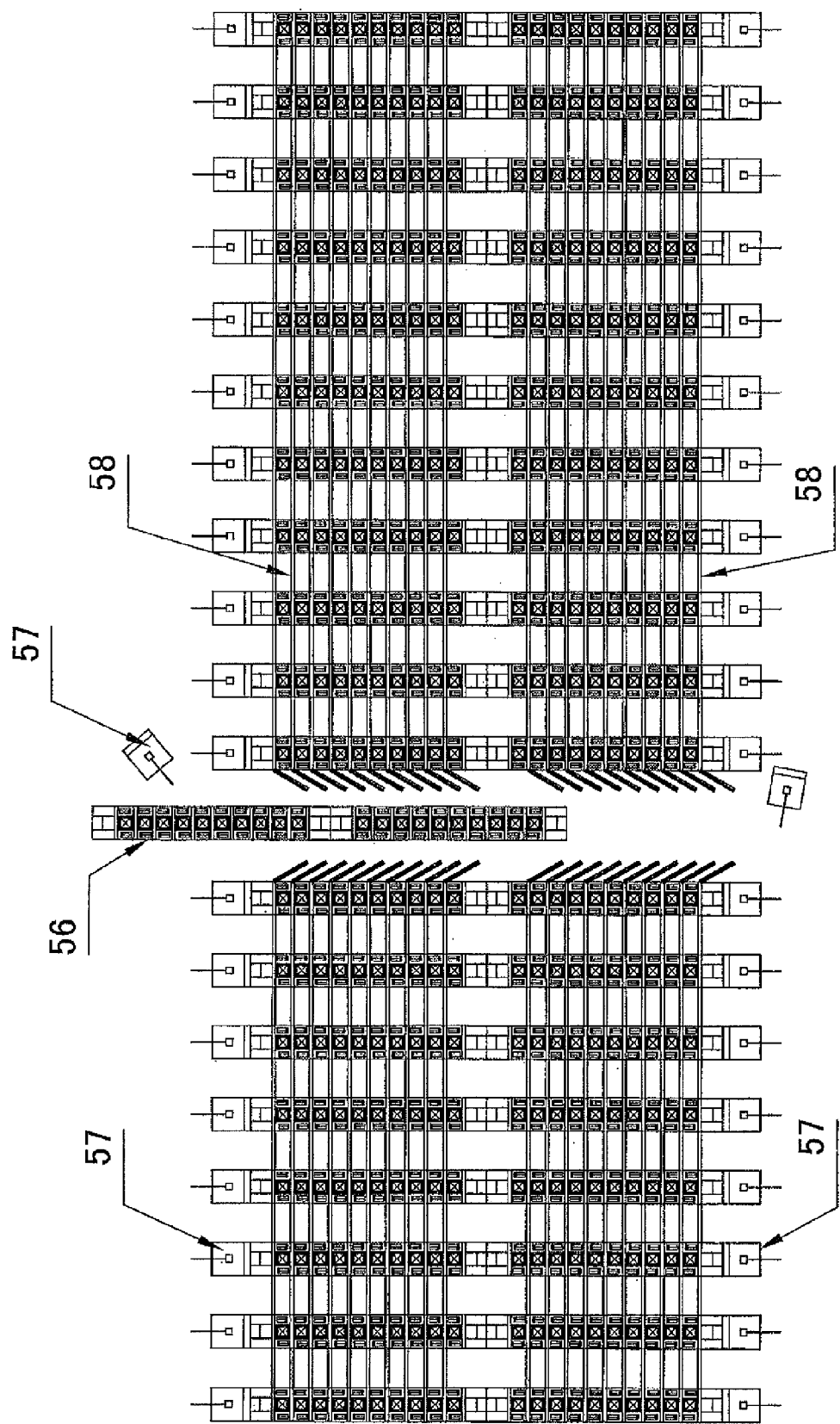
FIG. 19 shows an image chart of maintenance of the wave activated power generation barge with the references (56) long size power generation module, (57) tension buoy and (58) connecting cable.

FIG. 19 shows the image chart of maintenance of the wave activated power generation barge. The wave activated power generation barge is composed of a lot of power generation modules (56) and is maintained by exchanging old module for new module. Each module (56) can be removed in an arbitrary part. The tension buoy (57) cut off from the power generation module (56) is floating on the sea. The power generation module (56) is maintained at the factory.

Figure 20:
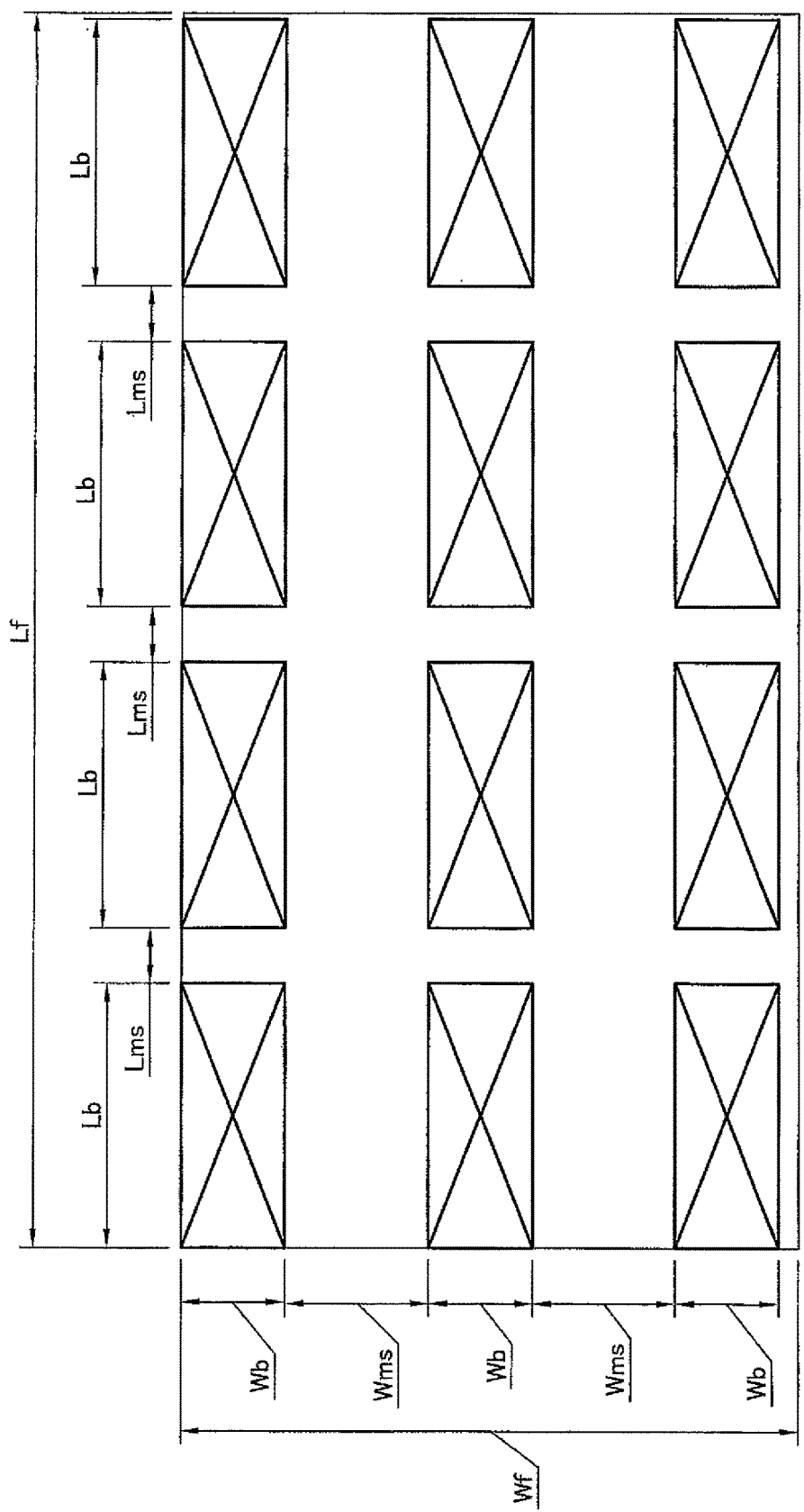
FIG. 20 shows an image chart of power generation farm with the references (Lf) length of power generation farm, (Lb) length of power generation barge, (Lms) margin space length between power generation barges, (Wf) width of power generation farm, (Wb) width of power generation barge and (Wms) margin space width between power generation barges.

FIG. 20 shows the image chart of power generation farm. The length of power generation farm (Lf) is 1000 meters. The length of power generation barge (Lb) is 215 meters. The margin space length between power generation barges (Lms) is 45 meter. The width of power generation farm (Wf) is 500 meters. The width of power generation barge (Wb) is 84 meters. The margin space width between power generation barges (Wms) is 116 meters. The power generation barge is composed of 400 power generation units. There will be 12 barges arranged in the area of 500 m×1000 m.

Ability of power generation in this sample wave activated power generation unit is calculated as shown in Table 10:

TABLE 10

|  | 1 module | 1 barge | 12 barges |
| --- | --- | --- | --- |
| Generation power unit | 20 | 400 | 4,800 |
| Area (m) | 84 × 5 | 84 × 215 | 500 × 1000 |
| Power generation (kW) | 163 | 3,252 | 39,024 |
| Ability of power generation (kW*h/year) | 1,511,960 | 30,239,200 | 362,870,400 |

The wave activated power generation is one of the steadiest power generation methods by natural energy. It is characterized by its large amount of energy. The energy for each area is 20-30 times of photovoltaic generation energy and is five times or more the force of the wind. It is said that the wave activated power generation can generate 30,000 kW in the area of 1K square meters. The sample power generation farm, in which 12 barges are arranged in the area of 500 m×1000 m, is calculated to generate 39,024 kW. And, the ability of power generation per year is calculated to be 362,870,400 kW*h/year. The power generation cost after the equipment cost is redeemed is only maintenance cost. The wave activated power generation will become a cheap, safe, permanent energy source.

Second Embodiment

Figure 21:
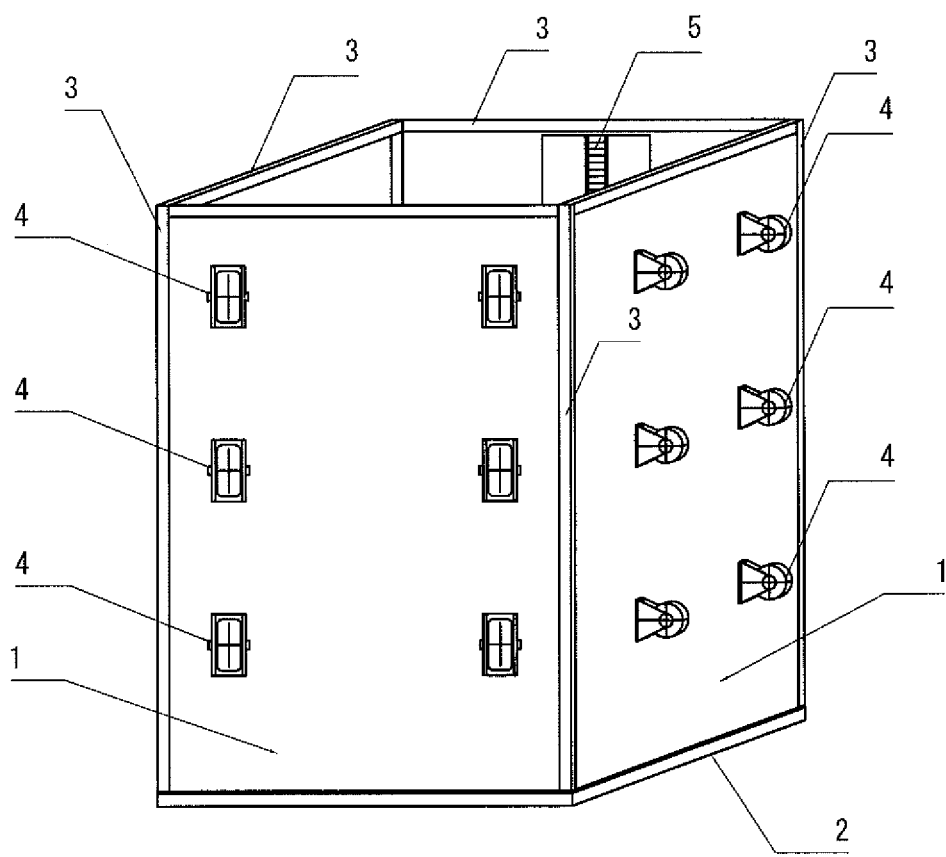
FIG. 21 shows a power generation buoy assembly using the references of (101) Side surface, (102) Bottom surface, (103) Buoy frame, (104) Guide roller, and (105) Rack gear.

In a second embodiment of the invention, FIG. 21 shows a power generation buoy assembly. The Side surface (101) and Bottom surface (102) form the power generation buoy. Rack gear (105) is installed on the inside surface of the power generation buoy, and several Guide roller (104) are attached on the outside surface of the buoy. The power generation buoy has vacant space inside it. The power generation buoy is reinforced with the Buoy frame (103).

Figure 22:
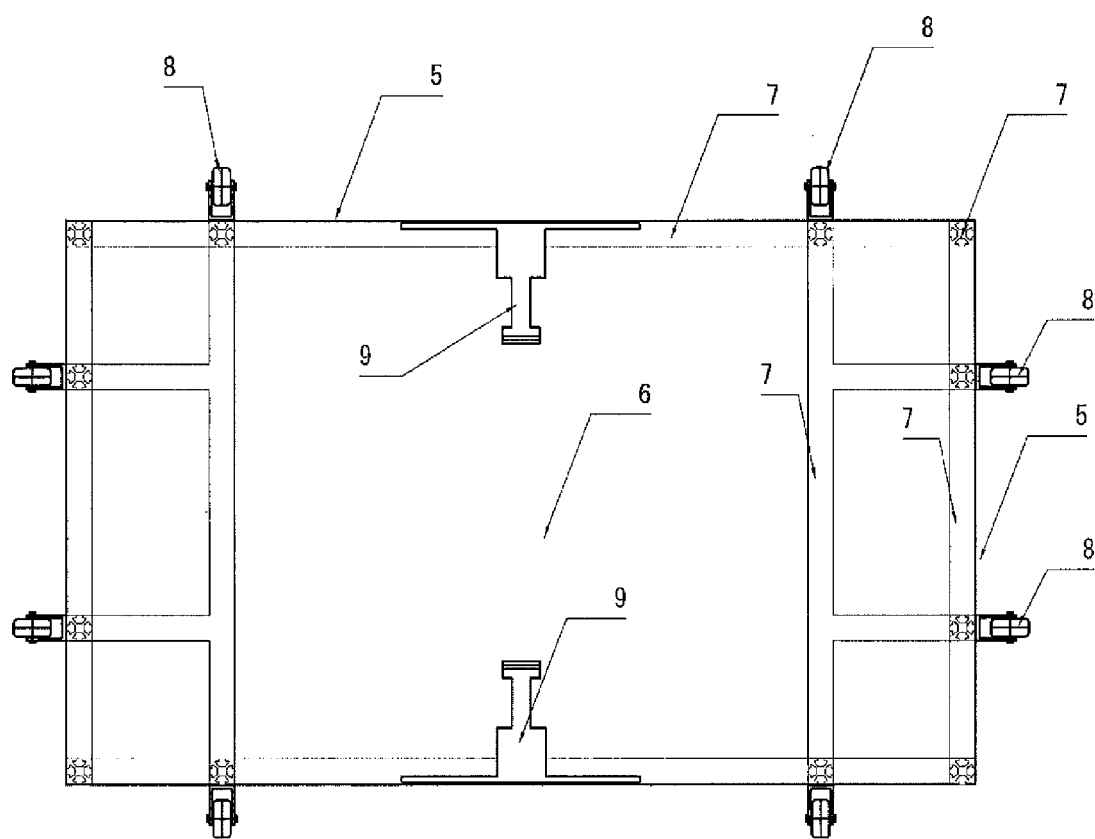
FIG. 22 shows a figure where power generation buoy assembly is seen right above using the references of (101) Side surface, (102) Bottom surface, (103) Buoy frame, (104) Guide roller, and (105) Rack gear.

FIG. 22 shows a figure where power generation buoy assembly is seen right above. The Side surface (101) and Bottom surface (102) form the power generation buoy. A pair of Rack gear (105) are installed on the inside surface of the power generation buoy, and several Guide roller (104) are attached on the outside surface of the buoy. Each Guide roller shown in FIG. 22 has the row of Guide roller from the buoy top to the buoy bottom. The power generation buoy has vacant space inside it. The power generation buoy is reinforced with the Buoy frame (103).

Four corner type and circle type are acceptable for the shape of the power generation buoy. The most important element of the power generation buoy is watertight and structural strength. To satisfy them, a light material is filled to the entire power generation buoy. However, when the power generation buoy is filled with a light material, the rack and pinion gear is placed outside of the buoy. The outside of the buoy is seawater, so the rack gear and pinion gear are exposed directly to seawater. When the rack & pinion is exposed to seawater, the entire power generation system will be exposed to seawater. Durability of power generation system becomes a problem.

It is undesirable that rack & pinion system is exposed directly to seawater:
  (A) When the rack & pinion gear system is placed inside the power generation buoy, the system is not exposed to seawater. To place the gear system in the power generation buoy, the power generation buoy should have vacant space in it.
  (B) A vacant power generation buoy is inferior to structural strength. It is necessary to reinforce the power generation buoy structurally. It is preferable that the power generation buoy is composed of the surface material of stainless steel and the frame of the steel material. Of course, FRP is acceptable.

Figure 23:
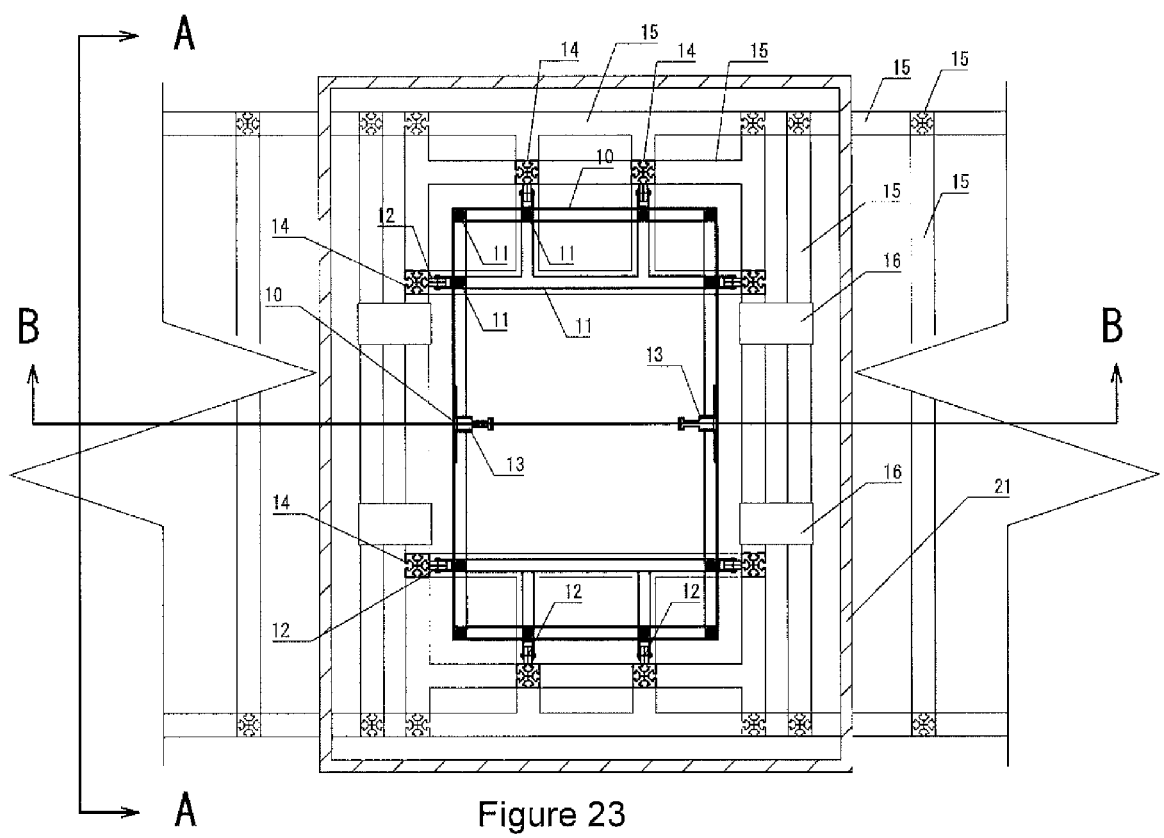
FIG. 23 shows a figure where power generation buoy assembly and power generation unit is seen right above using the references of (110) Side surface, (111) Buoy frame, (112) Guide roller, (113) Rack gear, (114) Slide frame, (115) Unit frame, (116) Reinforcement plate, and Fence (21).

FIG. 23 shows a figure that power generation buoy assembly and power generation unit is seen right above. Side surface (110) of power generation buoy is reinforced by Buoy frame (111). A pair of Rack gear (112) is installed inside the power generation buoy. Two or more Guide roller (113) are installed on all Side surfaces (110) of the outside of the power generation buoy assembly. Each Guide roller shown in FIG. 23 has a row of Guide rollers from the buoy top to the buoy bottom. The Guide roller (113) has come in contact with Slide frame (114). The number of the Slide frame (114) corresponds to the number of Guide roller rows (113). The Slide frames (114) are installed in the power generation unit. Slide frames (114) are structure frames of the power generation unit. Power generation unit is made of many Unit frames (15). Unit frames (115) are reinforced by Reinforcement plate (116). The power generation unit is surrounded by Fence (121).

The vacant power generation buoy assembly does not have the rigidity. Therefore, the wall vibrates by the power of the wave. It is necessary to reinforce the side surface of power generation buoy by the frames. As the compensation, the rack and pinion gear can be installed inside the power generation buoy.

By the FIG. 23, it is understood how the power generation buoy moves in the power generation unit. Basically, the power generation unit and the power generation buoy assembly are independent. They have only come in contact with the guide rollers and the slide frames.

Figure 24:
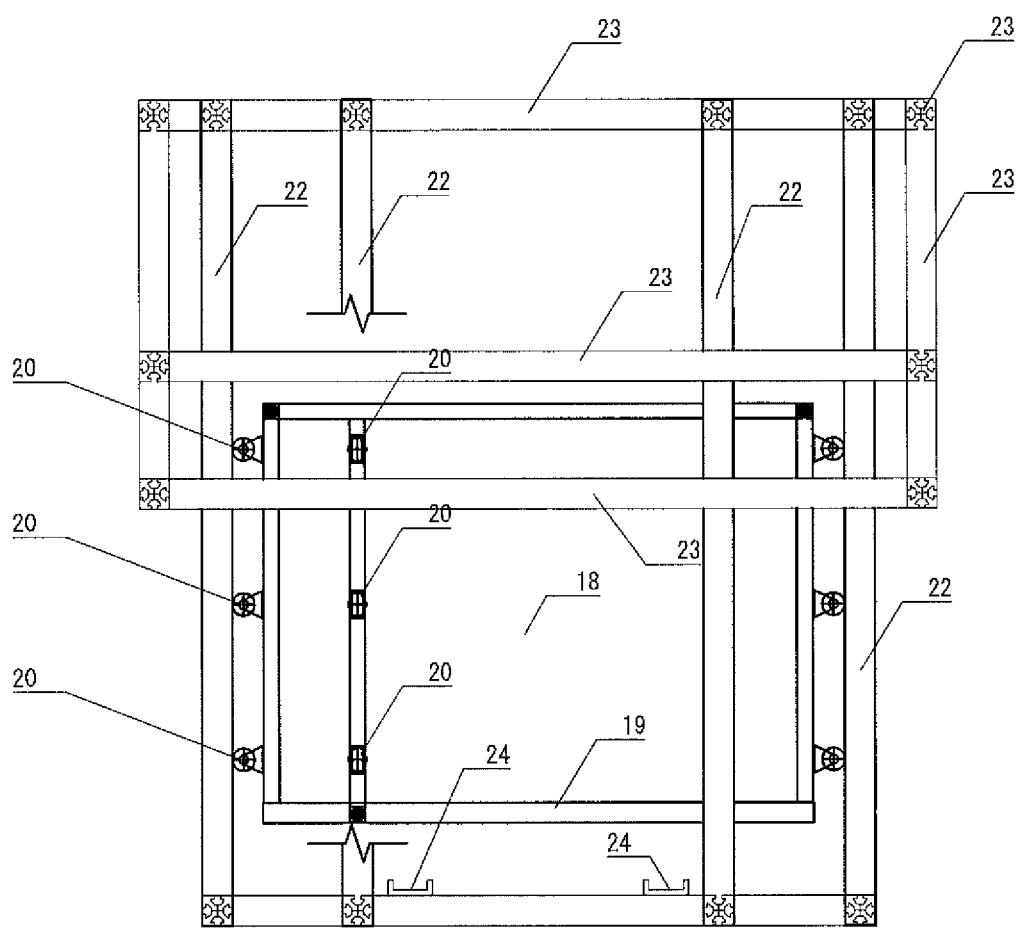
FIG. 24 shows a figure where power generation buoy assembly and power generation unit is seen from arrow view of A-A in FIG. 3 using the references of (18) Side surface, (19) Bottom surface, (120) Guide roller, (122) Slide frame, (123) Unit frame, and (124) Lower end stopper.

FIG. 24 shows a figure where power generation buoy assembly and power generation unit is seen from arrow view of A-A in FIG. 23. Side surface (118) and Bottom surface (119) form the power generation buoy with watertight. Two or more Guide roller (120) are installed on all Side surfaces (118) of the outside of the power generation buoy assembly. Every row of Guide roller (120) is placed from the buoy top to the buoy bottom. The Guide roller (120) has come in contact with Slide frame (122). The Slide frames (122) are installed in the power generation unit. Slide frames (122) are structure frames of the power generation unit. Power generation unit is made of many Unit frames (123). Two or more lower end stopper (124) are attached on the bottom frame of the power generation unit.

By the FIG. 24, it is understood how the power generation buoy moves in the power generation unit. Basically, the power generation unit and the power generation buoy assembly are independent. Power generation buoy assembly moves up and down in power generation unit. They have only come in contact with guide roller and slide frames. Every movement is restricted with the guide roller and the slide frame, excluding the vertical movement.

The movement of the power generation buoy is mechanically stopped by the lower end stoppers. The power generation buoy does not drop off from the power generation unit.

Figure 25:
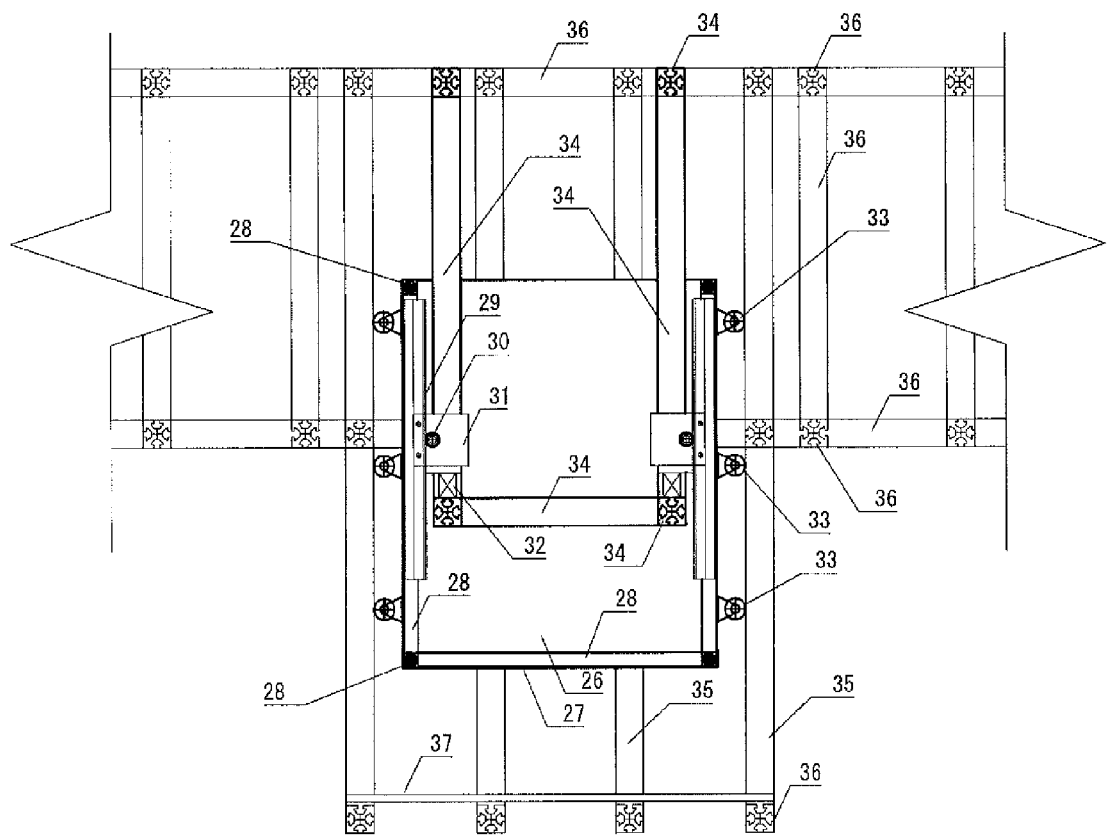
FIG. 25 shows a figure where power generation buoy assembly and power generation unit is seen from arrow view of B-B in FIG. 3 using the references of (126) Side surface, (27) Bottom surface, (128) Buoy frame, (129) Rack gear, (130) Pinion gear, (31) Gear box, (132) Damper, (133)

FIG. 25 shows a figure where power generation buoy assembly and power generation unit is seen from arrow view of B-B in FIG. 23. Side surface (126) and Bottom surface (127) form power generation buoy with watertight. The power generation buoy is reinforced by Buoy frame (128). Rack gear (129) is installed on the surface of the inside of the power generation buoy. The Rack gear (129) is installed on the two side surfaces of power generation buoy. Pinion gear (130) and Gear box (131) and Damper (132) are attached to Pinion system support frame (134). The Pinion system support frame (134) is connected to Unit frame (136). The Pinion gear (130) and the Gear box (131) and the Damper (132) are placed on the two side of power generation buoy, corresponding to the Rack gear (129). Two or more Guide roller (133) are installed on all Side surfaces (126) of the outside of the power generation buoy assembly. Every row of Guide roller (133) is placed from the buoy top to the buoy bottom. Guide roller (133) has come in contact with Slide frame (135). The Slide frames (135) are installed in the power generation unit. Power generation unit is made of many Unit frames (136). Lower end stopper (137) is attached on the bottom frame of the power generation unit.

By the FIG. 25, it is understood how the rack and pinion gear system is placed in the power generation buoy. When a big vacant space is produced inside of the power generation buoy, rack & pinion system can be put in the power generation buoy. Structural strength of the power generation buoy weakens as the compensation. The power generation buoy without strength always vibrates by the sea wave. Basically, the power generation unit and the power generation buoy assembly are independent. They have only come in contact with the Guide roller and the slide frames. The rack gear and the pinion gear mutually have suitable combination position. It is difficult to keep the position of the rack gear and the pinion gear to be constant, when they are independent.

It is difficult to keep constant the distance between the Guide roller and the slide frame, because the power generation buoy is shaken to right and left by waves of the sea.
- (A) The power generation buoy is restricted with guide roller and slide frame.
- (B) The rack gear and the pinion gear mutually have suitable combination position. It is necessary to control the engagement distance of the rack gear and the pinion gear by the unit of the millimeter. However, it is impossible to control the movement of the power generation buoy by the unit of the millimeter.
- (C) When we give up the impossible control, the structure becomes simple. The movement of the power generation buoy cannot be controlled in precision.
- (D) The structure becomes simple when the guide rollers are attached on the surface of power generation buoy.
- (E) The power generation buoy is enclosed with the fence because of worker's safety.

FIG. 26 shows a shape of the rack gear. The rack gear has special shape because the shape of rack gear is key for making it sure that the engagement of the rack gear and the pinion gear keep constant. The rack gear is composed of Rack teeth (138), Rack web (139), Rack ditch (140), and Rack flange (1120). The Rack teeth (138) is teeth of gear. The Rack web (139) is the web of gear. The Rack flange (1120) is support flange of gear. The Rack ditch (140) is a ditch where Slide bearing (1121) does the slide. The Slide bearing (1121) is made from the metal that contains oil. The Slide bearing (1121) moves up and down in the Rack ditch (140). When the rack gear assembly vibrates to right or left, the Slide bearing (1121) follows the movement of the rack gear assembly.

FIG. 27 shows a figure where rack & pinion system is seen right above. Rack gear (142) is fixed to Side surface (141) of the power generation buoy. Ditch has been cut in the web of the Rack gear (142). A pair of Slide bearing (144) is placed with narrow clearance in the ditch. The pair of Slide bearing (144) pinches the web of the rack gear. The pair of Slide bearing (144) is fixed to Gearbox (146) by bolts. The bolts are not shown in FIG. 27. Pinion gear (143), Pinion axis (145), and Axis bearing (147) are placed in the Gearbox (146). The Pinion gear (143) rotates in the Gearbox (146). The Pinion axis (145) is connected with Generator axis (50) through Universal joint (149). The Gearbox (146) is attached to Damper (148). The Damper (148) is fixed to pinion system support frame. The pinion system support frame is not shown in FIG. 27.

The Pinion gear (143) and the Rack gear (142) have come in contact by combination. The Pinion gear (143) is supported with the Gearbox (146) and rotates in the Gearbox (146). The Slide bearing (144) is fixed to the Gearbox (146) with bolts. A pair of Slide bearing (144) pinches the Rack gear (142) with narrow clearance. Therefore, the position of the Rack gear (142) and the Pinion gear (143) is kept constant. The vibration of the Rack gear (142) is transmitted to the Pinion gear (143). However, the vibration of the Pinion axis (145) is not transmitted to the Generator axis (150), because the Pinion axis (145) and the Generator axis (150) are united by the Universal joint (149).

FIG. 28 shows a figure where rack & pinion system is seen in front chart. Rack gear (152) is fixed to Side surface (151) of the power generation buoy. Ditch has been cut in the web of the Rack gear (152). Slide bearing (154) is placed with narrow clearance in the ditch. The Slide bearing (154) is fixed to Gearbox (155). Pinion gear (153) is installed to the Gearbox (55) and rotates in the Gearbox (155). The Gearbox (155) is attached to Damper (156). The Damper (156) is fixed to Pinion system support frame (157).

The Pinion gear (153) and the Rack gear (152) have come in contact by combination. The Pinion gear (153) is supported with the Gearbox (155) and rotates in the Gearbox (155). The Slide bearing (154) is fixed to the Gearbox (155). Slide bearing (154) is placed in the Rack gear (152) with narrow clearance. The Slide bearing (54) moves up and down in the ditch of the Rack gear (152). Oppositely when the position of slide bearing is fixed, the rack gear moves up and down.

The Slide bearing (154) is fixed to the Gearbox (155). Pinion gear (153) is supported with the Gearbox (155). The position of the Rack gear (152) and the Pinion gear (154) is kept constant. However, when the Rack gear (152) vibrates to right and left, the Gearbox (155) also vibrates. If the Gearbox (155) is firmly installed in the Pinion system support frame (157), the Gearbox (155) will be broken. To avoid it, the Gearbox (55) is fixed to the Pinion system support frame (157) by the Damper (156). However, the Gearbox (155) fixed by the Damper (156) vibrates slightly. When the Gearbox (155) vibrates, pinion axis vibrates, too. So as not to transmit the vibration of pinion axis to generator axis, pinion axis and generator axis are connected by universal joint. Pinion axis, generator axis and universal joint are not shown in FIG. 28.

The most difficult problem in rack & pinion method is keeping constant the distance between the rack gear and the pinion gear:
- (A) It is necessary to control the engagement of the rack gear and the pinion gear by the unit of the millimeter. Otherwise, the rack gear and pinion gear will come off
- (B) However, it is impossible to control the movement of the power generation buoy by the unit of the millimeter. So, it is impossible to control the movement of the rack gear by the unit of millimeter because the rack gear is attached to the power generation buoy.
- (C) If the pinion gear is fixed, it is inevitable that the rack gear and the pinion gear come off. Therefore, the pinion gear should vary its position according to the movement of the rack gear.
- (D) However, the pinion gear is not floating in the air. The pinion gear must be fixed to the power generation unit. Otherwise, it falls down.
- (E) Fortunately, because the movement of the power generation buoy is restrained with the Guide roller and the slide frame, the vibration of the rack gear is not large. Therefore, the movement of the center axis of the pinion gear is not large either.
- (F) If the pinion gear is fixed to loose fit type, the vibration of the axis center of the pinion gear will be controllable. However, the rotation axis connected with the generator must be supported firmly.
- (G) The pinion gear axis is connected to the generator axis with universal joint. This method is effective.

FIG. 29 shows a figure that power generation buoy assembly stops at the lower end stopper. Power generation buoy assembly (158) moves up and down in the power generation unit along Slide frame (162). Bottom surface (159) is the bottom of the Power generation buoy assembly (158). The power generation unit is manufactured from a lot of Unit frame (161). Lower end stopper (160) is attached at the bottom frame of the power generation unit. Pinion system support frame (163) is inside the Power generation buoy assembly (158). The Pinion support frame (163) is connected to the Unit frame (161) that composes the power generation unit. The Rack gear (1130) is installed on the two side surfaces of Power generation buoy assembly (158). Pinion gear (1131) and Gearbox (1132) and Damper (1133) are attached to Pinion system support frame (163). The Pinion system support frame (163) is connected to Unit frame (161).

When the Power generation buoy assembly (158) descends in power generation unit, the Bottom surface (159) of the Power generation buoy assembly (58) approaches the Lower end stopper (160). The Power generation buoy assembly (158) is stopped mechanically when the Bottom surface (159) comes in contact with the Lower end stopper (160). It is necessary to note the assembly procedure because the power generation buoy does not enter when the lower end stopper is previously built in.

The position of the Lower end stopper (160) is related to the length of the Rack gear (1130) and the position of the Pinion gear (1131). The length of the Rack gear (1130) is related to the size of the wave of the sea.

FIG. 30 shows a figure that power generation buoy assembly stops at the upper end stopper. Power generation buoy assembly (164) moves up and down in the power generation unit along Slide frame (168). Buoy frame (165) is reinforcement frame of the Power generation buoy assembly (164). The power generation unit is manufactured from a lot of Unit frame (167). Lower end stopper (166) is attached at the bottom frame of the power generation unit. Pinion system support frame (169) is inside the Power generation buoy assembly (164). The Pinion system support frame (169) is connected to the Unit frame (167) that composes the power generation unit. The Pinion system support frame (169) is the upper end stop, concurrently. The Rack gear (1134) is installed on the two side surfaces of Power generation buoy assembly (164). Pinion gear (1135) and Gearbox (1136) and Damper (1137) are attached to Pinion system support frame (169). The Pinion system support frame (169) is connected to Unit frame (167).

When the Power generation buoy assembly (164) rises in power generation unit, the lower Buoy frame (165) of the Power generation buoy assembly (164) approaches the Pinion system support frame (169) connected to the Unit frame (167). The Power generation buoy assembly (164) is stopped mechanically when the lower Buoy frame (165) comes in contact with The Pinion system support frame (169). The Pinion system support frame (169) is the upper end stop, concurrently.

The position of the bottom frame of Pinion system support frame (169) is related to the length of the Rack gear (1134) and the position of the Pinion gear (1135). The length of the Rack gear (1134) is related to the size of the wave of the sea.

The mechanical stopper for the power generation buoy is as follows:
(A) The wave height of the ocean has the possibility to exceed the length of the rack gear. When the wave height exceeds the length of the rack gear, it is necessary to stop the power generation buoy. There are several methods for stopping the power generation buoy. Mechanical stoppers are most reliable.
(B) The power generation buoy moves up and down inside of the space surrounded by the slide frames of the power generation unit. The movement of the power generation buoy is limited in this space.
(C) Therefore, the lower end stopper of power generation buoy is placed at the bottom of the slide frame so that the power generation buoy should not fall down anymore. However, it is necessary to note the assembly procedure because the power generation buoy does not enter when the lower end stopper is previously built in.
(D) The upper end stopper is clever a little more. The inside of the power generation buoy in this invention is vacant. It is effective to stop the power generation buoy using the inside bottom surface of power generation buoy.
(E) The pinion system is connected to the frame of the power generation unit. The frame of the power generation unit has expanded into the power generation buoy because the pinion system is inside of the power generation buoy.
(F) The bottom surface of the power generation buoy rises when the power generation buoy rises because of the wave. The position of the pinion gear is fixed. The rise of the power generation buoy is stopped by the pinion system support frame connected to the power generation unit.
(G) The position of the upper end stopper and the lower end stopper are decided by the length of the rack gear and the position of pinion gear. The length of the Rack gear and the position of pinion gear are related to the size of the wave of the sea.

FIG. 31 shows a figure of power generation system that is placed in the power generation buoy. Several Guide rollers (181) are installed on all the side surface of Power generation buoy assembly (170). Rack gear (171) is installed on the side surface of Power generation buoy assembly (170). Pinion gear (172) and Gearbox (174) are attached to Pinion system support frame (180). Slide bearing (173) is fixed to Gearbox (174). The Pinion system support frame (180) is located inside the Power generation buoy assembly (170). The Output axis of the Gearbox (174) is connected to the input axis of Relay gearbox (176) by Universal joint (175). The Relay gearbox (176) is connected to Electromagnetic clutch (177). The Electromagnetic clutch (177) is connected to Generator (178). The Relay gearbox (176), the Electromagnetic clutch (177) and the Generator (178) are fixed on Power generation device support board (179). The Power generation device support board (179) is fixed to the Pinion system support frame (180).

The Pinion system support frame (180) is fixed to power generation unit frame. The Pinion system support frame (180) is located inside the Power generation buoy assembly (170). Therefore, The Power generation device support board (79) is in the Power generation buoy assembly (170). The power generation unit frame is not shown in FIG. 31. Power generation system is placed inside the power generation buoy. The waterproof of the power generation system become easy, because seawater does not wet the inside of the power generation buoy. The position of the Relay gearbox (176) and the Electromagnetic clutch (177) can be exchanged if there is installation space.

In U.S. patent application Ser. No. 13/413,839, the control theory has recovered the potential energy of the power generation buoy by adjusting the load of the generator to zero:
(A) The cutting device is necessary to make the load to zero instantaneously. The electromagnetic clutch is suitable.
(B) Output of the generator is load for the power generation buoy. The alternating-current generator can adjust the output of the generator by adjusting the field current. However, it is uncertain whether to be able to adjust the load of the generator to zero only by controlling the field current.
(C) When the electromagnetic clutch is put on the upstream of the generator, the load of the generator mechanically becomes zero.

Third Embodiment

FIG. 32 shows a cross section of unit float system of power generation unit in the sea. Unit Float (201) is floating in Seawater (211). The inside of the Unit Float (201) is midair, and the inside is filled with Inside Air (210) and Inside Water (209). Water Gage (208) is attached in the Unit Float (201). Seawater Open Valve (207) is adhered to the bottom of the Unit Float (201). The Inside Water (209) goes in and out from the Seawater Open Valve (207). Air Compressor (202), Air Tank (203), Air Pipe (204), Compressed Air Open/Close Valve (205), Float Air Open/Close Valve (206) are adhered on the upside of the Unit Float (201).

Because the power generation unit floats on the sea, the inside of the Unit Float (201) is midair and sealed up all the structures. And the unit float is exposed to seawater, so causticity to seawater is necessary. As for a structural material, the metal and plastic are acceptable if there is corrosion resistance.

The Unit Float (201) is midair. Naturally, the shape of the Unit Float (201) becomes a cocoon, hexahedron and cylinder.

Wave activated power generation of rack & pinion method generates electricity by the relative movement of the power generation unit and the power generation buoy. Power generation buoy moves up and down by the power of the wave. There is a limit in the length of a rack gear installed in power generation buoy. The power generation unit is designed to make a pinion gear to be a central position of the rack gear. A relative position of the power generation unit and the power generation buoy is uncertain until floating them on the sea, because the power generation unit and the power generation buoy are independent. The shape and the weight of the power generation buoy are designed constant. It is impossible to change the waterline position of the power generation buoy after it is floated on the sea. Each power generation buoy has the manufacturing error margin. The waterline of an actual power generation buoy is not uniform. If the waterline position of the power generation unit is not moved up and down, it is difficult to obtain the designed position. Therefore, it is necessary to design the waterline of the power generation unit to be transmutable. Moreover, it is effective to endure the natural calamities by the way that the power generation unit sinks down in the sea. Power generation system waits the wind and wave to pass.

For designing the waterline of the power generation unit to be transmutable, sinking and rising system is controlled individually by unit float system, as follows:
(A) Unit float system is composed of Unit Float (201), Air Compressor (202), Air Tank (203), Air Pipe (204), Compressed Air Open/Close Valve (205), Float Air Open/Close Valve (206), Seawater Open Valve (207) and Water Gage (208).
(B) When Inside Water (209) enters in the Unit Float (201), the Unit Float (201) sinks. Oppositely when Inside Water (209) is exhausted from the Unit Float (201), the Unit Float (201) rises.
(C) The Seawater Open Valve (207) is always open. Therefore, when the Compressed Air Open/Close Valve (205) is closed and Float Air Open/Close Valve (206) is open, Seawater (211) enters in the Unit Float.
(D) The Seawater Open Valve (207) is always open. However, when the Float Air Open/Close Valve (206) is closed, Seawater (211) stops entering in the Unit Float.
(E) However, when the Float Air Open/Close Valve (206) is closed, Seawater (211) stops to enter in the Unit Float.
(F) Next when the Compressed Air Open/Close Valve (205) is opened, compressed air enters in the Unit Float (201), seawater is exhausted from the inside of the float.
(G) When the Water Gauge indicates target value, the Compressed Air Open/Close Valve (205) is closed.
(H) Compressed air is manufactured with the Air Compressor (202), accumulated in the Air Tank (203), and distributed with the Air Pipe (204).
(I) Sinking and rising of each power generation unit is controlled individually by unit float system.

FIG. 33 shows a cross section of unit float system of power generation unit in the sea. Power Generation Unit (213) is floating in Seawater (212). There is Power Generation buoy assembly (223) in the center of the Power Generation Unit (213). There is a pair of Unit Float (215) in both sides of the Power Generation Buoy Assembly (223). Unit Frame (214) is a structure material of the Power Generation Unit (213). The structure of the Power Generation Unit (213) is symmetric in the right and left. As for the Power Generation Unit (213) on the sea, Air Compressor (216) and Air Tank (217) are attached to the center of the Unit Frame (214). Air Valve (219) is adhered to the upper part of the Unit Float (215), and Seawater Valve (220) is attached in the bottom. Air Pipe (218) ties the Air Tank (217) to the Air Valve (219). The inside of the Unit Float (215) is midair. The inside of the Unit Float (215) is filled with Inside Water (221) and Inside Air (222). The Unit float (215) sinks into the Seawater (212) when the ratio of the Inside Water (221) increases. Oppositely, the Unit float (215) rises when the ratio of the Inside Air (222) increases.

The unit float system is a device that floats an individual power generation unit on the sea and the number of the unit float is 2 pieces or more for one power generation unit.
(A) There is no buoyancy in it because the power generation unit is a framework. The system that surely floats the power generation unit on the sea is necessary.
(B) The power generation buoy that occupies most of the weight of the power generation unit is placed on the center of the power generation unit. The unit float is set up at both sides of the power generation unit. Therefore, the number of the unit float is 2 pieces or more necessary for one power generation unit, FIG. 34 shows a cross section of a power generation unit with a unit posture stability mechanism in the sea. Power Generation Unit (225) is floating in Seawater (224). Center of Gravity (226) is a center of gravity of the Power Generation Unit (225). Unit Frame (227) is a structure material of the Power Generation Unit (225). There is a pair of Unit Float Assembly (229) in both sides of the Power Generation Unit (225). The inside of the Unit Float Assembly (229) is midair, and the inside is filled with Inside Air (230) and Inside Water (231). In the upper part of the Power Generation Unit (225), there is Air Compressor System (228) and Gyroscope (232). As for the Power Generation Unit (225) with a unit posture stability mechanism in the sea, a pair of Balance Weight (233) is attached to the Unit Frame (227). The Balance Weight (233) is the same weight. For the position of a perpendicular direction of the Balance Weight (323), the Balance Weight (233) is installed in lower position than the Center of Gravity (226). For the position of a horizontal direction, the Balance Weight (233) is installed symmetric. The Gyroscope (232) is a detector of the inclination degree of the Power Generation Unit (225).

FIG. 35 shows a figure where a power generation unit equipped a unit posture stability mechanism is horizontal with stability in the sea. Center of Gravity (C.G) is a center of gravity of a power generation unit. Gravity Force (Fgr) is the gravity of the power generation unit. Moment Arm of Gravity (Agr) is the moment arm of gravity of the power generation unit. Buoyancy Force of Float-1 (Fb1) is the buoyancy of a unit float at left side. Moment Arm of Float-1 (Ab1) is the moment arm of buoyancy of the unit float at left side. Buoyancy Force of Float-2 (Fb2) is the buoyancy of a unit float at right side. Moment Arm of Float-1 (Ab2) is the moment arm of buoyancy of the unit float at right side. Weight Force of Balance Weight-1 (Fm1) is the force of left side Balance Weight. Moment Arm of Balance Weight-1 (Am1) is the moment arm of left side Balance Weight. Weight Force of Balance Weight-2 (Fm2) is the force of right side Balance Weight. Moment Arm of Balance Weight-2 (Am2) is the moment arm of right side Balance Weight.

The balance equation of the force of FIG. 35 is as follows: Upward force is assumed to be (Fu). Downward force is assumed to be (Fd). The equation of the force is as follows.

$$Fu = Fb1 + Fb2$$

$$Fd = (Fm1 + Fm2) + Fgr$$

It is not easy to understand in the expression, so hard numbers are put. However, the numerical value is a calculation example.
- (A) The force balances because the power generation unit is steady.
- (B) Fb1=500 (kgf), Fb2=500 (kgf), Fm1=300 (kgf), Fm2=300 (kgf), Fgr=400 (kgf),
- (C) Fu=500 (kgf)+500 (kgf)=1000 (kgf)
- (D) Fd=300 (kgf)+300 (kgf)+400 (kgf)=1000 (kgf)
- (E) Fu=Fd
- (F) The object moves neither to upward nor to downward when the force is balanced.

The balance equation of the moment of FIG. 35 is as follows: Clockwise moment power is assumed to be (Mc). Counterclockwise moment power is assumed to be (Mcc). Moment Arm of Gravity (Agr) is 0. Therefore, the gravity of the power generation unit does not take part in the rotation moment equation. The equation of the rotation moment is as follows.

$$Mc = (Fb1)*(Ab1) + (Fm2)*(Am2),$$

$$Mcc = (Fb2)*(Ab2) + (Fm1)*(Am1)$$

It is not easy to understand in the expression, so hard numbers are put. However, the numerical value is a calculation example.
- (A) The rotation moment balances because the power generation unit is steady in horizontal.
- (B) Fb1=500 (kgf), Ab1=700 (mm), Fm2=300 (kgf), Am2=1000 (mm), Fb2=500 (kgf), Ab2=700 (mm), Fm1=300 (kgf), Am1=1000 (mm),
- (C) Mc=500 (kgf)*700 (mm)+300 (kgf)*1000 (mm)= 650,000 (kgf*mm)
- (D) Mcc=500 (kgf)*700 (mm)+300 (kgf)*1000 (mm)= 650,000 (kgf*mm)
- (E) Mc=Mcc
- (F) A clockwise moment and an anti-clockwise moment are equal. The object rotates neither to clockwise nor to anti-clockwise when the moment is balanced.

FIG. 36 shows a figure where a power generation unit equipped a unit posture stability mechanism inclined to right in the sea. The power generation unit is inclined to the right by some causes. Center of Gravity (C.G) is a center of gravity of a power generation unit. Gravity Force (Fgr) is the gravity of the power generation unit. Moment Arm of Gravity (Agr) is the moment arm of gravity of the power generation unit. Buoyancy Force of Float-1 (Fb1) is the buoyancy of a unit float at left side. Moment Arm of Float-1 (Ab1) is the moment arm of buoyancy of the unit float at left side. Buoyancy Force of Float-2 (Fb2) is the buoyancy of a unit float at right side. Moment Arm of Float-1 (Ab2) is the moment arm of buoyancy of the unit float at right side. Weight Force of Balance Weight-1 (Fm1) is the force of left side Balance Weight. Moment Arm of Balance Weight-1 (Am1) is the moment arm of left side Balance Weight. Weight Force of Balance Weight-2 (Fm2) is the force of right side Balance Weight. Moment Arm of Balance Weight-2 (Am2) is the moment arm of right side Balance Weight.

FIG. 36 analyzes the restoration power when the power generation unit is inclined with some causes. The balance equation of the force of FIG. 36 is as follows: Upward force is assumed to be (Fu). Downward force is assumed to be (Fd). The equation of the force is as follows.

$$Fu = Fb1 + Fb2$$

$$Fd = (Fm1 + Fm2) + Fgr$$

Because it is not easy to understand in the expression, hard numbers are put. However, the numerical value is a calculation example.
- (A) The force balances because the power generation unit doesn't move upward or downward.
- (B) Fb1=300 (kgf), Fb2=700 (kgf) Fu=300 (kgf)+700 (kgf)=1000 (kgf)
- (C) Fm1=300 (kgf), Fm2=300 (kgf), Fgr=400 (kgf) Fd=300 (kgf)+300 (kgf)+400 (kgf)=1000 (kgf)
- (D) Fu=Fd
- (E) Upward force and downward force are equal. Therefore, the power generation unit moves neither upward nor downward.

FIG. 36 shows the state, for example, that the power generation unit is inclined by strong wind, and then the strong wind is calmed down afterwards. FIG. 36 analyzes the restoration power when the power generation unit inclines. The balance equation of the moment of FIG. 36 is as follows. Clockwise moment power is assumed to be (Mc). Counterclockwise moment power is assumed to be (Mcc). Moment Arm of Gravity (Agr) is 0. Therefore, the gravity of the power generation unit does not take part in the rotation moment equation. The equation of the rotation moment is as follows:

$$Mc = (Fb1)*(Ab1) + (Fm2)*(Am2)$$

$$Mcc = (Fb2)*(Ab2) + (Fm1)*(Am1)$$

Because it is not easy to understand in the expression, hard numbers are put.

(A) FIG. 36 shows the state that the power generation unit is inclined by strong wind, and then the strong wind is calmed down afterwards. The rotation moment balance is broken.
(B) Fb1=300 (kgf), Ab1=700 (mm), Fm2=300 (kgf), Am2=950 (mm)
(C) Fb2=700 (kgf), Ab2=650 (mm), Fm1=300 (kgf), Am1=1120 (mm)
(D) Mc=300 (kgf)*700 (mm)+300 (kgf)*950 (mm)=495,000 (kgf*mm)
(E) Mcc=700 (kgf)*650 (mm)+300 (kgf)*1120 (mm)= 791,000 (kgf*mm)
(F) Mc<Mcc
(G) Anti-clockwise moments are larger than clockwise moments. Therefore, the power generation buoy begins to turn anti-clockwise.
(H) Now, the power generation unit is inclined to the right. When the power generation buoy rotates anti-clockwise, the inclination of the power generation buoy is corrected.
(I) When the power generation buoy becomes the horizontal, a clockwise moment and an anti-clockwise moment become equal. The power generation buoy is stabilized and rests when a clockwise moment is equal to an anti-clockwise moment.
(J) The movement of the object is steady when the balance weight is in the lower side from the center of gravity position. The buoyancy of the float system contributes with stability of the power generation unit, too. It is the same principle as the balance toy.

FIG. 37 shows a cross section of power generation unit with unit anchor system in the sea. Power Generation Unit (235) is floating in Seawater (234). There is Power Generation buoy assembly (236) in the center of the Power Generation Unit (235). There is a pair of Unit Float Assembly (238) in both sides of the Power Generation Buoy Assembly (236). Unit Frame (237) is a structure material of the Power Generation Unit (235). The Unit Float Assembly (238) is connected with the Unit Frame (237) by Unit Float Support (239). As for the Power Generation Unit (235) with unit anchor system, four pieces or more Anchor Cable (240), Cable Tension Support (241), Cable Tension Pulley (242), Cable Drum (243), Cable Motor (244), Cable Tension Spring (245) are attached to the Unit Frame (237). A Gyroscope (246) is attached to the Power generation Unit (235). An Anchor Weight Block (247) is placed on Sea Bottom (249). Four pieces or more Anchor Cables (240) are connected to the Anchor Weight Block (247). Two Balance Weight (248) are installed symmetric The Power Generation Unit (235) is floating in Seawater (234). The Power Generation Unit (235) drifts if it is not fixed at the bottom of the Sea Bottom (249). The Power Generation Unit (235) is connected to the Anchor Weight Block (247) placed on the Sea Bottom (249) by the Anchor Cable (240). As for the material of the Anchor Weight Block (247), any material is acceptable if it is heavy. And it is preferable that the weight of the Anchor Weight Block (247) is larger than the buoyancy of the Unit Float Assembly (238). When the Anchor Weight Block (247) is carried, a supplementary float is installed to the Power Generation Unit (235). The Anchor Cable (240) is connected with the Anchor Weight Block (247) on the Sea Bottom (249) by passing the hole of the Unit Float Support (239).

Any anchor system is acceptable if the anchor reaches at the bottom of the sea, and there is no limitation in the number. However, four or more anchor systems are preferable, considering the control method of the anchor system of the Power Generation Unit (235). In the sea, there is high tide and ebb. The height of the surface of Seawater (234) is not constant. As for the wave activated power generation of rack & pinion method, the power generation ability of an individual Power Generation Unit (235) is not so large and the buoyancy of the Unit Float Assembly (238) is not so large either. Structural strength of the Anchor Cable (240) can be strengthened. The Anchor Cable (240) does not cut by the buoyancy of the Unit Float Assembly (238). When the weight of the Anchor Weight Block (247) on the Sea Bottom (249) is heavy enough, the Anchor Weight Block (247) does not move by the buoyancy of the Unit Float Assembly (38). The waterline of the Power Generation Unit (235) cannot be maintained if anchor cable system does not control the length of the Anchor Cable (240) that responds to sea level.

The pinion gear and the rack gear of the power generation unit are mutually independent. The pinion gear comes off from a central position of the rack gear when the waterline of the power generation unit shifts from the design position. The operation range of the power generation buoy becomes narrow when the pinion gear comes off from a central position of the rack gear. When the operation range of the power generation buoy becomes narrow, the power generation efficiency is deteriorated, because the power generation buoy cannot correspond to a big wave. Therefore, the unit anchor system automatically corresponds to the rising and descending of the sea by the flood tide and the ebb tide.

In the sea, there are a high tide and ebb. The height of the surface of the Seawater (234) is not constant. The waterline of the Power Generation Unit (235) cannot be maintained if anchor cable system does not control the length of Anchor Cable (240) responding to sea level.

(A) At high tide, the anchor system is controlled as follows
  (a) The surface of Seawater (234) rises at high tide.
  (b) Unit Float Assembly (238) is fixed to Anchor Weight Block (247), so waterline of the Unit Float Assembly (238) sinks. The buoyancy of Unit Float Assembly (238) increases because the Unit Float Assembly (238) is fixed to Anchor Weight Block (247).
  (c) The increasing buoyancy of the Unit Float Assembly (238) pulls Anchor Cable (240) downward.
  (d) Cable Tension Spring (245) expands by the force of the Anchor Cable (240).
  (e) Cable Drum (243) lengthens the Anchor Cable (240) to return the amount of transformation in Cable Tension Spring (245) to a regulated value.
  (f) The Power Generation Unit (235) rises by the buoyancy of the Unit Float Assembly (238) because the Anchor Cable (240) is extended.
  (g) The buoyancy of the Unit Float Assembly (238) decreases in proportion to the amount where the Power Generation Unit (235) rises. The increasing buoyancy of the Unit Float Assembly (228) is canceled, and the waterline of the Power Generation Unit (235) is always kept constant.
(B) At ebb tide, the anchor system is controlled as follows
  (a) The surface of Seawater (234) falls downward at ebb tide.
  (b) The Anchor Cable (230) loosens, because any cable cannot resist the compression power.
  (c) Unit Float Assembly (238) is fixed to Anchor Weight Block (247), so waterline of the Power Generation Unit (235) descends.
  (d) Cable Tension Spring (245) shrinks because the Anchor Cable (240) loosened.

(e) Cable Drum (243) shortens the Anchor Cable (240) to return the amount of transformation in Cable Tension Spring (245) to a regulated value.

(f) The Power Generation Unit (235) falls downward by the tension of the Anchor Cable (240) because the Anchor Cable (240) is shortened.

(g) The buoyancy of the Unit Float Assembly (238) increases in proportion to the amount where the Power Generation Unit (235) descends. The decreasing buoyancy of the Unit Float Assembly (228) is canceled, and the waterline of the Power Generation Unit (235) is always kept constant.

As for the wave activated power generation of rack & pinion method, when the power generation unit is floating in the sea, the power generation buoy and the power generation unit move up and down synchronizing with the cycle of the wave. A single power generation unit cannot generate electricity. However, when the buoyancy of the power generation unit balances the tension of the anchor cable, the power generation unit can generate electricity alone.

The inside of Unit Float Assembly (238) is midair and the inside is filled with compressed air. The Unit Float Assembly (238) can float more than a regulated waterline. As a result, the waterline of Power Generation Unit (235) rises more than regulations. To adjust the waterline of the Power Generation Unit (235), the Power Generation Unit is pulled down with the Anchor Cable (240). The Power Generation Unit (235) is steady on the Seawater (234) when the buoyancy of the Unit Float Assembly (238) and the tension of the Anchor Cable (240) is balance. The Power Generation Buoy Assembly (236) moves up and down by the wave. Electricity is generated by the relative movement of the Power Generation Unit (235) and the Power Generation Buoy Assembly (236). However, when its control is mistaken, the anchor system has danger of making the posture of the power generation unit unstable. It is preferable to connect a lot of power generation units, and to make it to a power generation raft. The unit frame becomes steady by connecting a lot of power generation units.

FIG. 38 shows a figure where a power generation unit equipped a unit anchor system is inclined to right by the wind in the sea. Because this example is an extreme malfunction example of a unit anchor system, a unit stability mechanism has been excluded. Center of Gravity (C.G) is a center of gravity of a power generation unit. Gravity Force (Fgr) is the gravity of the power generation unit. Moment Arm of Gravity (Agr) is the moment arm of gravity of the power generation unit. Buoyancy Force of Float-1 (Fb1) is the buoyancy of a unit float at left side. Moment Arm of Float-1 (Ab1) is the moment arm of buoyancy of the unit float at left side. Buoyancy Force of Float-2 (Fb2) is the buoyancy of a unit float at right side. Moment Arm of Float-1 (Ab2) is the moment arm of buoyancy of the unit float at right side. Tension Force of Cable-1 (Ft1) is the tension force of left side cable. Moment Arm of Cable-1 (At1) is the moment arm of the tension force of left side cable. Tension Force of Cable-2 (Ft2) is the tension force of right side cable. Moment Arm of Cable-2 (At2) is the moment arm of the tension force of right side cable. Wind Force (Fw) is the wind force. Moment Arm of Wind Force (Aw) is the arm of wind force.

The balance equation of the moment of FIG. 38 is as follows:
Clockwise moment power is assumed to be (Mc). Counter-clockwise moment power is assumed to be (Mcc). Moment Arm of Gravity (Agr) is 0. Therefore, the gravity of the power generation unit does not take part in the rotation moment equation. The equation of the rotation moment is as follows.

$$Mc=(Fw)*(Aw)+(Fb1)*(Ab1)+(Ft2)*(At2), Mcc=(Fb2)*(Ab2)+(Ft1)*(At1)$$

Because it is not easy to understand in the expression, hard numbers are put. However, the numerical value is a calculation example.

(A) The rotation moment balances because the power generation unit that is inclined by wind force is steady. Therefore, a clockwise moment and an anti-clockwise moment are equal.

(B) Fw=300 (kgf), Aw<600 (mm), Fb1=200 (kgf), Ab1=700 (mm), Ft2=250 (kgf), At2=500 (mm)

(C) Fb2=320 (kgf), Ab2=660 (mm), Ft1=468 (kgf), At1=500 (mm)

(D) Mc=300 (kgf)*600 (mm)+200 (kgf)*700 (mm)+250 (kgf)*500 (mm)=445,000 (kgf*mm)

(E) Mcc=320 (kgf)*660 (mm)+468 (kgf)*500 (mm)=445,000 (kgf*mm)

(F) Mc=Mcc

The anchor system has the function to equate the cable tensions. It is assumed that the anchor system adjusted the cable tension to 359 (kgf). 359 (kgf) are the average. Then, the equation ahead changes as follows:

(A) Fw=300 (kgf), Aw=600 (mm), Fb1=200 (kgf), Ab1=700 (mm), Ft2=359 (kgf), At2=500 (mm)

(B) Fb2=320 (kgf), Ab2=660 (mm), Ft1=359 (kgf), At1=500 (mm)

(C) Mc=300 (kgf)*600 (mm)+200 (kgf)*700 (mm)+359 (kgf)*500 (mm)=449,500 (kgf*mm)

(D) Mcc=320 (kgf)*660 (mm)+359 (kgf)*500 (mm)=390,700 (kgf*mm)

(E) Mc>Mcc (F) A clockwise moment grows big. The power generation unit is inclined to right when a clockwise moment grows big. Therefore, the power generation unit that is inclined to the right by the wind is inclined to the right in addition by the anchor system, The power generation unit is inclined to right when a clockwise moment grows. Therefore, the power generation unit that is inclined to the right by the wind is inclined to the right in addition by the anchor system. To avoid the above-mentioned problem, the anchor system of the power generation unit should have four anchor systems or more. It is preferable to operate the anchor system when three cable tensions or more show the same tendency. The data of the posture change by the gyroscope becomes important information that controls the anchor system.

Fourth Embodiment

FIG. 39 shows a power generation buoy of direct coil method. Power Generation Buoy Assembly (301) is composed of Side Surface (302), Bottom Surface (303), Buoy Frame (304), Guide Rollers (305) and Bar Magnets (306).

Power Generation Buoy Assembly (301) is reinforced with Buoy Frame (304). Two or more Bar Magnets (306) are installed on the Bottom Surface (303) of the Power Generation Buoy Assembly (301). Several Guide Rollers (305) are attached on the outside surface of Side Surface (302). The Power Generation Buoy Assembly (301) has vacant space inside it.

FIG. 40 shows a figure where power generation buoy of direct coil method is seen right above. Power Generation Unit Assembly (307) is composed of Power Generation Unit Frame (308), Slide Frame (309), Coil Support Horizontal Base (310), Coil Support Perpendicular Frame (311), Power Generation Buoy Assembly (312), Guide Roller (313), Magnet Coil (314) and Bar Magnet (315).

The wave activated power generation system generates electricity by the energy of the wave. Power Generation Unit (307) is floating on the sea or lake, and is stationary by the mechanism of long and rigid Power Generation Unit Frame (308). The Power Generation Unit Frame (308) is mutually connected, and is designed to expand like long rigid line. The long and rigid connected Power Generation Unit Frame (308) steps over the undulation of the wave. Power Generation Buoy Assembly (312) is placed at the center part of the Power Generation Unit (307). Power Generation Buoy Assembly (312) moves up and down by the undulation of the wave. The movement of Power Generation Buoy Assembly (312) is restrained by Slide Frame (309) and Guide Roller (313). Slide Frame (309) is a part of Power Generation Unit Frame (308). Guide Roller (313) is attached to Power Generation Buoy Assembly. So, Power Generation Buoy Assembly (312) moves only up and down.

Power Generation Buoy Assembly (312) has vacant space inside it. Two or more Bar Magnet (315) are fixed on the inside surface of the Power Generation Buoy Assembly (312). Therefore, two or more Bar Magnet (315) moves up and down with Power Generation Buoy Assembly (312) by the undulation of the wave.

There are two or more Magnet Coil (314) attached to Coil Support Horizontal Base (310). Bar Magnet (315) and Magnet Coil (314) are same numbers. Coil Support Horizontal Base (310) is fixed to Power Generation Unit Frame (308) by Coil Support Perpendicular Frame (311). Coil Support Perpendicular Frame (311) is a part of Power Generation Unit Frame (308). Power Generation Unit (307) is floating on the sea or on the lake, and is stationary by the mechanism of long and rigid connection of Power Generation Unit Frame (308). Magnet Coils (314) don't move up and down on the sea or on the lake.

Bar Magnets (315) fixed on the bottom surface of Power Generation Buoy Assembly (312) are moved up and down by the undulation of the wave. However, Magnet Coils (314) are steady on the surface of the sea or the lake. When a bar magnet moves up and down in a stationary electromagnetic coil, the electromotive force is generated. Then, in an electromagnetic coil, an electric voltage that corresponds to the electromotive force is generated.

As for the direct coil method, there is no mechanical loss in the direct coil method. However, it is impossible to enlarge the power generation ability of a couple of magnet and the coil infinitely. Moreover, a couple of magnet and the coil only generate electricity once a cycle of the undulation of the wave. Therefore, it is impossible to convert all power generation possibility of the power generation buoy into the electric power with a couple of magnet and the coil.

It is necessary to set up a large number of couples of the magnet and the coil in the power generation buoy. The power generation possibility of the power generation buoy increases by the rate of volume. Compared with it, the space Where the couple of the magnet and the coil is set up increases by the rate of area. When the kinetic energy of the power generation buoy grows big, the power generation ability comes to be limited. So, it is difficult to convert big kinetic energy into the electric power by the direct coil method. The direct coil method is suitable for the wave activated power generation at the place where the wave is comparatively small.

FIG. 41 shows a figure where power generation buoy of direct coil method is seen in center position by front chart. Power Generation Unit Assembly (316) is composed of Power Generation Unit Frame (317), Slide Frame (318), Power Generation Buoy Assembly (319), Guide Roller (320), Coil Support Perpendicular Frame (321), Coil Support Horizontal Base (322), Coil Support Horizontal Upper (323), Bar Magnet (324), Magnet Coil (325), Float Chamber (326) and Float Camber Connection (327).

Power Generation Unit Assembly (316) floats by the buoyancy of Float Chamber (326) on the sea or on the lake. Float Chamber (326) is connected to Power Generation Unit Frame (317) by Float Chamber Connection (327). Power Generation Buoy Assembly (317) is placed at the center of the Power Generation Unit Assembly (316). Power Generation Buoy Assembly (317) moves up and down by the undulation of the wave. The movement of Power Generation Buoy Assembly (317) is restrained by Slide Frame (318) and Guide Roller (320). Slide Frame (318) is a part of Power Generation Unit Frame (317). Guide Roller (320) is attached to Power Generation Buoy Assembly (319). So, Power Generation Buoy Assembly (319) moves only up and down. Power Generation Buoy Assembly (319) has vacant space inside it. There are two or more Bar Magnet (324) on the base of the Power Generation Buoy Assembly (319). The Bar Magnets (324) move up and down with Power Generation Buoy Assembly (319) by the undulation of the wave.

There are two or more Magnet Coils (325) attached to Coil Support Horizontal Base (322). Magnet Coils (325) are supported by Coil Support Horizontal Base (322) and Coil Support Horizontal Upper (323). Bar Magnets (324) and Magnet Coils (314) are same numbers. Coil Support Horizontal Base (322) and Coil Support Horizontal Upper (323) are fixed to Power Generation Unit Frame (317) by Coil Support Perpendicular Frame (321). Coil Support Perpendicular Frame (321) is a part of Power Generation Unit Frame (317). Power Generation Unit Assembly (316) is floating on the sea or on the lake. And it is stationary by the mechanism of long and rigid Power Generation Unit Frame (317). Magnet Coils (325) don't move up and down on the surface of sea or lake.

A central position of Power Generation Buoy Assembly (319) is a position in which half of Bar Magnet (324) enters in Magnet Coil (325). The central position of Power Generation Buoy Assembly (319) is decided by the buoyancy of Power Generation Buoy Assembly (319) and the buoyancy of Float Chamber (326).

FIG. 42 shows a figure where power generation buoy of direct coil method is seen in upper position by front chart. Power Generation Unit Assembly (330) is composed of Power Generation Unit Frame (331), Slide Frame (332), Power Generation Buoy Assembly (333), Guide Roller (334), Coil Support Perpendicular Frame (335), Coil Support Horizontal Base (336), Coil Support Horizontal Upper (337), Bar Magnet (338), Magnet Coil (339), Float Chamber (340) and Float Camber Connection (341).

An upper position of Power Generation Buoy Assembly (333) is a position in which full of Bar Magnet (338) enters in Magnet Coil (339). The upper position of Power Generation Buoy Assembly (333) is decided by the wave height and the position of Coil Support Horizontal Base (336). When the wave heights are lower than the positions of Coil Support Horizontal Base (336), the upper position of Power Generation Buoy Assembly (333) is decided by the wave height. When the wave heights are higher than the positions of Coil Support Horizontal Base (336), Power Generation Buoy Assembly (333) is stopped by Coil Support Horizontal Base (336). Therefore, when the wave heights are higher than the positions of Coil Support Horizontal Base (336), the upper position of Power Generation Buoy Assembly (333) is decided by the position of Coil Support Horizontal Base (336).

FIG. 43 shows a figure where power generation buoy of direct coil method is seen in lower position by front chart. Power Generation Unit Assembly (350) is composed of Power Generation Unit Frame (351), Slide Frame (352), Power Generation Buoy Assembly (353), Guide Roller (354), Coil Support Perpendicular Frame (355), Coil Support Horizontal Base (356), Coil Support Horizontal Upper (357), Bar Magnet (358), Magnet Coil (359), Float Chamber (360), Float Camber Connection (361) and Lower End Stopper (362).

A lower position of Power Generation Buoy Assembly (353) is a position in which top part of Bar Magnet (358) enters in Magnet Coil (359). The lower position of Power Generation Buoy Assembly (353) is decided by the wave height and the position of Lower End Stopper (362). When the wave heights are higher than the positions of Lower End Stopper (362), the lower position of Power Generation Buoy Assembly (353) is decided by the wave height. When the wave heights are lower than the positions of Lower End Stopper (362), Power Generation Buoy Assembly (353) is stopped by Lower End Stopper (362). Therefore, when the wave heights are lower than the positions of Lower End Stopper (362), the lower position of Power Generation Buoy Assembly (353) is decided by the position of Lower End Stopper (362).

It is not preferable that Power Generation Buoy Assembly (353) violently knocks against Lower End Stopper (362). The electromotive force generated in Magnet Coil (359) tries to obstruct the movement of Bar Magnet (358) that passes the inside of Magnet Coil (359). When the electromotive force of Magnet Coil (358) grows big, Bar Magnet (358) cannot pass through Magnet Coil (358) easily.

The electromotive force generated in Magnet Coil (359) coil is generated by the change of the magnetic induction that passes the inside of Magnet Coil (359). The flux of magnetic comes out from Bar Magnet (358). When the flux of magnetic induction of Bar Magnet (358) can be controlled from the outside, the speed of Bar Magnet (358) can be controlled. Bar Magnet (358) is fixed to Power Generation Buoy Assembly (353). So, the speed of Power Generation Buoy Assembly (353) can be controlled by the flux of magnetic induction of Bar Magnet (358). It is preferable that Bar Magnet (358) is made of an electromagnet to prevent Power Generation Buoy Assembly (353) from violently knocking against Lower End Stopper (362). The speed of Power Generation Buoy Assembly (353) can be controlled by enlarging the flux of magnetic induction of Bar Magnet (358).

It will be appreciated that there is no mechanical loss in the direct coil method. However, it is impossible to enlarge the power generation ability of a couple of magnet and the coil infinitely. The direct coil method is suitable for the wave activated power generation at the place where the wave is comparatively small. Therefore, it is preferable to combine the direct coil method with other method for wave activated power generation.

The spirit of this invention is that two or more couples of the bar magnets and the coils whose individual power generation ability are limited are placed in one power generation buoy. It is advantage to obtain the large power generation by placing a lot of couple of the coil and the magnet that have only a small power generation ability in one power generation buoy.

Fourth Embodiment

FIG. 43 shows a rack gear for connection continuously in straight line. Rack gear is a cogwheel. Therefore, when the rack gear is cut at an arbitrary position, continuousness of the cogwheel is lost. Rack gear (401) consists of Mountain Teeth (402) and Valley Teeth (403). Rack Gear (401) is a designed rack gear from which the continuousness of cogwheel is not lost.

The edge side of Rack Gear (401) is cut to become centers of the Valley Teeth (403). Because the edge sides of Rack Gear (401) are centers of Valley Teeth (403), Rack Gear (401) can be continuously connected. As for the position where Rack Gear (401) is cut, centers of Mountain Teeth (402) are also possible. However, it is easier to cut the rack gear at centers of Valley Teeth (403), considering the processing accuracy. The length of Rack Gear (401) is limited to integral multiples of the gear module.

FIG. 44 shows a rack gear & base block assembly. Rack gear (405) consists of Mountain Teeth (406) and Valley Teeth (407). Rack Gear (405) is a designed rack gear from which the continuousness of cogwheel is not lost. There are two Rack Gears (405) on Base Block (409). Two Rack Gears (405) are connected by the attached match at the position of Connection line (408). The Base Block (409) is longer than two Rack Gears (405) connected in straight line, and is wider than Rack Gear (405). The Base Block (409) has the enough thickness and the rigidity.

FIG. 45 shows a rack gear & base block assembly cross sectional side view. Rack gear & base block assembly is composed of Base Block (411), Rack Gear (413) and Connection Bolt (416). Two Rack Gears (413) are connected by the attached match at Connection line (415). A lot of Penetration Holes (412) are processed on Base Block (411). Penetration Hole (412) of the Base Block (411) is a penetration hole with the sunken surface for Connection Bolt (16). Same numbers of Tap Hole (414) are processed on the bottom side of Rack Gear (413) by the same pitch as the Penetration Hole (412) of Base Block (411). The Rack Gear (413) is fixed on the surface of the Base Block (411) with sunken Connection Bolt (416) from back of the Base Block (411).

In FIG. 46, two Rack Gears (413) are fixed to Base Block (411) at Connection Line (415). However, there is no limitation in the number of Rack Gear (413) fixed on Base Block (411). Moreover, the number of Base Block (411) is not limited.

FIG. 47 shows a power generation buoy assembly with long rack gear method. Power Generation Buoy Assembly (417) is a vacant box that moves up and down by the wave of the sea. Power Generation Buoy Assembly (417) is sealed up by Side Hull (418) and Bottom Hull (419), and seawater cannot invade the inside of Power Generation Buoy Assembly (417). A lot of Guide Rollers (424) are attached on the outside surfaces of the Power Generation Buoy Assembly (417). Guide Roller (424) guides only the vertical movement. A pair of Rack Gears (423) fixed to Base Block (421) is installed on a pair of inside surfaces of the Power Generation Buoy Assembly (417). As for the Rack Gear (423) fixed to the Base Block (421), a lot of rack gears are connected in straight line. The Base Block (421) is installed on the inside surface of Side Hull (418) with a lot of Installation Bolt (420). A lot of Tap Holes (422) are processed on the bottom surface of the Base Block (421). The Side Hull (418) of the Power Generation Buoy Assembly (417) is strengthened by the Base Block (421).

As for the wave activated power generation of rack & pinion method, Rack Gear (423) is installed on Side Hull (418) of Power Generation Buoy Assembly (417) that is moving up and down and right and left because of waves of the ocean. The Side Hull (418) of the Power Generation Buoy Assembly (417) is a thin board. The Rack Gear (423) meanders when a lot of Rack Gears (423) are installed directly on the thin Side Hull (18) of the Power Generation Buoy Assembly (417). Base Block (421) that has a high rigidity is necessary to install a lot of Rack Gears (423) in highly accurate and in straight line. The assembling work of the Rack Gears (423) and the Base Block (421) is a produce at a small factory. Work to assemble the Base Block (421) assembly to the Power Generation Buoy Assembly (417) needs big space. Safety and the work efficiency improve by assembling a lot of Rack Gears (423) to be a base block assembly. Moreover, the rigidity of the Power Generation Buoy Assembly (417) is improved.

The cut position of the rack gear is not limited to centers of the valley teeth. However, the position where the rack gear is cut is preferable at the center of the valley teeth when thinking about the processing accuracy. There are some methods of fixing the rack gear and the base block. The method of fixing the bottom of the rack gear to the surface of the base block is preferable, considering the processing accuracy.

The spirit of this invention is in showing the method how the mechanically limited rack gear corresponds to the unlimited length of sea wave. The rack gear of arbitrary length can be obtained by connecting a lot of rack gears in the straight line. However, it is not easy to connect a lot of rack gears in the straight line on the hull of the power generation buoy that is made of thin board. As for the spirit of this invention, it shows the method how the rack gear assembly of arbitrary length and enough rigidity is manufactured and is installed to the power generation buoy whose hull is thin structure.

It will be appreciated that modifications may be made to the structure and operation of the present invention. The spirit of this invention is achievement of an efficient wave activated power generation system. For that purpose, this invention developed the power generation buoy incorporating a variety of features and elements designed to achieve a variety of advantages over the prior art systems. Accordingly, it should be understood that we intend to cover by the appended claims all modifications falling within the true spirit and scope of our invention.

What is claimed is:

1. A wave activated power generating device, comprising:
   a main support frame having a first hollow interior space;
   a buoy vertically positioned to rise and fall relative to motion of waves impacting the buoy and the main support frame, the buoy being formed with a second hollow interior space;
   a rack and pinion structure operatively connected between the buoy and the main support frame such that a pinion element of the rack and pinion structure generates rotating torque by moving along a rack element in response to the buoy rising and falling by the wave motion;
   a power generator unit operative connected to the rack and pinion structure to generate electricity in response to rotating torque generated by the pinion element, wherein
   the rack element is fixedly connected to at least one vertical surface inside the second hollow interior space of the buoy, and
   the pinion element is fixedly mounted on a pinion support frame fixedly mounted to the main support frame to extend into the second hollow interior space of the buoy and operatively positioned to movably interconnect with the rack element as the buoy rises and falls along the first hollow interior space of the main support frame; and
   a unit float structure including at least one hollow unit float, an air compressor, an air tank operatively connected between the at least one hollow unit float and the air compressor, a compressed air control valve connected between the air tank and the at least one hollow unit float, a float air valve connected to the at least one hollow unit float to controllably release air from the at least one hollow unit float, and a seawater valve connected to the at least one hollow float to controllably introduce seawater into the at least one hollow unit float, wherein
   the unit float structure includes first and second hollow unit floats,
   the air tank is operatively connected between each of the first and second hollow unit floats and the air compressor,
   a compressed air control valve is connected between the air tank and each of the first and second hollow unit floats,
   each of the first and second hollow unit floats includes a float air valve,
   each of the first and second hollow unit floats includes a seawater valve,
   a plurality of balance weights connected to and symmetrically positioned around the wave activated power generation device, and
   a gyroscope device operatively connected to control operation of each of the compressed air control valve, the float air valves and the seawater valves in response to an inclination of the wave activated power generation device while floating.

2. A wave activated power generation device according to claim 1, further comprising:
   a plurality of guide rollers fixedly attached to a vertical exterior surface of the buoy and operatively positioned to movably interconnect with the main support frame and guide the rising and falling of the buoy along the first hollow interior space of the main support frame.

3. A wave activated power generation device according to claim 1, wherein
   the main support frame includes a lower mechanical stop structure, and
   the buoy includes a bottom surface formed to contact with the lower mechanical stop structure of the main support frame during the falling of the buoy so as to mechanically limit downward travel of the buoy.

4. A wave activated power generation device according to claim 1, wherein
   the main support frame includes an upper mechanical stop structure, and
   the buoy includes an upper wall portion formed to contact with the upper mechanical stop structure of the main support frame during the rising of the buoy so as to mechanically limit upward travel of the buoy.

5. A wave activated power generation device according to claim 2, wherein the support frame includes a slide frame operatively positioned to interconnect with the plurality of guide rollers so as to guide the rising and falling of the buoy.

6. A wave activated power generation device according to claim 1, further comprising:
a plurality of slide bearing plates fixedly attached to an exterior surface of the buoy and operatively positioned to movably interconnect with the support frame and guide the rising and falling of the buoy.

7. A wave activated power generation device according to claim 6, wherein
the support frame includes a slide frame operatively positioned to interconnect with the plurality of slide bearing plates so as to guide the rising and falling of the buoy.

8. A wave activated power generation device according to claim 1, wherein
the buoy includes a glass fiber FRP body having an upper portion and a lower portion, the lower portion being filled with ballast weight material such that the buoy stands vertically when floating in water.

9. A wave activated power generation device according to claim 8, wherein
at least the upper portion of the glass fiber FRP body is filled with styrene foam.

10. A wave activated power generation device according to claim 8, wherein
the ballast weight material of the of the lower portion is made from iron particles.

11. A wave activated power generation device according to claim 1, wherein
the power generator unit includes a dynamo operatively connected to the pinion element via a gearless transmission, the gearless transmission being configured to control vertical movement of the buoy in response to controlling a torque of the dynamo relative to the rotating torque of the pinion element.

12. A wave activated power generation device according to claim 1, further comprising:
a platform on which the support structure is fixedly mounted, wherein the platform includes a rigid barge on which the power generator unit is mounted.

13. A wave activated power generation device according to claim 12, further comprising:
a shroud assembly formed to surround the buoy such that the buoy is slidably movable in the shroud assembly, the shroud assembly being fixedly mounted to the platform, wherein the pinion element is mounted on the shroud assembly and the rack element is mounted on the buoy.

14. A wave activated power generation device according to claim 1, wherein
the pinion element includes a pinion gear operatively engaged with the rack structure, and
the power generation unit includes a gearbox operatively connected to the pinion gear of the pinion element, a universal joint operatively connected to receive an output of the gearbox, a relay gearbox operatively connected to receive an output of the universal joint, an electromagnetic clutch operatively connected to receive an output of the relay gearbox, and a generator operatively connected to receive an output of the electromagnetic clutch.

15. A wave activated power generation device, comprising:
a main support frame having a first hollow interior space;
a buoy vertically positioned to rise and fall relative to motion of waves impacting the buoy and the main support frame, the buoy being formed with a second hollow interior space;
a rack and pinion structure operatively connected between the buoy and the main support frame such that a pinion element of the rack and pinion structure generates rotating torque by moving along a rack element in response to the buoy rising and falling by the wave motion;
a power generator unit operative connected to the rack and pinion structure to generate electricity in response to rotating torque generated by the pinion element, wherein
the rack element is fixedly connected to at least one vertical surface inside the second hollow interior space of the buoy, and
the pinion element is fixedly mounted on a pinion support frame fixedly mounted to the main support frame to extend into the second hollow interior space of the buoy and operatively positioned to movably interconnect with the rack element as the buoy rises and falls along the first hollow interior space of the main support frame; and
a unit anchor structure including first and second hollow unit floats, a plurality of balance weights connected to and symmetrically positioned around the wave activated power generation device, an anchor weight, a pulley device operatively connected between the power generation device and the anchor weight, wherein the anchor weight is positioned at the bottom of the water where the power generation device is floating, and a gyroscope device operatively connected to control operation of the pulley device in response to an inclination of the power generation device while floating.

16. A wave activated power generation device according to claim 1, wherein the rack element includes a plurality of rack gear sections fixedly mounted on a base block,
each of the plurality of rack gear sections having formed thereon a plurality of teeth positioned such that, when the plurality of rack gear sections are positioned in longitudinal alignment adjacent to each other, the plurality of teeth of adjacent rack gear sections are positioned to allow uninterrupted movement of a corresponding pinion element.

17. A system for wave activated power generation, comprising:
a platform; and
a plurality of wave activated power generating units, each unit including:
a support frame, a buoy vertically positioned to rise and fall relative to motion of waves impacting the buoy and the support frame, the buoy being formed with a hollow interior space,
a rack and pinion structure operatively connected between the buoy and the support frame such that a pinion element of the rack and pinion structure generates rotating torque by moving along the rack element in response to the buoy rising and falling by the wave motion,
a power generator unit operative connected to the rack and pinion structure to generate electricity in response to rotating torque generated by the pinion element, wherein the rack structure is fixedly connected to at least one vertical surface inside the hollow interior space of the buoy, and the pinion element is fixedly mounted on the support frame to extend into the hollow interior space of the buoy and operatively positioned to movably interconnect with the rack structure as the buoy rises and falls; and a unit anchor structure including first and second hollow unit floats, a plurality of balance weights connected to and symmetrically positioned around the wave activated power generation device, an anchor weight, a pulley device operatively connected between the power generation device and the anchor weight, wherein the anchor weight is positioned at the bottom of the water where the power generation device is floating, and a gyroscope device operatively connected to control operation of the pulley device in response to an inclination of the power generation device while floating.

18. A system for wave activated power generation according to claim 17, wherein
each of the plurality of wave activated power generating units further includes a plurality of guide rollers fixedly attached to an exterior surface of the buoy and operatively positioned to movably interconnect with the support frame and guide the rising and falling of the buoy.

19. A system for wave activated power generation according to claim 17 wherein
each of the plurality of power generator units includes a dynamo operatively connected to the pinion element via a gearless transmission, the dynamo being configured such that a torque of the dynamo is controllably variable relative to the rotating torque of the pinion element such that movement of the buoy is controllably stoppable.

* * * * *